(12) United States Patent
Fleisig

(10) Patent No.: US 8,016,611 B2
(45) Date of Patent: Sep. 13, 2011

(54) ELECTRICAL POWER SUPPLYING DEVICE HAVING A RING-LIKE STRUCTURE FOR RECEIVING THE POWER PLUGS AND/OR POWER ADAPTERS ASSOCIATED WITH A PLURALITY OF ELECTRICAL APPLIANCES, AND AN INTEGRATED THERMAL MANAGEMENT SYSTEM

(75) Inventor: Jeffrey Fleisig, Bloomfield, NJ (US)

(73) Assignee: PUCline LLC, Venice, CA (US)

( * ) Notice: Subject to any disclaimer, the term of this patent is extended or adjusted under 35 U.S.C. 154(b) by 0 days.

(21) Appl. No.: 12/586,737

(22) Filed: Sep. 25, 2009

(65) Prior Publication Data

US 2011/0076879 A1     Mar. 31, 2011

(51) Int. Cl.
*H01R 13/72*     (2006.01)
(52) U.S. Cl. ........................ 439/501; 439/535
(58) Field of Classification Search .......... 439/135–136, 439/142–143, 501, 535; 191/12.4
See application file for complete search history.

(56) References Cited

U.S. PATENT DOCUMENTS

| | | |
|---|---|---|
| 4,107,399 A | 8/1978 | Claxton |
| 4,124,261 A | 11/1978 | Klaus |
| 4,163,592 A | 8/1979 | Nelson |
| 4,373,761 A | 2/1983 | Hansberry, Jr. |
| 4,384,758 A | 5/1983 | Lee et al. |
| 4,427,252 A | 1/1984 | Lee et al. |
| 4,468,083 A | 8/1984 | Lee et al. |
| 4,470,539 A | 9/1984 | Skillen |
| D288,920 S | 3/1987 | Oesterheld et al. |
| D290,598 S | 6/1987 | Jaffe et al. |
| D290,836 S | 7/1987 | Oesterheld et al. |

(Continued)

OTHER PUBLICATIONS

Online product advertisement entitled 'Kangaroom Black Box Cord Organizer', http://kangaroomstorage.com/product/charging-%2B-orga..., pp. 1 and 2. 2009.

(Continued)

*Primary Examiner* — Khiem Nguyen
(74) *Attorney, Agent, or Firm* — Thomas J. Perkowski, Esq., P.C.

(57) ABSTRACT

An electrical power supplying device for supplying electrical power to a group of electrical appliances located in an environment, includes a power supply cord for plugging into a standard power receptacle by way of a supply power plug, and also a base housing portion having a bottom surface. A power-ring subassembly is supported on the base housing portion, has a central aperture defining the boundaries of a 3D interior volume, and is adapted for supporting a plurality of electrical receptacles and one or more electronic circuits, which are electrically connected to the power supply cord. A power-ring housing portion covers the power-ring subassembly, has a set of plug apertures, is aligned with the electrical receptacles, and allows appliance power plugs associated with the electrical appliances to plug into the electrical receptacles. A power cord portal allows a group of electrical power cords associated with the group of electrical appliances to enter/exit the 3D interior volume in a bundled manner, and the appliance power plugs associated with said group of electrical appliances to be plugged into the electrical receptacles. A cover housing portion is provided and adapted to cover the central aperture of the power-ring subassembly, and conceal appliance power plugs plugged into the electrical receptacles and appliance power cords associated with the electrical appliances. Also, a thermal management subsystem is integrated within the device, so that heat energy, generated by the power adapter plugs and/modules contained within the 3D interior volume, is transferred by air flowing from the 3D interior volume to the external ambient environment.

18 Claims, 63 Drawing Sheets

U.S. PATENT DOCUMENTS

| | | |
|---|---|---|
| 4,731,029 A | 3/1988 | Lerner et al. |
| 4,899,268 A | 2/1990 | Hollinger |
| 4,908,744 A | 3/1990 | Hollinger |
| 5,016,241 A | 5/1991 | Lee et al. |
| 5,083,935 A | 1/1992 | Herman |
| D323,643 S | 2/1992 | Lee |
| 5,100,348 A | 3/1992 | Herman et al. |
| D326,257 S | 5/1992 | Lee et al. |
| D328,249 S | 7/1992 | Lee |
| D328,280 S | 7/1992 | Lee |
| D328,452 S | 8/1992 | Lee |
| D329,223 S | 9/1992 | Lee |
| D332,216 S | 1/1993 | Lee et al. |
| D332,398 S | 1/1993 | Lee et al. |
| 5,266,057 A | 11/1993 | Angel, Jr. et al. |
| D342,937 S | 1/1994 | Angel, Jr. et al. |
| D347,825 S | 6/1994 | Zarnowitz et al. |
| D349,594 S | 8/1994 | Bonazza |
| D351,342 S | 10/1994 | Lee et al. |
| 5,382,172 A | 1/1995 | Klier et al. |
| D356,297 S | 3/1995 | Carl et al. |
| D360,191 S | 7/1995 | Carl et al. |
| D360,400 S | 7/1995 | Pitcher |
| D366,862 S | 2/1996 | Lee |
| D366,863 S | 2/1996 | Lee |
| D366,864 S | 2/1996 | Lee |
| D367,036 S | 2/1996 | Lee |
| 5,529,513 A | 6/1996 | Lee |
| D371,762 S | 7/1996 | Lee |
| D372,193 S | 7/1996 | Lee |
| 5,538,385 A | 7/1996 | Bacchi et al. |
| D374,655 S | 10/1996 | Carl et al. |
| D374,862 S | 10/1996 | Lee |
| 5,564,942 A | 10/1996 | Lee |
| D376,580 S | 12/1996 | Lee |
| 5,589,718 A | 12/1996 | Lee |
| 5,596,479 A | 1/1997 | Campbell et al. |
| D380,963 S | 7/1997 | Lee |
| 5,655,725 A | 8/1997 | Kroger |
| D384,579 S | 10/1997 | Lee |
| D387,733 S | 12/1997 | Lee |
| D388,765 S | 1/1998 | Pitcher |
| D389,402 S | 1/1998 | Lee |
| D392,942 S | 3/1998 | Lee |
| D392,959 S | 3/1998 | Edwards |
| 5,736,673 A | 4/1998 | Lee |
| 5,741,113 A | 4/1998 | Bacchi et al. |
| D395,407 S | 6/1998 | Dwight |
| 5,765,444 A | 6/1998 | Bacchi et al. |
| D396,632 S | 8/1998 | Lee |
| D396,689 S | 8/1998 | Karten et al. |
| D396,986 S | 8/1998 | Robinson et al. |
| 5,792,986 A | 8/1998 | Lee |
| D399,123 S | 10/1998 | Dwight |
| D400,096 S | 10/1998 | Lee |
| D401,136 S | 11/1998 | Derman |
| 5,852,413 A | 12/1998 | Bacchi et al. |
| D404,716 S | 1/1999 | Lee |
| D405,050 S | 2/1999 | Lee |
| D405,056 S | 2/1999 | Lee |
| D405,057 S | 2/1999 | Martin et al. |
| D405,367 S | 2/1999 | Lee et al. |
| D405,368 S | 2/1999 | Lee |
| D405,688 S | 2/1999 | Lee et al. |
| D406,753 S | 3/1999 | Lee |
| D407,378 S | 3/1999 | Lee |
| 5,875,893 A | 3/1999 | Lee et al. |
| D412,314 S | 7/1999 | Lee |
| 5,924,892 A | 7/1999 | Ferracina |
| 5,944,476 A | 8/1999 | Bacchi et al. |
| D415,101 S | 10/1999 | Martin |
| D415,111 S | 10/1999 | Lee |
| 5,984,717 A | 11/1999 | Lee |
| 5,988,569 A | 11/1999 | Zhang et al. |
| 6,011,221 A | 1/2000 | Lecinski et al. |
| 6,017,228 A | 1/2000 | Verbeek et al. |
| D420,331 S | 2/2000 | Martin et al. |
| 6,039,591 A | 3/2000 | Marsh et al. |
| D425,028 S | 5/2000 | Lee |
| D425,487 S | 5/2000 | Lee |
| D427,971 S | 7/2000 | Lee |
| D429,217 S | 8/2000 | Lee |
| D429,218 S | 8/2000 | Lee |
| D430,108 S | 8/2000 | Lee |
| 6,098,484 A | 8/2000 | Bacchi et al. |
| 6,105,454 A | 8/2000 | Bacchi et al. |
| 6,111,202 A | 8/2000 | Martin |
| D430,541 S | 9/2000 | Lee et al. |
| 6,126,381 A | 10/2000 | Bacchi et al. |
| 6,129,568 A | 10/2000 | Mercurio et al. |
| 6,141,221 A | 10/2000 | Tong et al. |
| D434,009 S | 11/2000 | Lee |
| D435,558 S | 12/2000 | Tong et al. |
| 6,155,768 A | 12/2000 | Bacchi et al. |
| 6,160,265 A | 12/2000 | Bacchi et al. |
| D436,109 S | 1/2001 | Tong et al. |
| 6,176,716 B1 | 1/2001 | Mercurio et al. |
| D440,203 S | 4/2001 | Ewing et al. |
| D440,942 S | 4/2001 | Ewing et al. |
| D441,343 S | 5/2001 | Lee |
| D442,550 S | 5/2001 | Tong et al. |
| D442,916 S | 5/2001 | Tong et al. |
| 6,227,914 B1 | 5/2001 | Lee et al. |
| 6,236,576 B1 | 5/2001 | Munk-Nielsen |
| D443,249 S | 6/2001 | Lee |
| D443,250 S | 6/2001 | Lee |
| D443,589 S | 6/2001 | Tong et al. |
| D443,591 S | 6/2001 | Tong et al. |
| D443,858 S | 6/2001 | Treiger et al. |
| D444,450 S | 7/2001 | Lee |
| D444,770 S | 7/2001 | Tong et al. |
| D445,091 S | 7/2001 | Tong et al. |
| D445,400 S | 7/2001 | Tong et al. |
| D445,401 S | 7/2001 | Tong et al. |
| D445,766 S | 7/2001 | Solomon |
| D446,189 S | 8/2001 | Lee |
| D446,503 S | 8/2001 | Lee |
| D446,504 S | 8/2001 | Lee |
| D447,118 S | 8/2001 | Lee |
| D447,119 S | 8/2001 | Lee |
| D447,120 S | 8/2001 | Lee |
| D447,745 S | 9/2001 | Lee |
| D450,296 S | 11/2001 | Lee |
| D450,297 S | 11/2001 | Lee |
| 6,315,604 B1 | 11/2001 | Lee |
| 6,341,979 B1 | 1/2002 | Yamamoto |
| D453,322 S | 2/2002 | Lee |
| D453,496 S | 2/2002 | Lee |
| D456,009 S | 4/2002 | Tong et al. |
| D456,362 S | 4/2002 | Lee |
| D456,363 S | 4/2002 | Lee |
| 6,369,999 B1 | 4/2002 | Wohlgemuth et al. |
| D457,059 S | 5/2002 | Macrae |
| D458,608 S | 6/2002 | Tong et al. |
| D459,219 S | 6/2002 | Lee |
| 6,406,313 B1 | 6/2002 | Victor |
| 6,410,855 B1 | 6/2002 | Berkowitz et al. |
| 6,410,994 B1 | 6/2002 | Jones et al. |
| 6,425,543 B1 | 7/2002 | King |
| D463,373 S | 9/2002 | Lee |
| 6,456,091 B1 | 9/2002 | Lee et al. |
| 6,462,953 B2 | 10/2002 | Tong et al. |
| 6,473,510 B1 | 10/2002 | Marsh |
| D465,456 S | 11/2002 | Lee |
| 6,483,200 B1 | 11/2002 | Jacobs |
| 6,486,407 B1 | 11/2002 | Hawker et al. |
| D466,405 S | 12/2002 | Lee |
| D467,226 S | 12/2002 | Lee |
| D467,227 S | 12/2002 | Lee |
| D467,246 S | 12/2002 | Macrae |
| D467,552 S | 12/2002 | Mori et al. |
| D467,877 S | 12/2002 | Mori et al. |
| D467,879 S | 12/2002 | Lee |
| 6,497,382 B2 | 12/2002 | King |
| D468,262 S | 1/2003 | Lee |
| D468,263 S | 1/2003 | Lee |
| D468,689 S | 1/2003 | Lee |

| | | |
|---|---|---|
| 6,504,468 B2 | 1/2003 | Lee et al. |
| 6,505,566 B1 | 1/2003 | Foster et al. |
| D470,047 S | 2/2003 | Lee et al. |
| D471,442 S | 3/2003 | Lee |
| D471,870 S | 3/2003 | Lee |
| D473,194 S | 4/2003 | Lee |
| 6,547,599 B2 | 4/2003 | Kinsey et al. |
| 6,559,893 B1 | 5/2003 | Martin |
| 6,560,102 B1 | 5/2003 | Tong et al. |
| 6,573,617 B2 | 6/2003 | Jones et al. |
| 6,588,609 B1 | 7/2003 | Richet et al. |
| 6,589,073 B2 | 7/2003 | Lee |
| 6,614,636 B1 | 9/2003 | Marsh |
| 6,637,166 B2 | 10/2003 | Kinsey |
| 6,644,993 B2 | 11/2003 | Victor |
| 6,683,770 B1 | 1/2004 | Marsh |
| 6,716,044 B2 | 4/2004 | Bertke |
| D490,779 S | 6/2004 | Lee |
| D492,054 S | 6/2004 | Donegani et al. |
| 6,743,025 B2 | 6/2004 | Howard |
| 6,779,370 B2 | 8/2004 | Bellow, Jr. et al. |
| D496,118 S | 9/2004 | Donegani et al. |
| D498,555 S | 11/2004 | Donegani et al. |
| D502,924 S | 3/2005 | Sirichai et al. |
| D503,152 S | 3/2005 | Suckle et al. |
| D503,153 S | 3/2005 | Suckle et al. |
| D504,064 S | 4/2005 | Lee et al. |
| D504,112 S | 4/2005 | Suckle et al. |
| D505,390 S | 5/2005 | Lee et al. |
| D505,657 S | 5/2005 | Suckle et al. |
| D506,184 S | 6/2005 | Sirichai et al. |
| D506,726 S | 6/2005 | Suckle et al. |
| 6,907,686 B2 | 6/2005 | Symons |
| D507,540 S | 7/2005 | Suckle |
| 6,921,284 B2 | 7/2005 | Sirichai et al. |
| D508,232 S | 8/2005 | Suckle et al. |
| D509,185 S | 9/2005 | Suckle et al. |
| D509,727 S | 9/2005 | Suckle et al. |
| D510,091 S | 9/2005 | Mori et al. |
| 6,941,395 B1 | 9/2005 | Galang et al. |
| D510,572 S | 10/2005 | Lee et al. |
| D510,907 S | 10/2005 | Suckle et al. |
| D511,501 S | 11/2005 | Lee et al. |
| 6,966,791 B1 | 11/2005 | Farr |
| D512,381 S | 12/2005 | Sirichai et al. |
| D512,718 S | 12/2005 | Mori et al. |
| 6,971,254 B2 | 12/2005 | Bellow, Jr. et al. |
| D513,408 S | 1/2006 | Suckle |
| D513,409 S | 1/2006 | Suckle |
| D514,523 S | 2/2006 | Lee et al. |
| D514,524 S | 2/2006 | Suckle |
| D515,508 S | 2/2006 | Lee |
| D516,032 S | 2/2006 | Suckle et al. |
| D517,497 S | 3/2006 | Lee |
| D517,984 S | 3/2006 | Suckle et al. |
| D519,079 S | 4/2006 | Suckle |
| D519,464 S | 4/2006 | Suckle et al. |
| D519,465 S | 4/2006 | Sirichai et al. |
| 7,025,627 B2 | 4/2006 | Rosenthal et al. |
| D519,837 S | 5/2006 | Sturk et al. |
| D519,933 S | 5/2006 | Suckle et al. |
| D519,934 S | 5/2006 | Wada et al. |
| D520,457 S | 5/2006 | Wada et al. |
| D520,458 S | 5/2006 | Wada et al. |
| D520,460 S | 5/2006 | Wadsworth et al. |
| D520,951 S | 5/2006 | Mori et al. |
| D521,452 S | 5/2006 | Mori et al. |
| D521,860 S | 5/2006 | Lee et al. |
| D523,750 S | 6/2006 | Lee et al. |
| D524,642 S | 7/2006 | Suckle et al. |
| D524,759 S | 7/2006 | Wada et al. |
| 7,077,693 B1 | 7/2006 | Symons |
| 7,080,812 B2 | 7/2006 | Wadsworth et al. |
| 7,083,421 B1 | 8/2006 | Mori |
| 7,097,469 B2 | 8/2006 | Jacobs |
| 7,106,182 B2 | 9/2006 | De Wilde |
| 7,108,533 B2 | 9/2006 | Howard |
| 7,112,097 B1 | 9/2006 | Lam |
| D530,717 S | 10/2006 | Mori et al. |
| 7,140,586 B2 | 11/2006 | Seil et al. |
| D533,063 S | 12/2006 | Lee et al. |
| D535,947 S | 1/2007 | Suckle et al. |
| 7,167,372 B2 | 1/2007 | Mori et al. |
| D536,303 S | 2/2007 | Suckle et al. |
| D537,780 S | 3/2007 | Suckle |
| D537,784 S | 3/2007 | Suckle et al. |
| D539,735 S | 4/2007 | Suckle |
| D542,123 S | 5/2007 | Symons |
| D543,148 S | 5/2007 | Suckle et al. |
| D543,154 S | 5/2007 | Suckle et al. |
| D543,155 S | 5/2007 | Suckle |
| D543,156 S | 5/2007 | Suckle |
| D543,157 S | 5/2007 | Suckle |
| 7,223,122 B2 | 5/2007 | Mori |
| D543,942 S | 6/2007 | Howard |
| D545,179 S | 6/2007 | Mori et al. |
| 7,233,086 B2 | 6/2007 | Borden et al. |
| 7,236,209 B2 | 6/2007 | Martin |
| D546,811 S | 7/2007 | Neu et al. |
| D547,486 S | 7/2007 | Donegani et al. |
| 7,239,892 B2 | 7/2007 | Martin |
| 7,240,111 B2 | 7/2007 | VanHarlingen et al. |
| 7,242,577 B2 | 7/2007 | Sween et al. |
| 7,247,798 B2 | 7/2007 | Pagoto et al. |
| 7,247,799 B2 | 7/2007 | Mori et al. |
| D549,174 S | 8/2007 | Lee et al. |
| D549,210 S | 8/2007 | Neu et al. |
| D549,557 S | 8/2007 | Mori et al. |
| D549,662 S | 8/2007 | Lee et al. |
| D553,568 S | 10/2007 | Lee et al. |
| 7,286,046 B2 | 10/2007 | Kinsey et al. |
| D556,019 S | 11/2007 | Symons |
| D556,134 S | 11/2007 | Lee et al. |
| 7,292,881 B2 | 11/2007 | Seil et al. |
| 7,293,651 B2 | 11/2007 | Lee et al. |
| D556,689 S | 12/2007 | Lee et al. |
| D557,495 S | 12/2007 | Chan et al. |
| D560,609 S | 1/2008 | Rosenthal et al. |
| 7,318,567 B2 | 1/2008 | Mori et al. |
| 7,318,750 B1 | 1/2008 | Chacon et al. |
| 7,324,334 B2 | 1/2008 | Sween et al. |
| D561,093 S | 2/2008 | Sween et al. |
| D561,094 S | 2/2008 | Sween et al. |
| D561,687 S | 2/2008 | Sween et al. |
| D561,762 S | 2/2008 | Mori et al. |
| 7,329,152 B2 | 2/2008 | Mori et al. |
| 7,335,053 B2 | 2/2008 | Avevor et al. |
| D563,872 S | 3/2008 | Lee et al. |
| D563,897 S | 3/2008 | Lee et al. |
| D563,898 S | 3/2008 | Lee et al. |
| D563,899 S | 3/2008 | Goetz et al. |
| D564,447 S | 3/2008 | Lee et al. |
| 7,361,050 B2 | 4/2008 | Mori et al. |
| D570,598 S | 6/2008 | Chan |
| D570,788 S | 6/2008 | Lee et al. |
| D570,789 S | 6/2008 | Lee et al. |
| D571,733 S | 6/2008 | Seil |
| 7,381,095 B2 | 6/2008 | Freeman et al. |
| 7,385,403 B2 | 6/2008 | Ferrer et al. |
| D572,230 S | 7/2008 | Neu et al. |
| D573,103 S | 7/2008 | Lee et al. |
| 7,397,654 B2 | 7/2008 | Mori |
| 7,399,199 B2 | 7/2008 | Symons |
| 7,399,200 B1 | 7/2008 | Eliseo ................. 13/60 |
| 7,399,201 B1 | 7/2008 | Khorsand ........... 13/72 |
| 7,413,155 B2 | 8/2008 | Seil et al. |
| D576,030 S | 9/2008 | Lee et al. |
| D576,166 S | 9/2008 | Mori et al. |
| D576,553 S | 9/2008 | Lee et al. |
| D577,577 S | 9/2008 | Lee et al. |
| 7,429,197 B2 | 9/2008 | Weis et al. |
| 7,432,619 B2 | 10/2008 | Voll et al. |
| 7,435,901 B2 | 10/2008 | Mori et al. |
| 7,436,087 B2 | 10/2008 | Borden et al. |
| 7,438,567 B2 | 10/2008 | Nalwad et al. |
| 7,442,090 B2 | 10/2008 | Mori et al. |
| D580,441 S | 11/2008 | Mori |
| D581,669 S | 12/2008 | Sween et al. |

| | | |
|---|---|---|
| 7,461,941 B2 | 12/2008 | Martin |
| D584,225 S | 1/2009 | Lee et al. |
| D585,836 S | 2/2009 | Lee et al. |
| D587,246 S | 2/2009 | Neu et al. |
| 7,484,990 B1 | 2/2009 | Lee et al. |
| D588,000 S | 3/2009 | Goetz et al. |
| D588,065 S | 3/2009 | Wadsworth et al. |
| D588,442 S | 3/2009 | Chong et al. |
| D588,546 S | 3/2009 | Lee et al. |
| D588,547 S | 3/2009 | Lee et al. |
| D588,549 S | 3/2009 | Lee et al. |
| D588,904 S | 3/2009 | Chong et al. |
| D589,456 S | 3/2009 | Puluc et al. |
| 7,498,687 B2 | 3/2009 | Kinsey et al. |
| 7,501,580 B2 | 3/2009 | Pagoto et al. |
| 7,510,420 B2 | 3/2009 | Mori |
| 7,518,265 B2 | 4/2009 | Roepke |
| D593,034 S | 5/2009 | Mori et al. |
| D593,954 S | 6/2009 | Lee et al. |
| 2002/0189848 A1 | 12/2002 | Hawker et al. |
| 2003/0066936 A1 | 4/2003 | Beck et al. |
| 2003/0121742 A1 | 7/2003 | Hardy |
| 2003/0188880 A1 | 10/2003 | McClellan et al. |
| 2004/0160150 A1 | 8/2004 | Hay et al. |
| 2006/0065422 A1 | 3/2006 | Broyles ........................ 23/4 |
| 2006/0196995 A1 | 9/2006 | Mori et al. |
| 2006/0276077 A1 | 12/2006 | Mori ............................ 13/60 |
| 2007/0039755 A1 | 2/2007 | Mori et al. |
| 2007/0111585 A1 | 5/2007 | Mori et al. |
| 2007/0180665 A1 | 8/2007 | Sween et al. |
| 2007/0235222 A1 | 10/2007 | Hubbard |
| 2007/0261874 A1 | 11/2007 | Pagoto et al. ................... 3/4 |
| 2007/0295529 A1 | 12/2007 | Mori et al. |
| 2008/0104427 A1 | 5/2008 | Yee et al. |
| 2008/0111013 A1 | 5/2008 | Suckle et al. |
| 2008/0112152 A1 | 5/2008 | Figueroa et al. |
| 2008/0113563 A1 | 5/2008 | Roepke et al. |
| 2008/0194139 A1 | 8/2008 | Chan |
| 2008/0302687 A1 | 12/2008 | Sirichai et al. |
| 2008/0315734 A1 | 12/2008 | Birsel et al. |

OTHER PUBLICATIONS

Online product advertisement entitled 'Cable Management the Easy Way', http://cableorganizer.com/, pp. 1 through 4. 2009.
Online product advertisement entitled 'Hardwood Electrics', http://ihwe.com/cordboxes/, pp. 1 and 2. 2009.
Online product advertisement entitled 'The Sanctuary Power Charger Station and Desk Valet', http://cableorganizer.com/blue-lounge-designs/sanctuary.html, pp. 1 through 10. 2009.
"PowerPod", Steelcase, Inc., two pages, 2010.
"Power + Trashcan", Greg Fulco Products, one page, 2010.
"Surge3000 Calamari Edition: Surge Protector", Trident Design, LLC, Powersquid.com, two pages, 2009.
"Wardrobe valley with surge protector", Comfort House, Inc., one page, 2010.
"Spy Box", Marek Wertglorz, www.coroflot.com, 1 page, 2009.
"Sail", Marek Wenglorz, www.coroflot.com, 1 page, 2009.
"Projectors Galore", http://high-tech-360.blogspot.com/2009/05/projectors-galore.html, 3 pages, Jul. 1, 2010.
"Donut", Ramei Keum, www.rameikeum.com, 2 pages, 2008.
"Donut Power Strip", www.yankodesign.com/2008/10/28/donut-power-strip, 4 pages, Oct. 28, 2008.
Search Report for PCT Application No. PCT/US2010/050391 completed Jan. 21, 2011.

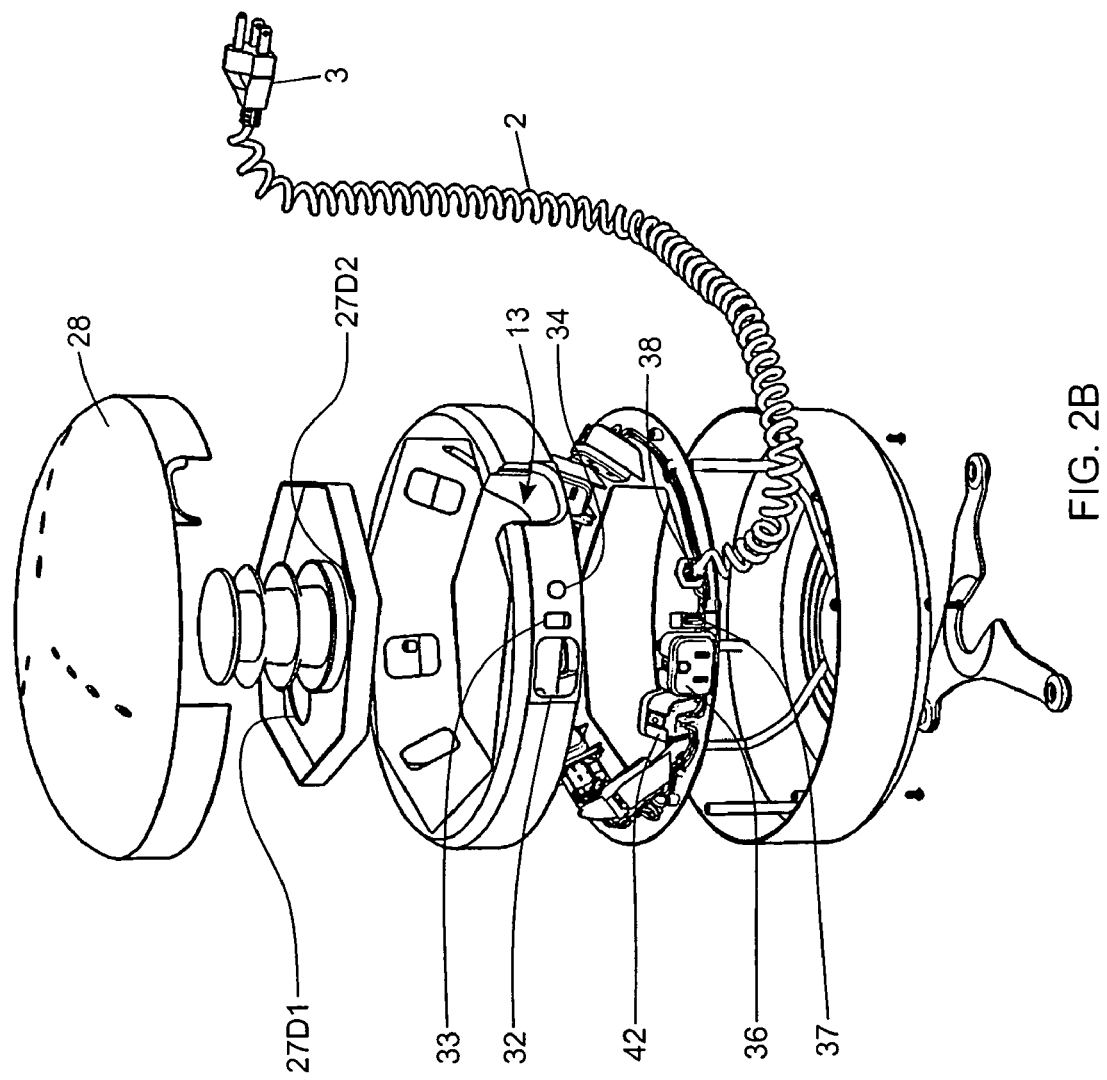

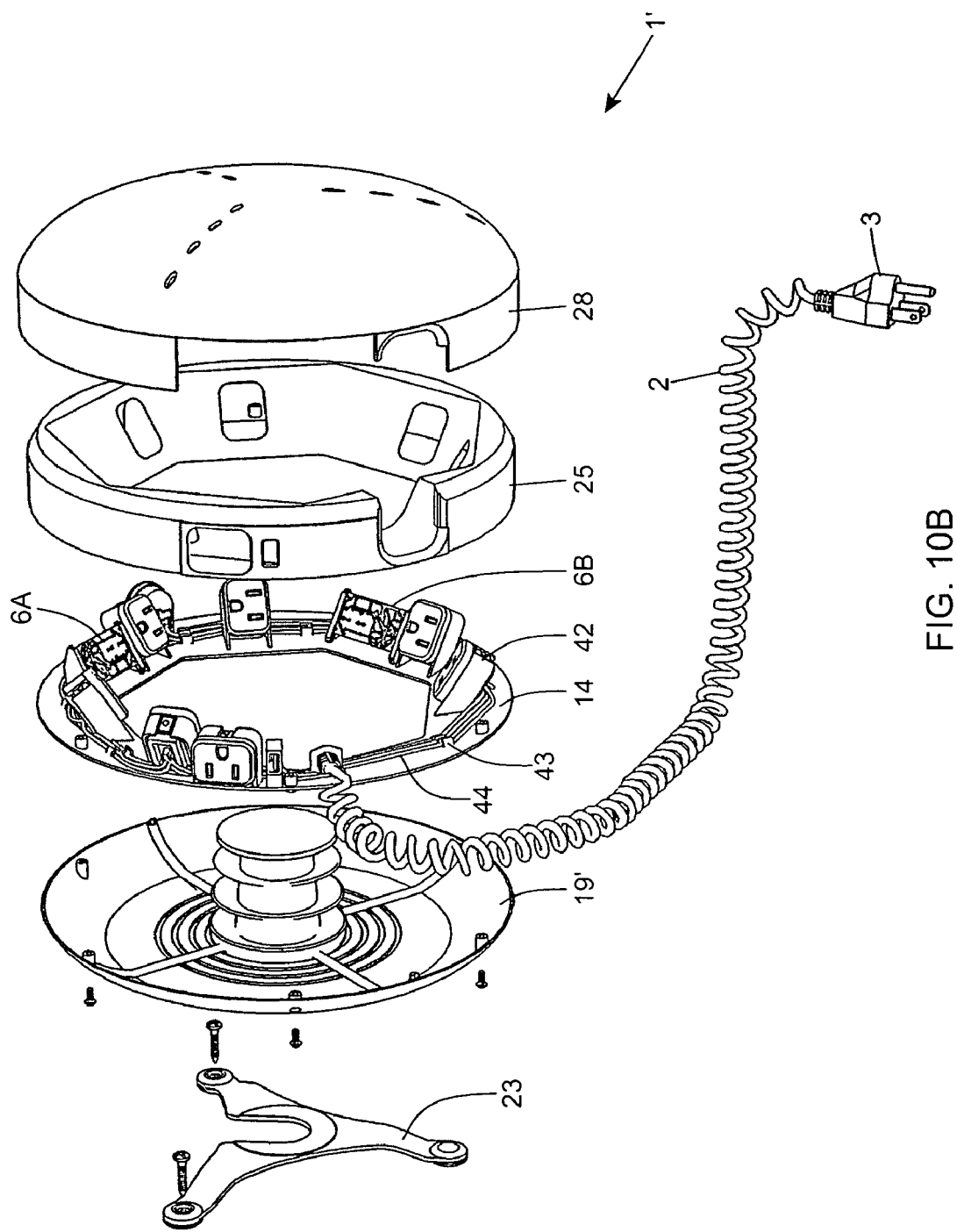

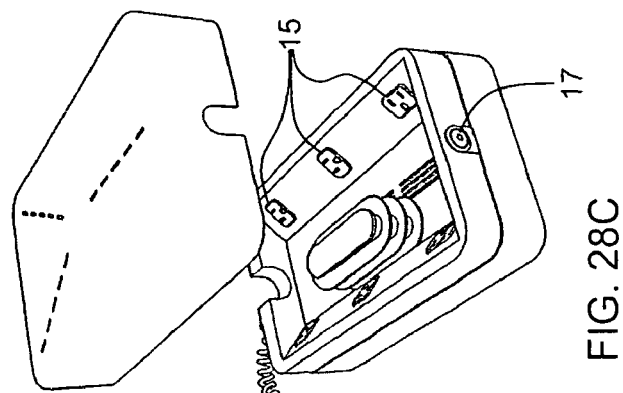
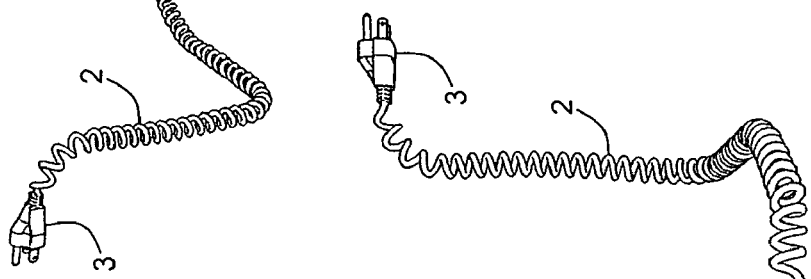
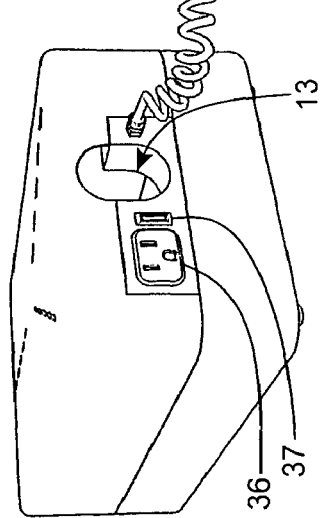
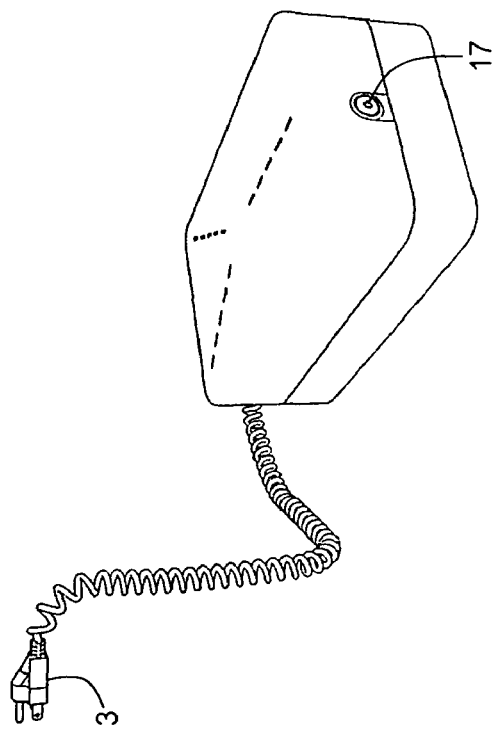
FIG. 28A
FIG. 28B
FIG. 28C

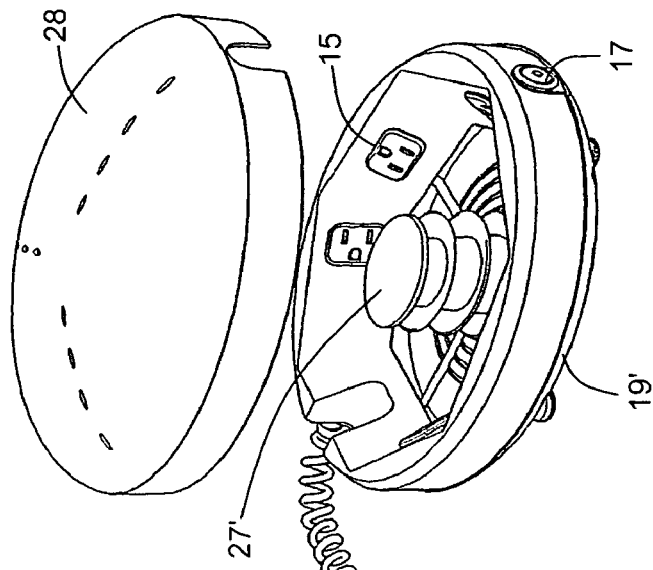
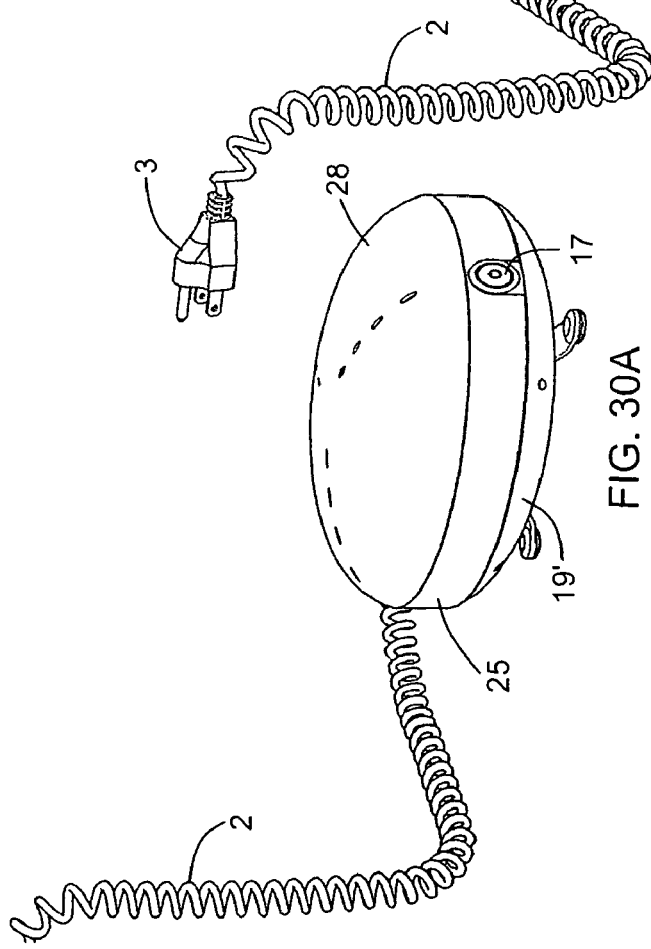
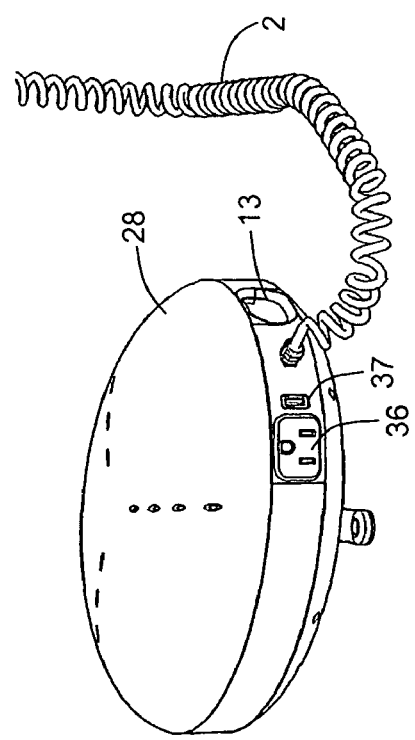

ELECTRICAL POWER SUPPLYING DEVICE HAVING A RING-LIKE STRUCTURE FOR RECEIVING THE POWER PLUGS AND/OR POWER ADAPTERS ASSOCIATED WITH A PLURALITY OF ELECTRICAL APPLIANCES, AND AN INTEGRATED THERMAL MANAGEMENT SYSTEM

BACKGROUND OF INVENTION

1. Field of Invention

The present invention relates to new and improved methods of and apparatus for supplying electrical power to electrical appliances and managing the power cords and concealing the power adapters associated therewith in diverse environments, such as desktop workstations, countertop workstations, retail point of sale (POS) stations, and the like.

2. Brief Description of the State of Knowledge in the Art

The use of electrical appliances having power cords and adapters is well known in the contemporary period. In any given work environment, such as a home office desk, countertop workstation or retail POS station, electrical power cords and associated power adapter plugs and mid-line type modules are often strewn about, creating a "rats' nest" type of environment, which is not only aesthetically unpleasant, but potentially hazardous, posing all sorts of risks to human beings inhabiting the environment.

Hitherto, numerous efforts have been made to manage the power cords and conceal the power adapters of electrical appliances employed in diverse environments. Examples of devices for this purpose are disclosed in U.S. Pat. Nos. 7,518,265; 7,501,580; 7,442,090; 7,436,087; 7,435,901; 7,399,199; 7,397,654; 7,361,050; 7,335,053; 7,329,152; 7,324,334; 7,318,567; 7,247,799; 7,247,798; 7,242,577; 7,239,892; 7,233,086; 7,223,122; 7,167,372; 7,083,421; 7,077,693; 6,966,791; 6,573,617; 6,486,407; 6,410,855; 6,315,604; 6,011,221; 5,589,718; 5,382,172; 4,731,029; 4,373,761; 2007/0235222; 2007/0111585; 2004/0160150; 2003/0121742; 2003/0066936; 20080113563; 20080111013; 20080302687; 20080194139; 20070180665; 20070111585; 20070295529; 20070039755; 20060196995 and D588,000; D560,609; D547,486; D542,123; D533,063; D520,951; D504,112; D502,924; D467,879; D467,877; D467,552; D467,246; D447,119; D446,504; D446,503; D446,189; D445,401; D445,400; D444,450; D443,591; wherein each said patent publication above is incorporated herein by reference.

While the above US Patents disclose various kinds of devices for the purpose of supplying electrical power to appliances and managing the power cords and power adapters thereof, the designs of the devices disclosed and proposed in such Patents do not make power cord management and power adapter concealment easy, and, in contrast, oftentimes impossible, when working with a relatively large number of electrical appliances in a given work environment. Consequently, the "rats' nest" problem is not sufficiently resolved in most applications, and results in power cable lengths which are not minimized along their designated routes in the workspace or environment, and many power adapters and unused electrical receptacles are not concealed in an aesthetically pleasing manner.

Therefore, there is a great need in the art for a new and improved method of and apparatus for supplying electrical power to electrical appliances, managing the excess length of appliance power cords, and concealing their power plugs and adapters in diverse environments, while overcoming the shortcomings and drawbacks of prior art methods and apparatus.

OBJECTS AND SUMMARY OF THE PRESENT INVENTION

It is therefore a primary object of the present invention to provide a new and improved method of and apparatus for supplying electrical power to electrical appliances and managing the power cords and concealing the power adapters associated therewith and unused electrical receptacles deployed in diverse environments, such as workstations, playstations, entertainment stations, retail POS stations, hotel rooms, guest rooms, cubicles, kitchens, traditional offices and wherever a multitude of power outlets are required, while overcoming the shortcomings and drawbacks of prior art methods and apparatus.

Another object of the present invention is to provide such an apparatus in the form of an electrical power supplying device (i) adapted for either floor, wall, shelf or inverted mounting, (ii) having a ring-like power supplying structure provided with a central aperture and supporting a plurality of electrical power receptacles for supplying electrical power to a plurality of electrical appliances, (iii) containing power plugs, power adapter plugs and/or mid-line type power adapter modules, and (iv) managing the excess length of power cords associated therewith.

Another object of the present invention is to provide such an electrical power supplying device, wherein a power cord management dowel is disposed within the aperture of the ring-like power supplying structure, for taking up the excess length of power cords associated with such electrical appliances, while allowing the remaining portion of such power cords to pass through a power cord portal, and extend along a route to their corresponding electrical appliances.

Another object of the present invention is to provide such an electrical power supplying device, wherein a power plug is integrated with the housing, for plugging directly into a standard electrical power outlet mounted in a wall surface, and receiving electrical power therefrom to supply to a plurality of electrical appliances whose power cords are plugged into the power receptacles mounted on the ring-like structure.

Another object of the present invention is to provide such an electrical power supplying device, wherein electrical power plugs, power adapter plugs and power adapter modules/blocks are completely concealed behind a removable cover housing portion, to restrict unauthorized access thereto by children.

Another object of the present invention is to provide such an electrical power supplying device, which safely conceals and protects electrical power plugs, power adapter plugs and mid-line type power adapter modules/blocks, from liquid spills in diverse environments, such as at workstations, playstations, retail POS stations, hotels, guest rooms, cubicles, kitchens, traditional offices and wherever a multitude of power outlets are required.

Another object of the present invention is to provide such an electrical power supplying device, which allows excess power cords to be easily managed about a centrally located dowel structure, passing through a ring-like power supplying structure supporting a plurality of electrical power receptacles within a concealed 3D interior volume, while permitting power cords to exit/enter the housing through a power cord portal formed through the housing structure.

Another object of the present invention is to provide such an electrical power supplying device, which employs a ring-like power supplying device within a concealed space for receiving the electrical power plugs of electrical appliances, and within which excess power cord length is neatly managed.

Another object of the present invention is to provide such an electrical power supplying device, which manages the excess length about a centralized dowel structure concealed within a concealed housing, and within which the battery component of a UPS unit is mounted and operably connected to a power-ring subassembly encircling the dowel structure, and supports a plurality of electrical receptacles for supplying electrical power to a plurality of electrical appliances deployed in an environment.

Another object of the present invention is to provide such an electrical power supplying device, wherein a passive-type system of thermal management is employed to maintain the interior temperature within safe limits during operation.

Another object of the present invention is to provide a new and improved method of supplying electrical power to a plurality of electrical appliances, and managing appliance power cords using a single device that may be mounted on the floor, wall or other counter-top surface.

Another object of the present invention is to provide a new and improved method of managing the length of excess power cords of electrical appliances that are routed from a power supply device within an environment.

Another object of the present invention is to provide an electrical power supplying device having a ring-like subassembly for receiving the power plugs and/or power adapters associated with a plurality of electrical appliances, and a housing design for containing and concealing the same during power supply operations.

Another object of the present invention is to provide an electrical power supplying device having a ring-like subassembly for receiving the power plugs and/or power adapters associated with a plurality of electrical appliances, and managing excess power cord length therewithin in a concealed manner.

Another object of the present invention is to provide an electrical power supplying device having a ring-like power assembly for receiving electrical power plugs and/or power adapters associated with a plurality of electrical appliances, and an un-interrupted power supply (ups) unit having a battery component mounted within a centrally-disposed structure passing through a central aperture in a ring-like power assembly.

Another object of the present invention is to provide an electrical power supplying device having a lower deck housing region for containing and concealing a plurality of electrical power adapters associated with a plurality of electrical appliances, as well as unused electrical receptacles, and an upper deck housing region for supporting a ring-like power assembly having a central aperture and receiving the power plugs and/or power adapters of electrical appliances, while managing excess power cord length within a 3D volume passing through said central aperture.

Another object of the present invention is to provide a wall-mountable electrical power supplying device having a ring-like structure for receiving the power plugs and/or power adapters associated with a plurality of electrical appliances, and a housing for containing and concealing the same during power supply operations.

Another object of the present invention is to provide a wall-mountable electrical power supplying device for mounting to a wall surface about a standard wall-mounted power receptacle, using a mounting bracket arranged between the housing and wall surface and an electrical power supply plug integrated with the housing.

Another object of the present invention is to provide a ring-like electrical power supplying structure for receiving the electrical power plugs of a plurality of electrical appliances and powering the same.

Another object of the present invention is to provide an electrical power supplying device which employs a ring-like electrical power supplying structure, and is adapted for mounting vertically, horizontally, diagonally, or in an inverted position, as the application requires or end-user desires.

Another object of the present invention is to provide an electrical power supplying device having a ring-like structure for receiving the power plugs and/or power adapters associated with a plurality of electrical appliances, and thermal management system integrated within the device, for maintaining the temperature within the 3D interior volume of the device within safe operating limits during power supplying operations.

Another object of the present invention is to provide such electrical power supplying device, wherein the thermal management system is realized as an electrically-passive type air ventilation system for passively cooling the 3D interior volume of the device during power supplying operations.

Another object of the present invention is to provide such electrical power supplying device, wherein the thermal management system is realized as an electrically-active type air circulation system for actively forcing cooler air from the ambient environment to flow the device to maintain the temperature within the 3D interior volume thereof within safe operating limits during power supplying operations.

Another object of the present invention is to provide a bracket system for mounting an electrical power supplying device about a power outlet in a wall-surface, or supporting the electrical power supplying device on a horizontal support surface.

Another object of the present invention is to provide a method of managing excess appliance power cord length within an electrical power supplying device while containing a plurality of appliance power plugs and appliance power adapters associated with electrical appliances supported in an environment.

Another object of the present invention is to provide a method of mounting an electrical power supplying structure to a standard wall-mounted electrical power receptacle.

Another object of the present invention is to provide a method of cooling the 3D interior volume of a concealed electrical power supplying device containing power adapters for a plurality of electrical appliances deployed in diverse environments.

Another object of the present invention is to provide a method of supplying electrical power to a plurality of electrical appliances in an environment.

Another object of the present invention is to provide a method of operating an electrical power supplying device in an environment.

Another object of the present invention is to provide a method of assembling an electronic power supplying device.

Another object of the present invention is to provide an apparatus for snap-fit mounting electrical power receptacles and printed circuit boards on a power supplying structure for use in an electrical power supplying device.

These and other objects of invention will become apparent hereinafter and in the Claims to Invention appended hereto.

BRIEF DESCRIPTION OF THE DRAWINGS

In order to more fully understand the Objects of the Present Invention, the following Detailed Description of the Illustrative Embodiments should be read in conjunction with the accompanying figure Drawings in which:

FIG. 2B is a second exploded view of the electrical power supplying device shown in FIGS. 1A and 1B;

FIG. 2C is a third exploded view of the electrical power supplying device shown in FIGS. 1A and 1B, shown from a different perspective to reveal other aspects of the device, including rubber feet provided on the wall-bracket/unit base to prevent sliding on floor surfaces and the like;

FIG. 10B is a second exploded view of the electrical power supplying device shown in FIG. 10A, shown from a different perspective to reveal other aspects of the device;

FIG. 28A is a first perspective view of a fifth illustrative embodiment of the electrical power supplying device of the present invention, having a rectangular-shaped form factor;

FIG. 28B is a second perspective view of the electrical power supplying device shown in FIG. 28A;

FIG. 28C is a third perspective view of the electrical power supplying device of FIG. 28A;

FIG. 30A is a first perspective view of a seventh illustrative embodiment of the electrical power supplying device of the present invention, having a disc-shaped form factor;

FIG. 30B is a second perspective view of the electrical power supplying device shown in FIG. 30A;

FIG. 30C is a third perspective view of the electrical power supplying device of FIG. 30A;

DETAILED DESCRIPTION OF THE ILLUSTRATIVE EMBODIMENTS OF THE PRESENT INVENTION

Figure 1A:
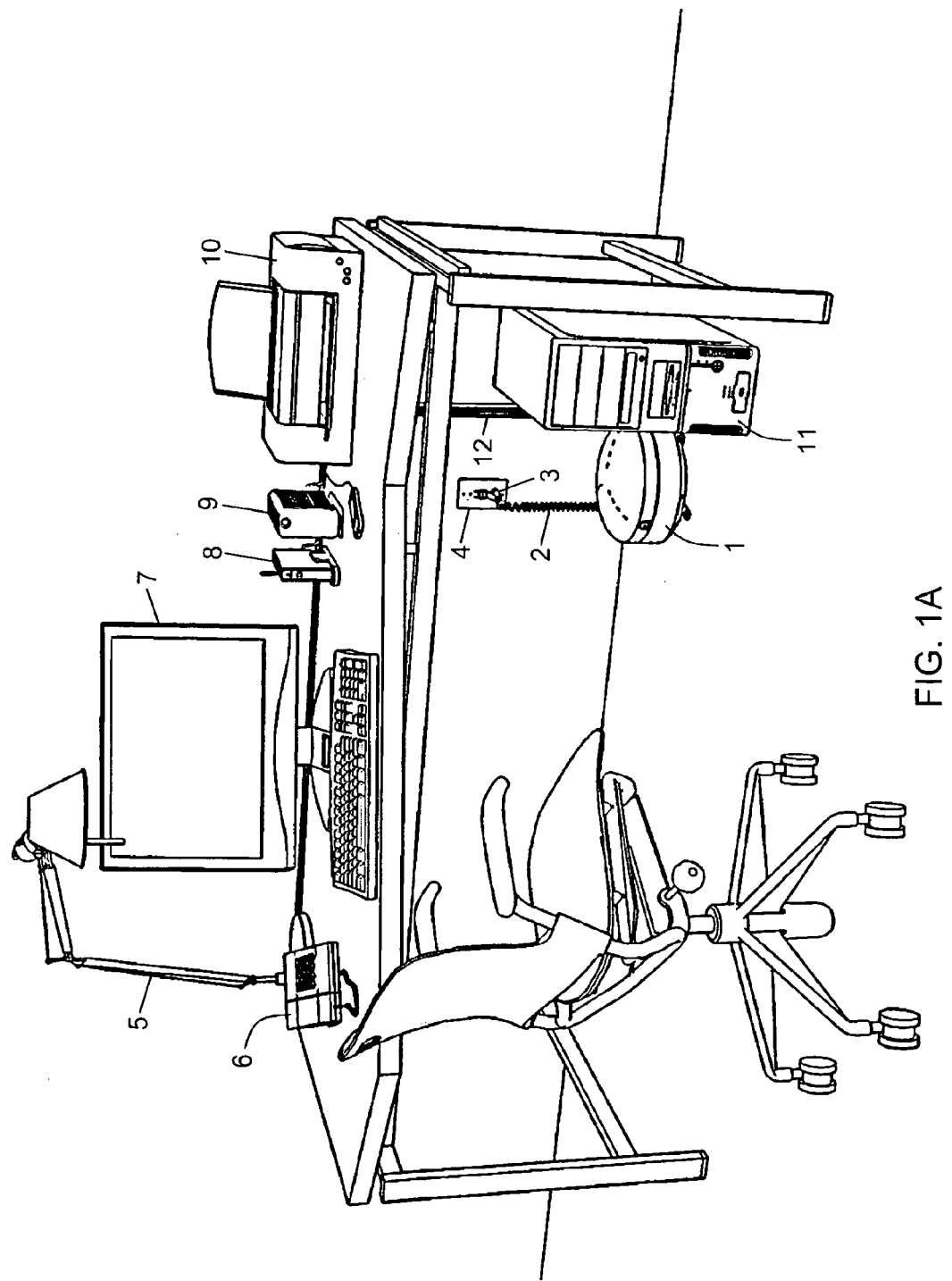
FIG. 1A is a first perspective view of a first environment in which a first illustrative embodiment of the electrical power supplying device of the present invention is deployed on the floor surface to supply electrical power to a number of electrical appliances present within the environment.

In general, the present invention provides a new and improved method of and apparatus for supplying electrical power to electrical-energy consuming appliances, and managing the power cords and concealing the power plugs and power adapters thereof, and unused receptacles, when employed in diverse environments, such as workstations, playstations, entertainment stations, retail POS stations, hotel rooms, guest rooms, cubicles, kitchens, traditional offices and wherever a multitude of power outlets are required, and the like.

In a first illustrative embodiment, depicted in FIGS. 1A through 8, the apparatus is realized in the form of a floor-supported electrical power supplying device 1 that is supplied with electrical power through a flexible coiled power supply cord 2, plugged into a standard 120 Volt power receptacle 4 by power plug 3. In a second illustrative embodiment, depicted in FIGS. 9A through 17E, the apparatus is realized in the form of a wall-supported electrical power supplying device 1' that is supplied with electrical power through a flexible coiled power supply cord 2, also plugged into a 120 Volt power receptacle 4 by its power plug 3. In a third illustrative embodiment, depicted in FIGS. 18A through 25, the apparatus is realized in the form of a wall-supported electrical power supplying device 1", that is provided with an integrated electrical power plug 65 designed to plug directly into a standard 120 Volt wall-supported power receptacle 4, about which the device is mounted using a wall-mounting bracket. In a fourth illustrative embodiment, depicted in FIGS. 26 through 27, the apparatus is realized in the form of a floor/desk/wall-supported electrical power supplying device 1''' that is supplied with electrical power through a flexible coiled power supply cord 3 that is plugged into a standard 120 Volt power receptacle 4, and also includes an integrated uninterrupted power supply (UPS) unit 70 having a backup battery component that is integrated within the central power cord management dowel or post provided in the device. Additional embodiments and uses of the devices of the present invention are disclosed in FIGS. 25A through 30C, described in greater detail hereinafter.

Figure 1B:
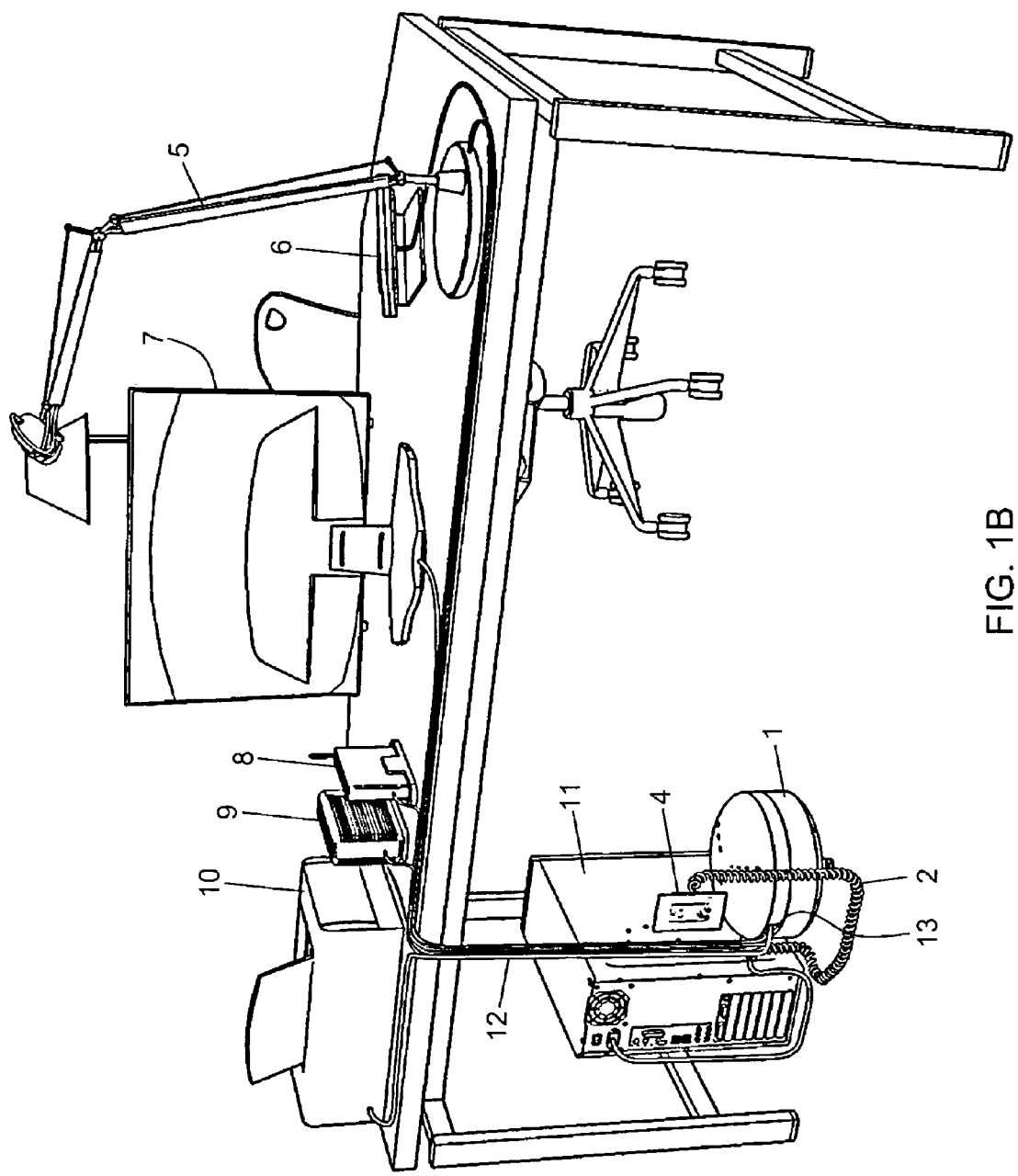
FIG. 1B is a second perspective view of the first embodiment in which the electrical power supplying device shown in FIG. 1A is deployed.

The Electrical Power Supplying Device According to a First Illustrative Embodiment of the Present Invention In FIGS. 1A and 1B, a first environment is shown in which a first illustrative embodiment of the present invention is shown realized in the form of a floor-supported power supplying device 1 that is supplied with electrical power through a flexible power cord 2 whose electrical plug 4 is plugged in a standard electrical power receptacle 4. As shown, a number of different electrical power consuming appliances (e.g. lamp 5, phone 6, LCD 7, WIFI hub 8, backup hard-drive 9, printer 10, and computer CPU 11) are powered by device 1 through a plurality of power cords 12, routed through the environment into the device 1 via its power cord portal 13.

Figure 2A:
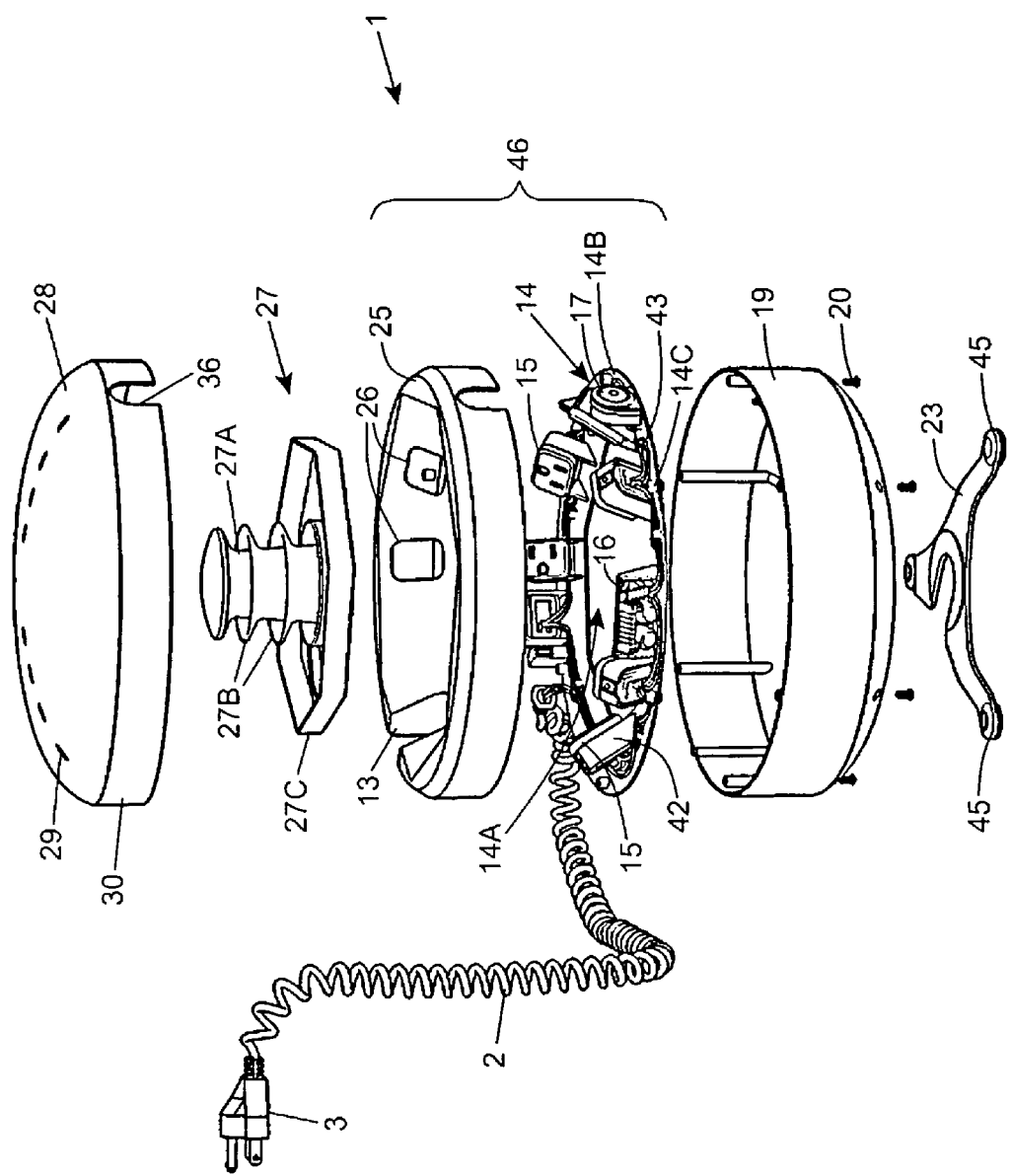
FIG. 2A is a first exploded view of the electrical power supplying device shown in FIGS. 1A and 1B.
Figure 2C:
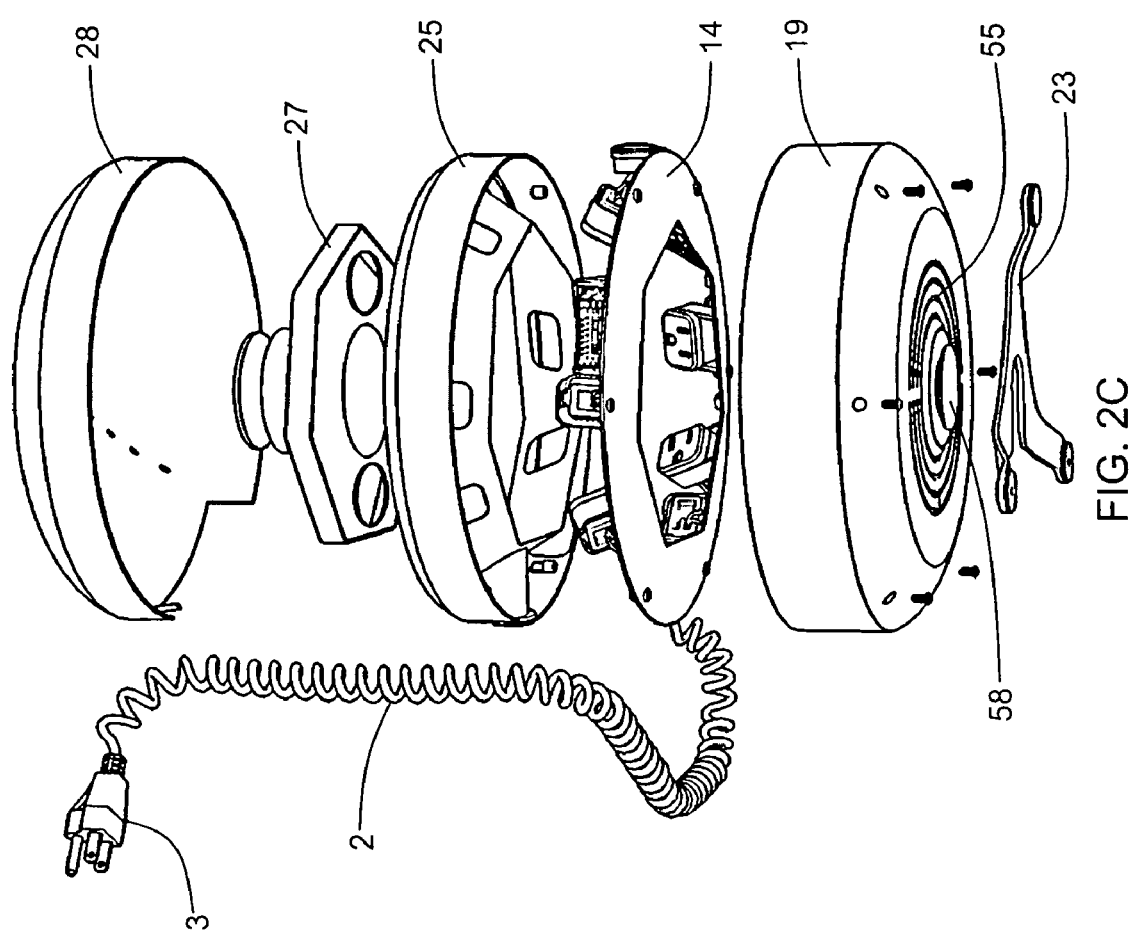

As shown in FIGS. 2A through 2C, the electrical power supplying device 1 comprises an assembly of components, namely: a power-ring subassembly (or ring-like power supplying structure) 14 having a central aperture 14A supporting electrical receptacles 15 and electronic circuits 16, an ON/OFF switch and indicator 17 provided with a glowing LED ring that indicates the state of the device using different glow colors (e.g. Green=READY, Red=NOT READY), and a coiled-type electrical power cord 2 for supplying primary electrical power to the device, and all electrical appliances connected to it, in accordance with the principles of the present invention; a deep-type base tray housing 19 adapted for supporting the power-ring assembly 14 via a set of screws or like fasteners 20, and having geometrical dimensions suitable for holding a group of mid-wire power transformer blocks 21A and 21B, as shown, and provided with air circulation vents 55 on the base panel to allow air currents to flow therethrough during device operation and facilitate cooling of its interior space; a wall-bracket/unit-base 23 having a pair of arms 23A and 23B, and a foot portion 23C, each disposed at 120 degrees from each other, and having a slot 23D for receiving a post portion 58 provided on a rear surface of the base tray housing portion 19; a power-ring housing portion 25 for covering the power-ring subassembly 14 and attaching to the deep base tray housing portion 19, and provided with a set of plug apertures 26 for passing the electrical plugs 45 of power cords associated with appliances to electrical receptacles 15 mounted directly behind the plug apertures, and a power cord portal aperture 13 allowing a group or bundle of electrical power cords associated with a set of electrical appliances, to enter/exit the device, as shown; a dowel tray 27 insertable through the central aperture 14A of the power-ring subassembly 14, and positioned in the central portion of the base housing portion 19, and having a central cord management dowel 27 provided with a set of concentric flanges 27B about its outer surface, for the purpose of taking up and managing in an orderly fashion excess lengths of electrical power cords associated with the appliances receiving power from the device (e.g. by winding the excess length of power cord about the dowel), and also a tray portion 27C disposed about the central dowel and having a pair of apertures 27D1 and 27D2 formed therein for passage of electrical power cord from above the tray portion (upper deck) to below the tray portion 27C (lower deck) where power adapter blocks 21A, 21B are stored in a safe and concealed manner; and a top cover housing portion 28 adapted to slide onto the upper portion of the power-ring housing portion 25 and snap into position, and having (i) air vents 29 for passage of air and providing ventilation to the interior volume of the device, (ii) a set of gripping threads 30 provided along the circumference of the cover housing portion to aid in the lifting the cover as required, and (iii) a first side wall aperture 31 for the passage of electrical cords through the cable portal 13 formed in the power-ring housing cover 25, and (iv) second, third, fourth and fifth side wall apertures 32, 33, 34 and 35 for providing access to the exterior power receptacle 36, USB power port 37, power cord connector 38 and ON/OFF power switch and indicator 17, respectively.

As shown in FIG. 2B, the pair of apertures 27D1 and 27D2 are formed in the dowel tray portion 27C to allow cables to travel between a bottom deck level in the central interior volume 41 of the device where power adapter blocks are stored, and an upper deck level where excess cable length of electrical power cords are wound around the central dowel, to neatly manage electrical cord length in accordance with the principles of the present invention. The port openings 33 and 32 are formed in the sidewall of the power-ring housing portion 25, to provide access to a USB power port 37, and an externally-accessible electrical receptacle 36. As shown, the electrical receptacles 15 and electronic circuit boards 16 are snap-fit mounted into mounting brackets 42 provided on the upper surface of the power-ring assembly 14, along with electrical wiring 43 among electrical and circuit board components, making the necessary interconnections as specified in FIG. 6B. As shown in FIG. 2C, rubber feet 45 are provided on the wall-bracket/unit base 23 to prevent sliding on floor surfaces and the like. Also, the five primary components assemble easily along a common axis, lending the design to easy and cost effective product manufacture, testing, and maintenance.

Figure 3A:
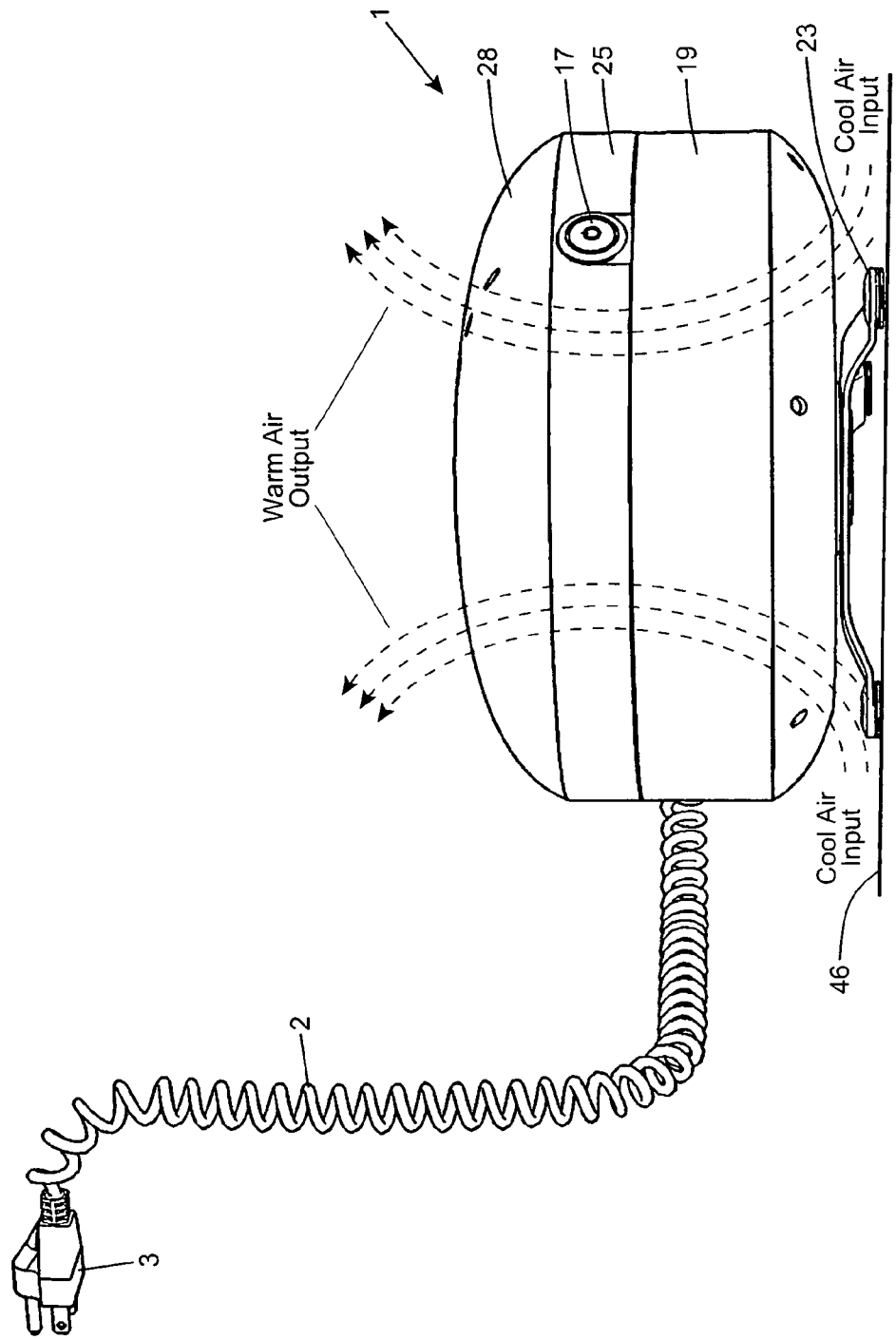
FIG. 3A is a first slide view of the electrical power supplying device shown in FIGS. 2A through 2C.
Figure 3B:
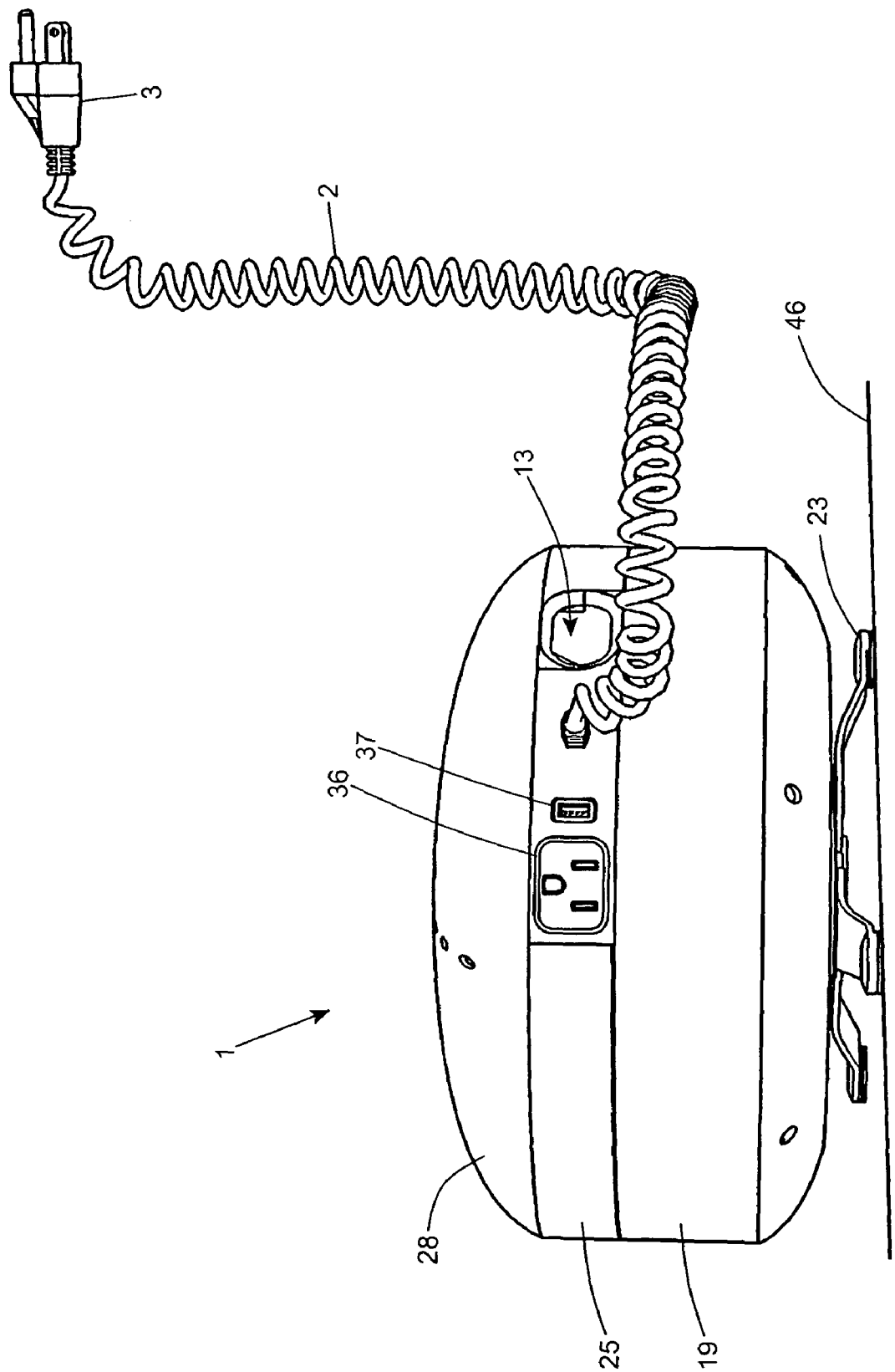
FIG. 3B is a second slide view of the electrical power supplying device shown in FIGS. 2A through 2C, showing the external power receptacle, USB power port, and cable portal.

As shown in FIGS. 3A and 3B, the electrical power supplying device 1 is designed for support on a floor surface, and provides external access to an external power receptacle 36 and a USB power port 37, while a bundle of power cables from electrical appliances enter/exit the cable portal 13 provided on the side of the device of the present invention.

Figure 4:
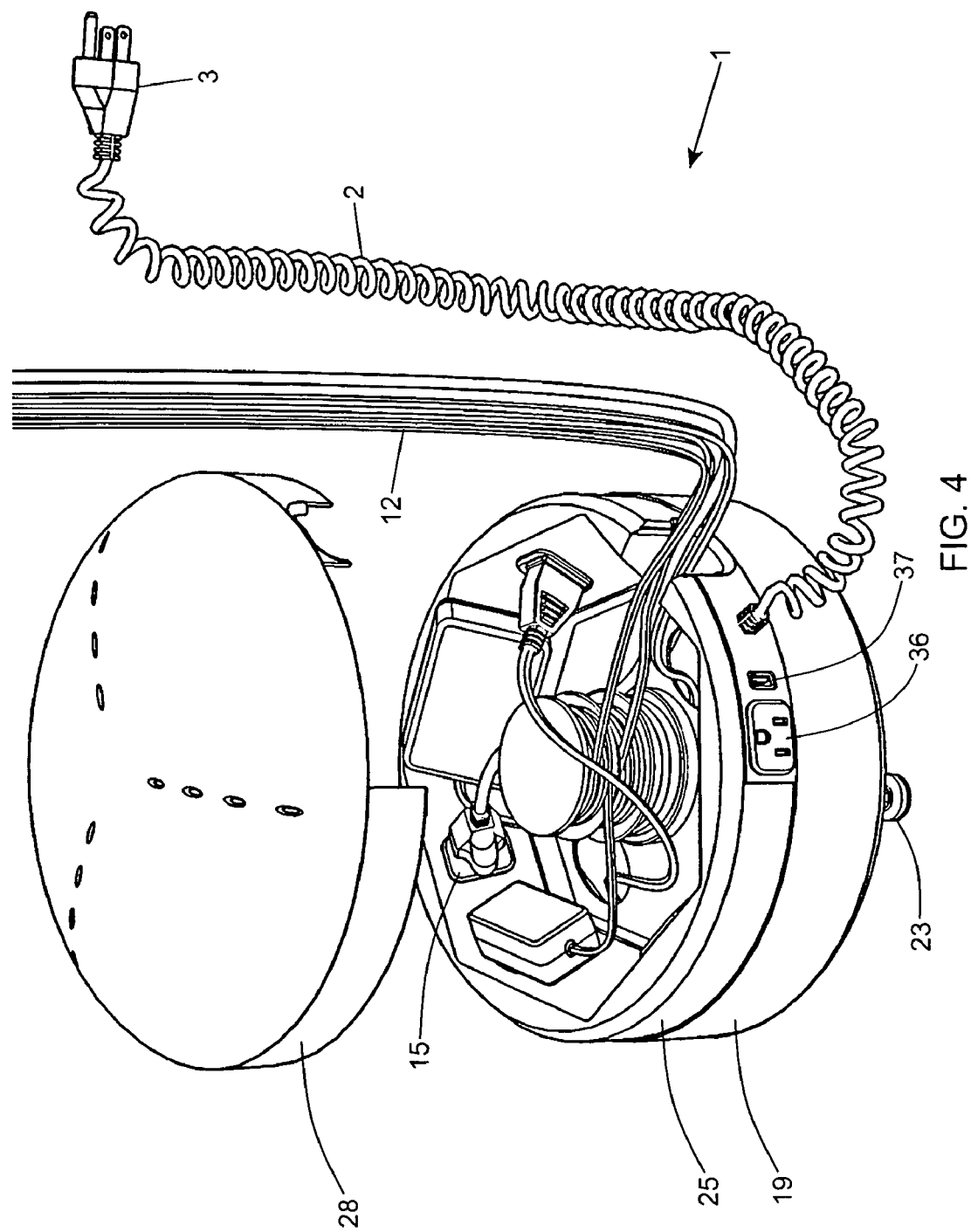
FIG. 4 is a first perspective view of the electrical power supplying device shown in FIGS. 2A through 2C, shown with its cover housing portion lifted off the power-ring housing portion.

As shown in FIG. 4, the cover housing portion 28 can be easily lifted off the power-ring housing portion of the floor-supported power supplying device to reveal a number of features, namely: (i) electrical power provided to a number of electrical appliances supported at the workstation of FIGS. 1A and 1B; (ii) several power adapter blocks supported both above and below the dowel-tray deck; and (iii) the length of a plurality of electrical cords, associated with the electrical appliances, being neatly managed about the cable management dowel 27A in accordance with the principles of the prevent invention, and ultimately extending out the power cord portal 13.

Figure 5:
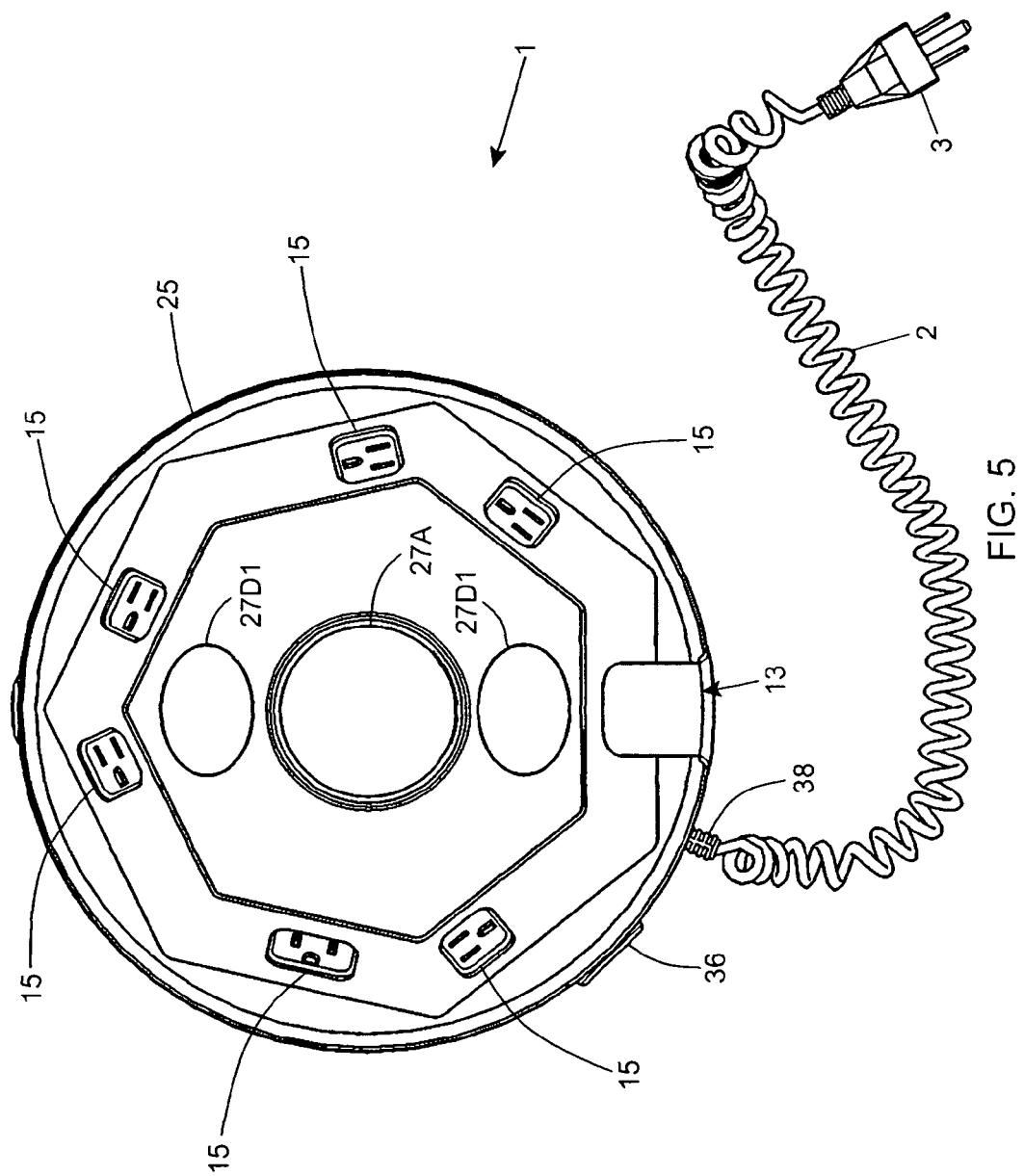
FIG. 5 is a plan view of the electrical power supplying device shown in FIGS. 2A through 2C, shown with its cover housing portion removed and without any electrical appliances being powered by the device.
Figure 7A:
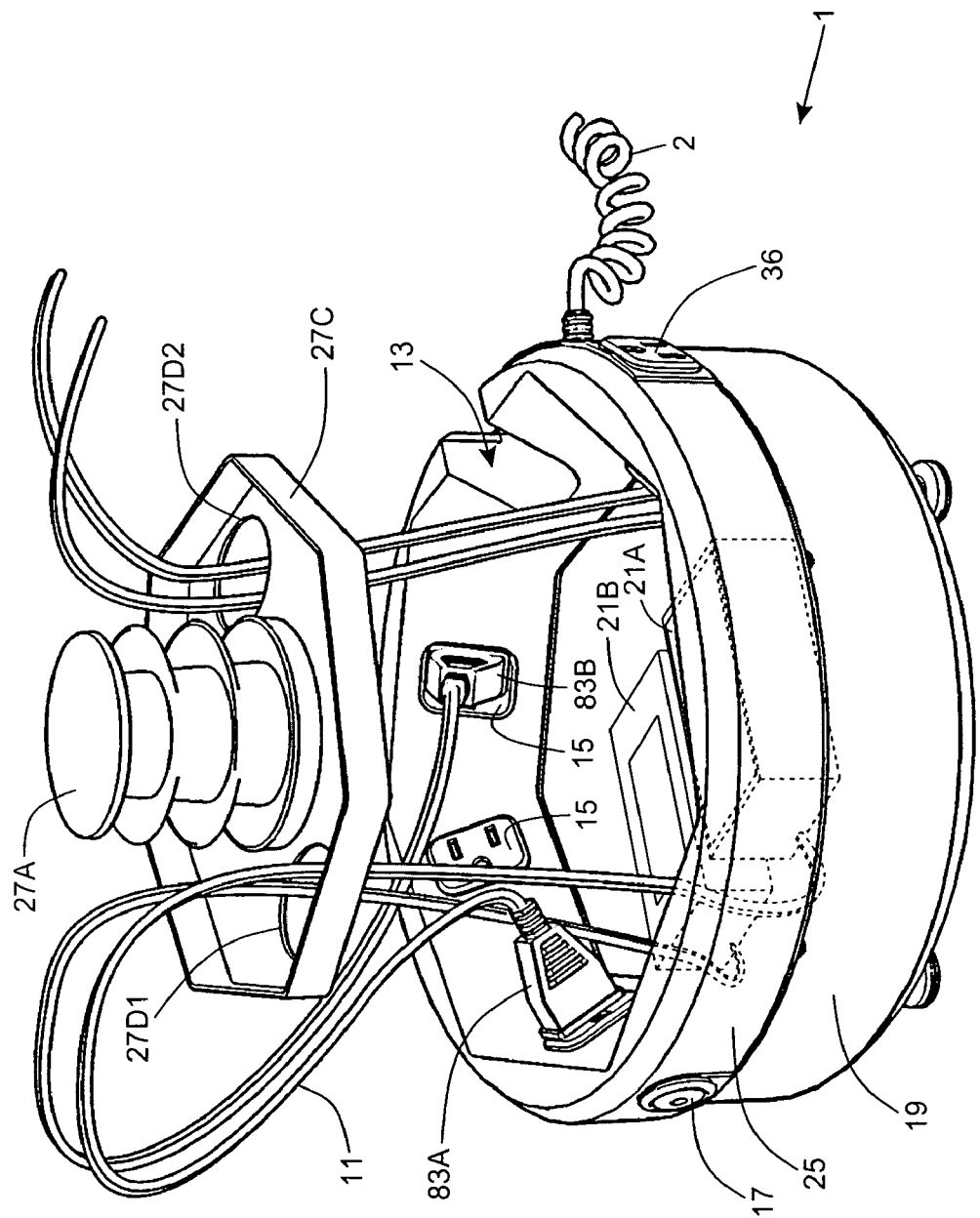
FIG. 7A is a perspective view of the electrical power supplying device of FIGS. 2A through 2C, shown arranged and configured during a first step of the method of supplying electrical power to a group of appliances and managing the length of electrical power cords in accordance with the principles of the present invention.

As shown in FIG. 5, the cover housing portion 28 is removed from the electrical power supplying device, and there are no electrical appliances connected to and powered by the device. Also, FIG. 5 reveals a number of features: (i) that the electrical receptacles 15 are arranged in orthogonal ways to optimize space within the interior volume of the device, to accommodate the storage of power adapter plugs that are formed at the terminal portion of appliance power cords, in contrast with the power adapter blocks formed midway along a length of power cord, as shown in FIG. 7A; (ii) the pair of apertures 27D1 and 27D2 formed in the dowel tray deck provide for passage of electrical cord to power adapter blocks stored beneath the dowel-tray deck, in the base tray housing portion 19, as shown in FIG. 7A; and (iii) the cable portal 13 for the passage of all power chords exiting/entering the device; and (iv) the flexible electrical power cable 2 and power plug 3 adapted for connection to any suitable electrical power socket provided within the space of the workstation.

Taken together, air circulation vents 55 formed in the base portion of housing 19 and air vents 29 formed in the cover housing 28, and air vents formed in dowel post 27A provide a passive-type of thermal management system embodied within the device so that all power adapters contained therein are maintained within safe interior operating temperature limits. In FIG. 3A, illustrative cool and warm air flows are shown moving through the thermal management system.

Figure 6A:
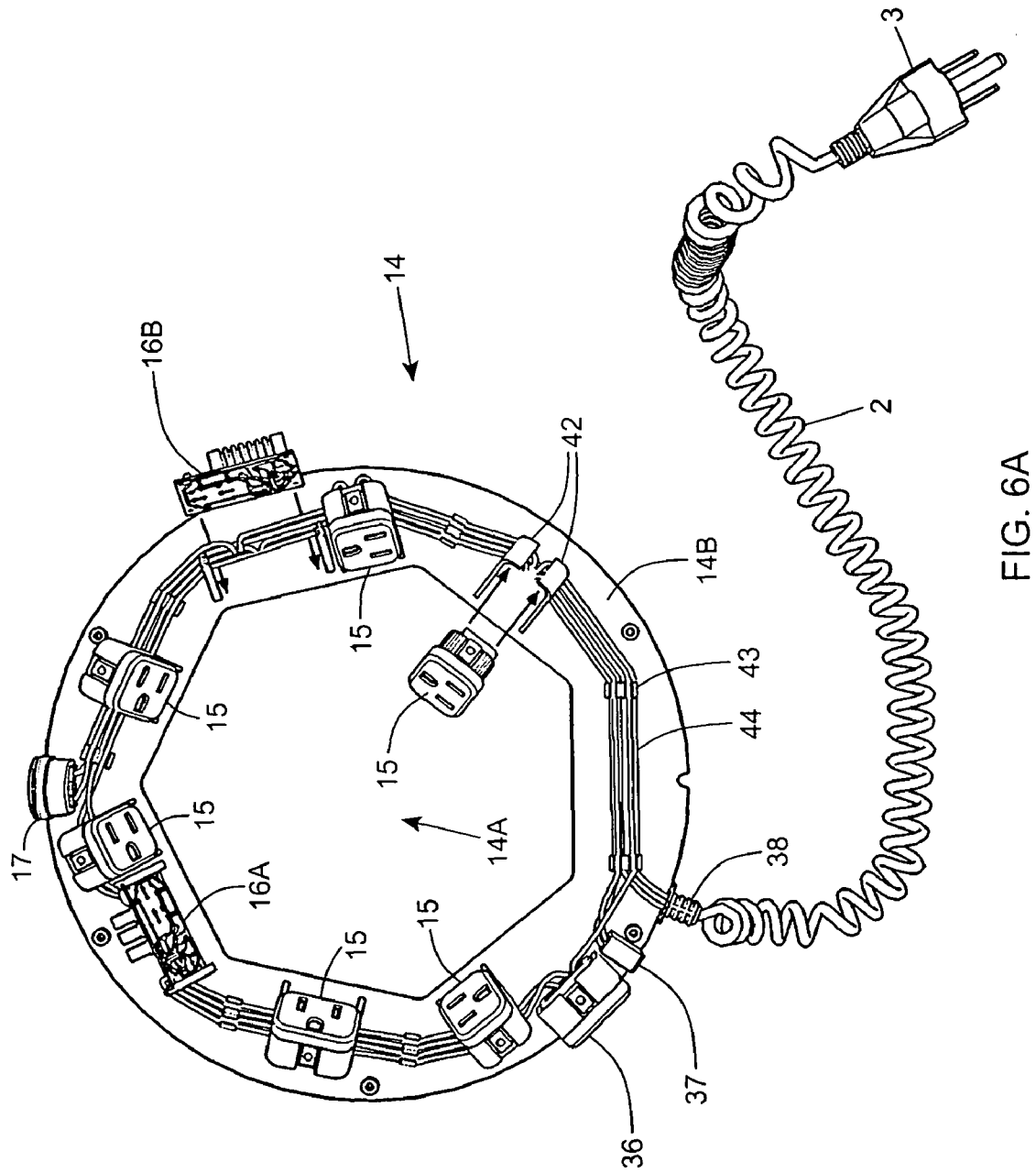
FIG. 6A is a plan view of the power-ring subassembly of the device of FIGS. 2A through 2C, showing its components mounted on its upper surface.
Figure 6B:
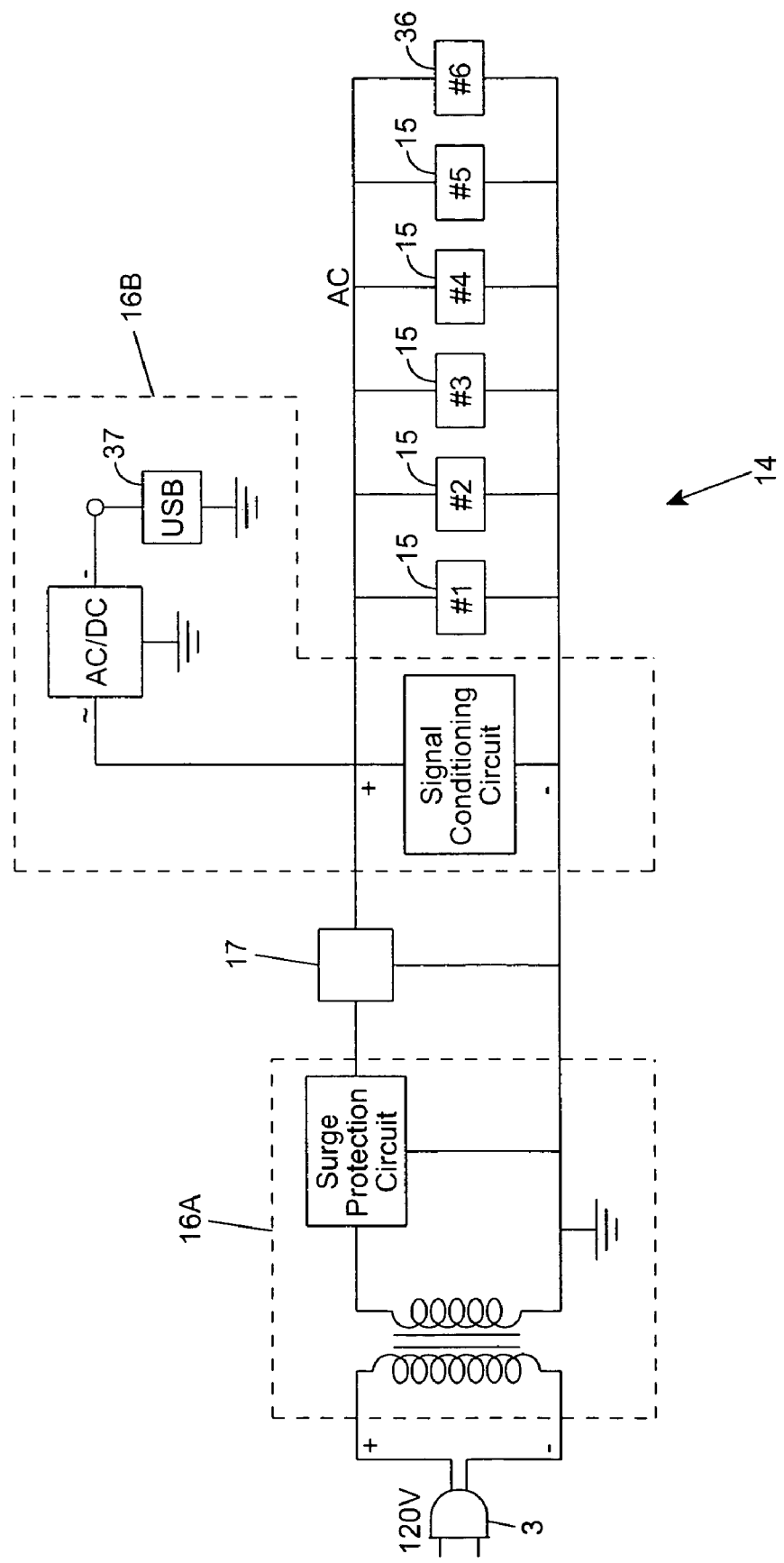
FIG. 6B is a schematic representation of the electrical and electronic components supported on the power-ring subassembly shown in FIG. 6A.

As shown in FIGS. 6A and 6B, the power-ring subassembly 14 comprises: a substantially planar structure 14B, having a central aperture 14A for passage and location of the dowel tray deck 27C a plurality of mounting brackets 42, formed or provided on planar surface 14B, for snap-fit mounting of electrical receptacles 15, as well as electronic PC circuit boards 16 and other electrical components 17, 36, 37 and 38 specified in the electrical circuit diagram of FIG. 6B; and grooves, tracks or projections 43 provided on the surface of planar structure 14B, for the mounting and routing of electrical conductors 44 that interconnect together the electrical components in the circuit of FIG. 6B, and supply electrical power thereto, during device operation.

Referring to FIGS. 7A through 7F, a method of using the floor-supported power supplying device of FIGS. 2A through 2C will now be described.

As shown in FIG. 7A, the first step of the method involves removing the cover housing portion 28 from the base housing, and then lifting the dowel tray 27 out from the interior volume of the device to allow several power adapter blocks 21A and 21B to be stored within the base housing portion 19, as shown. Then, the electrical power plug ends of the electrical cords 83A and 83B associated with the power adapter blocks 21A and 21B are passed/routed through the first aperture 27D1 formed in the dowel tray deck 27C, while the other free ends of the electrical cords are passed/routed through the second aperture 27D2 in the dowel tray deck 27C.

Figure 7B:
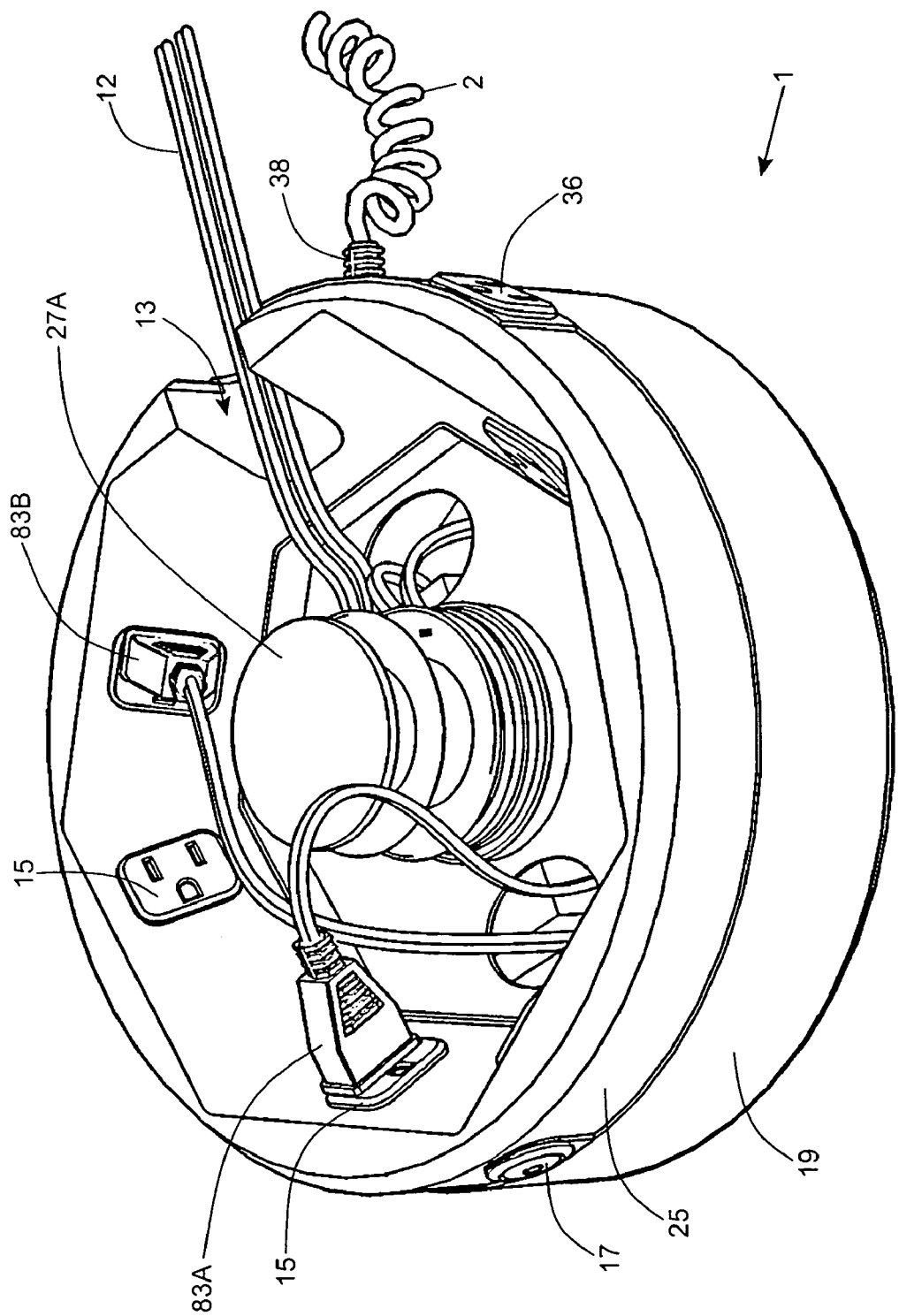
FIG. 7B is a perspective view of the electrical power supplying device of FIGS. 2A through 2C, shown arranged and configured during a second step of the method of supplying electrical power to a group of appliances and managing the length of electrical power cords in accordance with the principles of the present invention.

As shown in FIG. 7B, the dowel tray 27 is placed back into position, through the central aperture 14A in the power-ring subassembly 14 and associated power-ring housing portion 25, collectively, referred to as a "power-ring structure" or "ring-like power supplying structure" 46, shown in FIG. 2A. Then, the excess length of the electrical power cords of these electrical plugs is managed about a first set of sections formed on the dowel tray post 27A. This is achieved by routing each power cord from its electrical appliance, along an intended route within the workstation environment, back to the power cord portal 13 on the device, and then wrapping any excess length of power cord (beyond the power cord portal to its power adapter) about a selected available section on the dowel 27A to take up any and all excess cord (i.e. cord slack), so that the excess power cord is neatly managed within the interior volume of the device, about a designated section on the dowel post 27A, as shown in FIG. 7B.

Figure 7C:
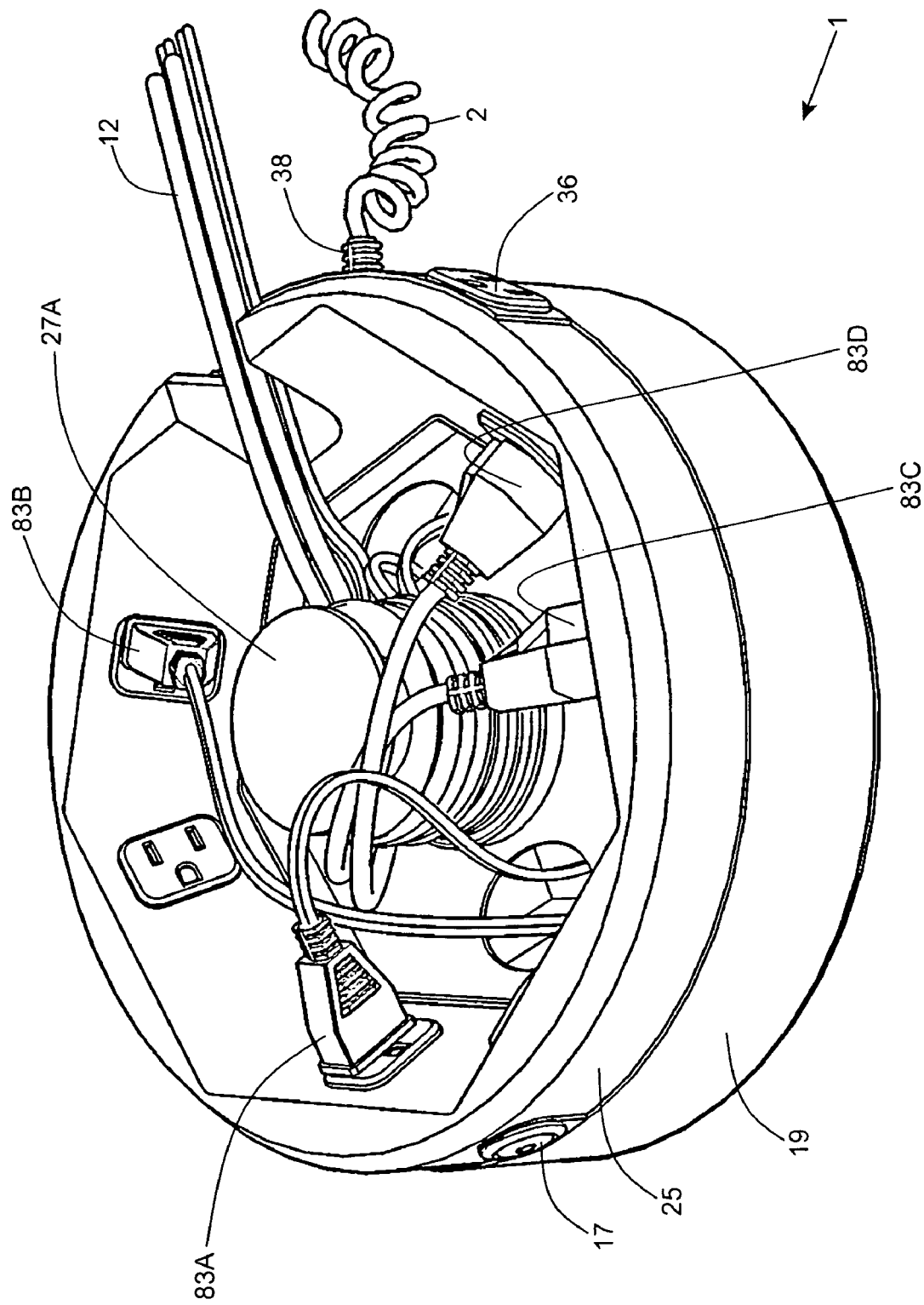
FIG. 7C is a perspective view of the electrical power supplying device of FIGS. 2A through 2C, shown arranged and configured during the third step of the method of supplying electrical power to a group of appliances and managing the length of electrical power cords in accordance with the principles of the present invention.

As shown in FIG. 7C, several additional power plugs 83C and 83D are plugged into electrical receptacles about the power-ring subassembly 14, and excess power cord is wrapped about an available section of the dowel post 27A, and routed out to its electrical appliance, as shown.

Figure 7D:
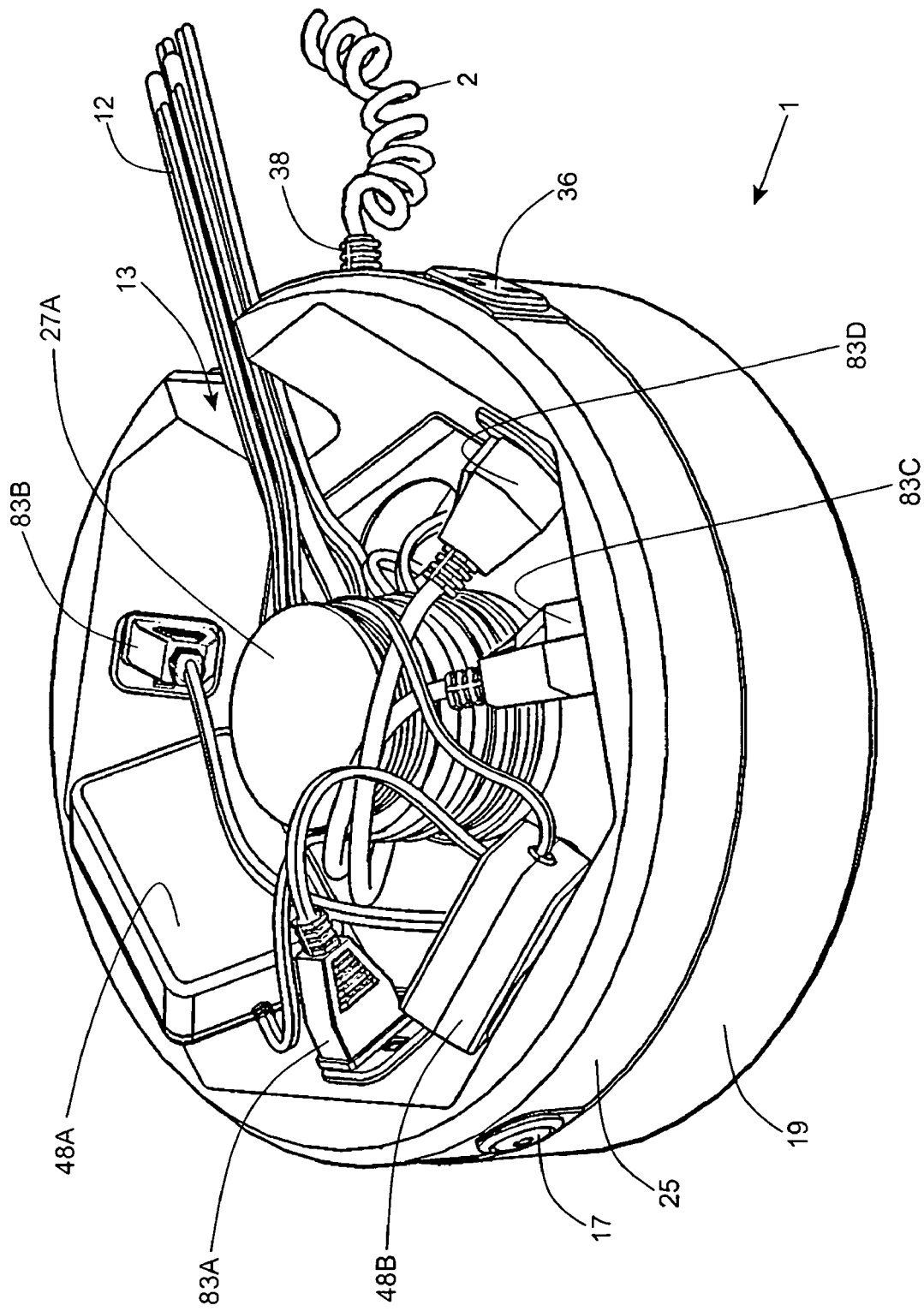
FIG. 7D is a perspective view of the electrical power supplying device of FIGS. 2A through 2C, shown arranged and configured during the fourth step of the method of supplying electrical power to a group of appliances and managing the length of electrical power cords in accordance with the principles of the present invention.

As shown in FIG. 7D, a pair of power adapter plugs 48A and 48B associated with another pair of electrical appliances are plugged into a pair of power outlets or receptacles provided by the power-ring subassembly 14, and the associated power cord routed from the power cord portal 13 to the appliance in the environment, along a predetermined route. Then any excess length of electrical power cord, associated with these electrical adapter plugs, is wrapped about an available section on the dowel tray post 27A, as described above, to neatly manage excess power cord within the device.

Figure 7E:
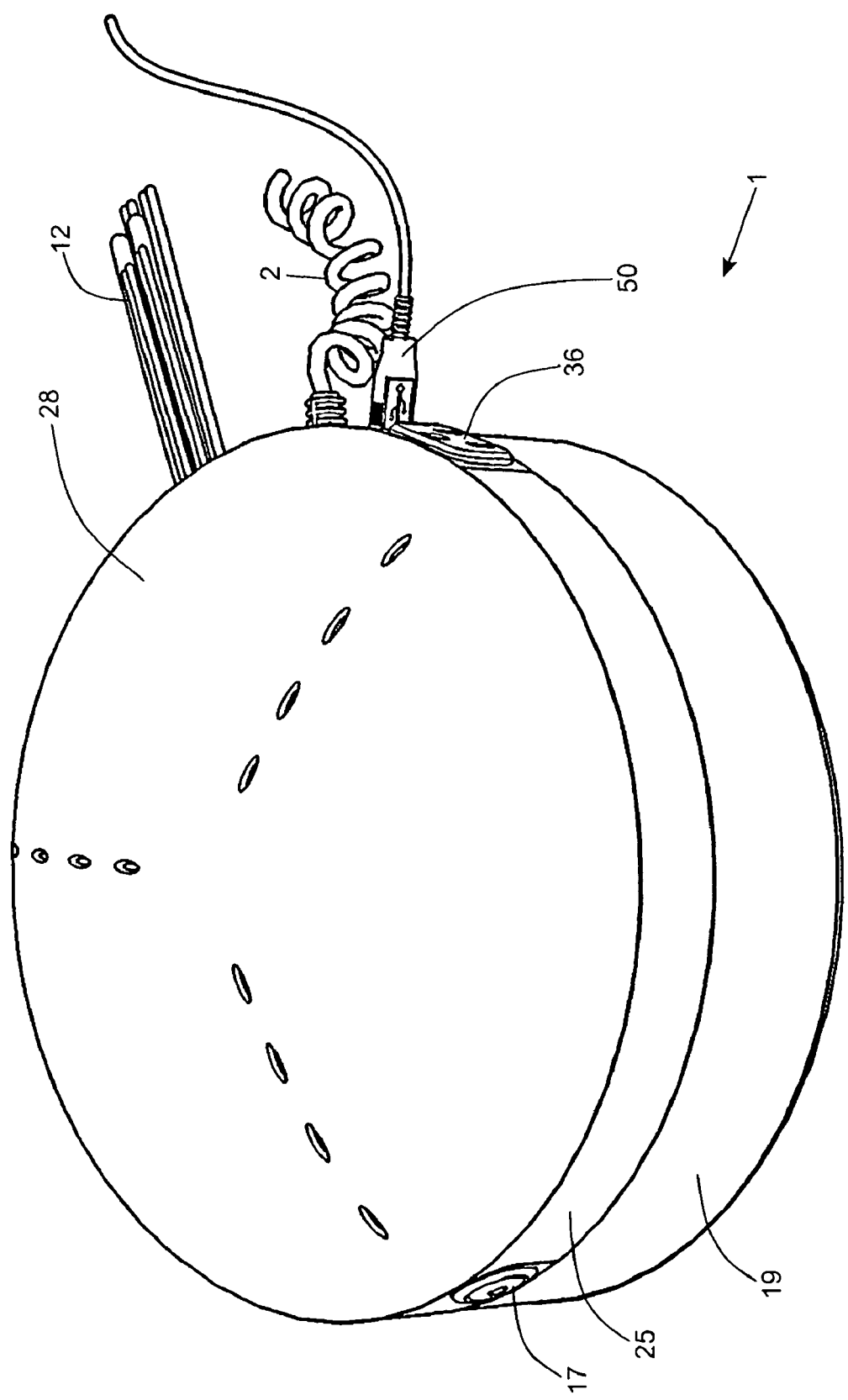
FIG. 7E is a perspective view of the electrical power supplying device of FIGS. 2A through 2C, shown arranged and configured during the fifth step of the method of supplying electrical power to a group of appliances and managing the length of electrical power cords in accordance with the principles of the present invention.

As shown in FIG. 7E, the next step of the method is to replace the cover housing portion 28 onto the floor-supported power supplying device. Thereafter, the USB power plug 50 can be plugged into the USB power port 37 provided on the exterior of the device, as shown.

Figure 7F:
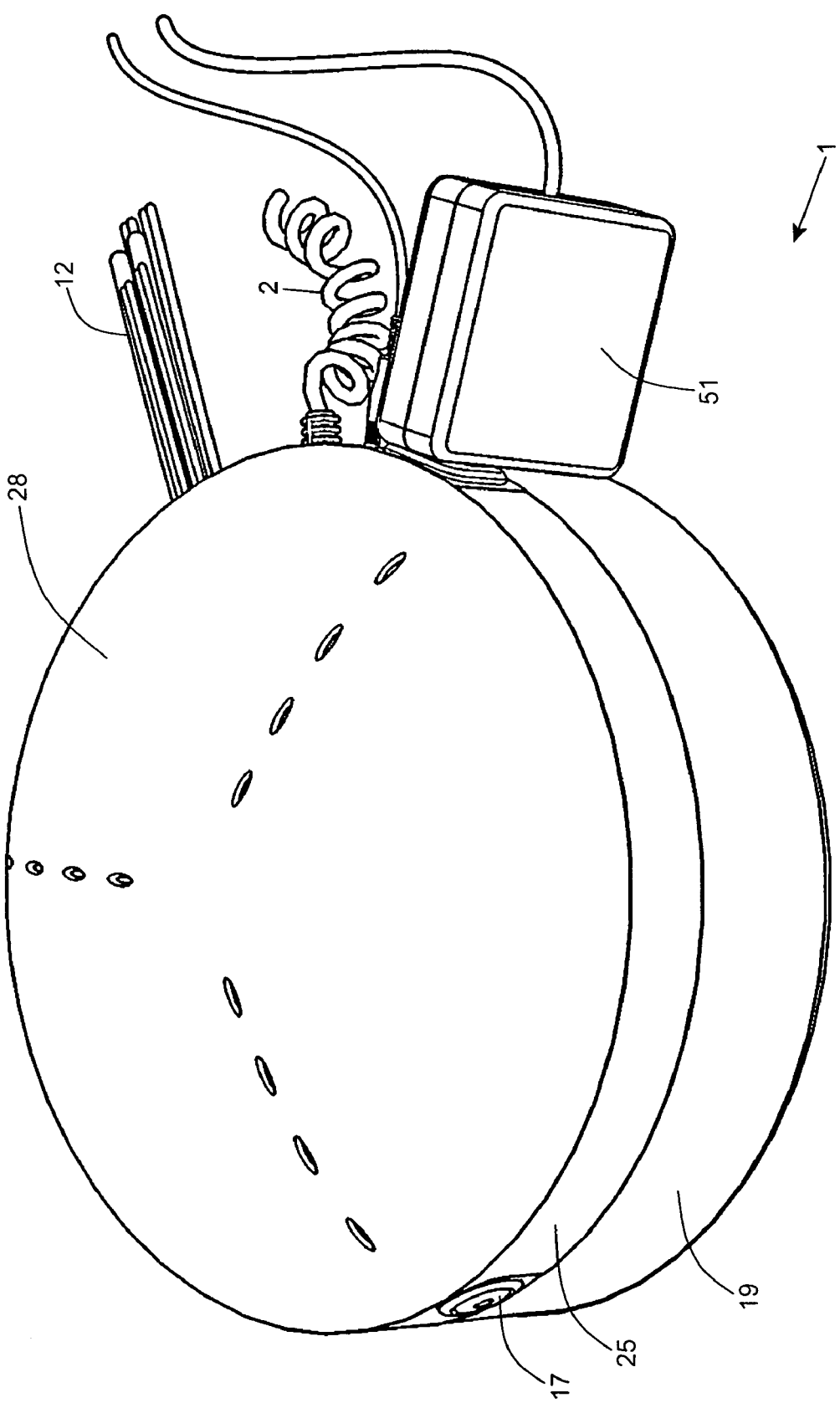
FIG. 7F is a perspective view of the electrical power supplying device of FIGS. 2A through 2C, shown arranged and configured during the sixth step of the method of supplying electrical power to a group of appliances and managing the length of electrical power cords in accordance with the principles of the present invention.

As shown in FIG. 7F, a power adapter plug 28 associated with an appliance in the workstation environment can be plugged into the external power receptacle 36 supplied on the device.

At any time, the cover housing portion 28 can be easily removed from the power-ring housing portion 25, and power plugs, power adapter plugs and/or power adapter blocks can be easily removed, added or reconfigured within the power supplying device to meet requirements of electrical appliances deployed in the work, living and/or play environment, as the case may be.

Figure 8:
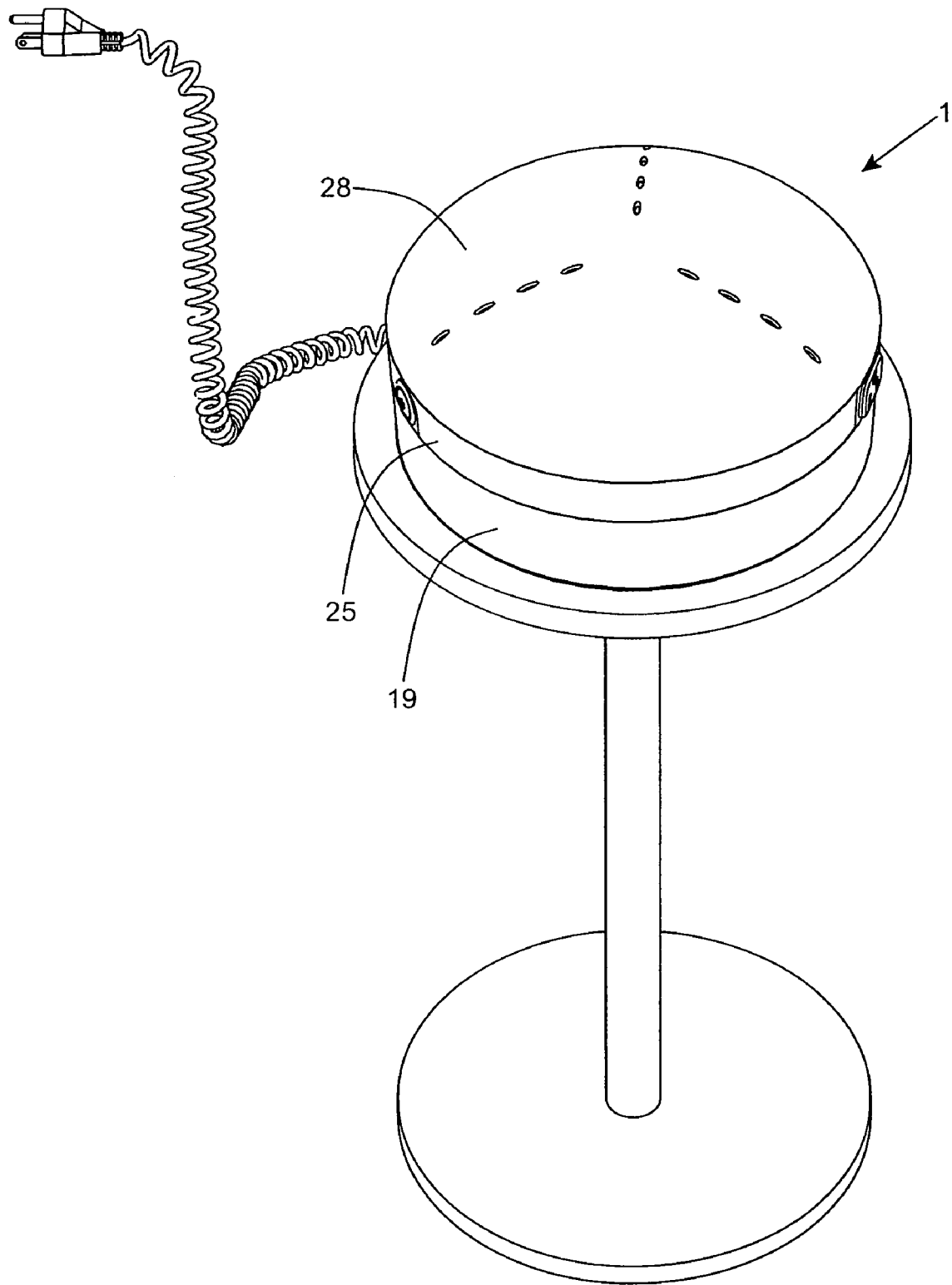
FIG. 8 is a perspective view of the electrical power supplying device of FIGS. 2A through 2C, shown supported on a pedestal or shelf structure, rather than on a floor surface.

As shown in FIG. 8, the electrical power supplying device 1 can also be supported on a variety of surfaces other than floor surfaces, such as, for example, countertop surfaces, shelf surfaces, pedestals, table surfaces, kitchen countertop surfaces, and the like, where electrical appliances are deployed for use and require electrical power for operation. Also, while the device is shown in an interior workspace in FIGS. 1A and 1B, it is understood that the device of the present invention can also be used safely outdoors, provided it is protected from the natural elements, to protect from electrical shock and shorting.

Figure 9A:
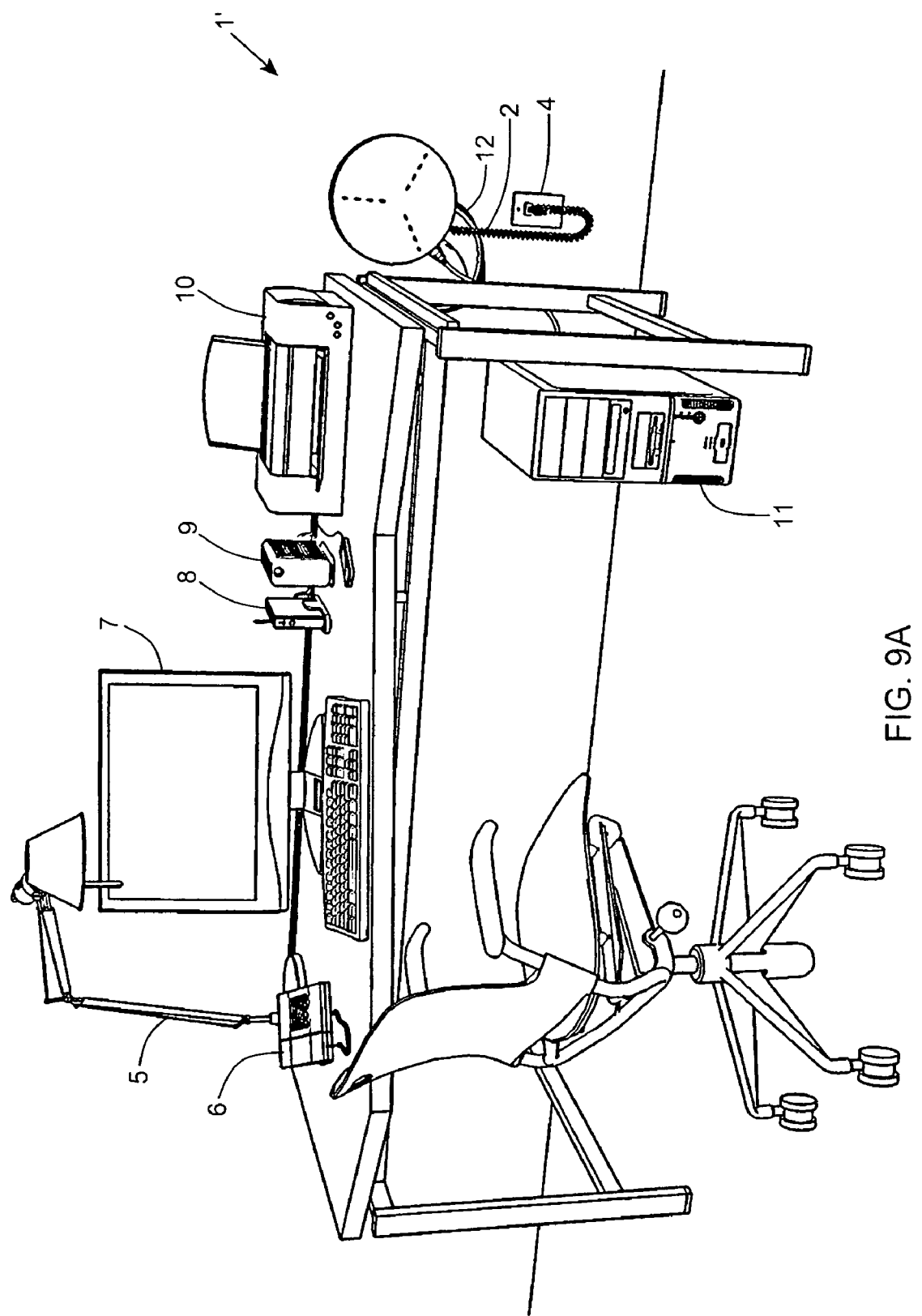
FIG. 9A is a first perspective view of a second environment in which an electrical power supplying device according to a second illustrative embodiment of the present invention is mounted on a wall surface, and used to manage the power cords and concealing the power adapters of electrical appliances employed in the environment.
Figure 9B:
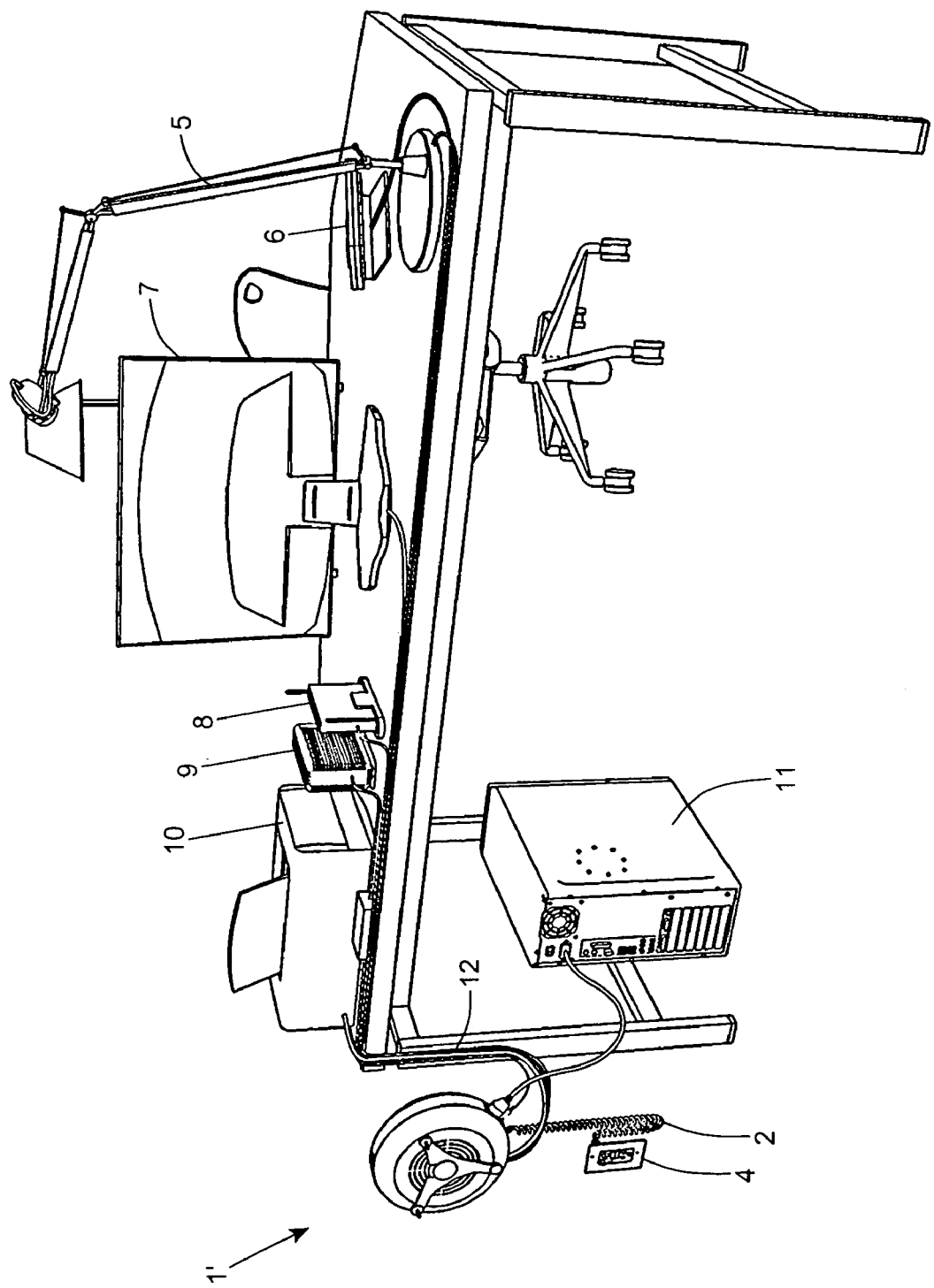
FIG. 9B is a second perspective view of the second environment in which the electrical power supplying device shown in FIG. 9A is deployed.

The Electrical Power Supplying Device According to a Second Illustrative Embodiment of the Present Invention In FIGS. 9A and 9B, a second workstation environment is shown in which a second illustrative embodiment of the present invention is shown realized in the form of a wall-supported electrical power supplying device 1' that is supplied with electrical power through a flexible coiled power cord 2 plugged into a standard electrical power receptacle 4. The primary difference between device 1 and device 1' is that the base housing portion 19' is not designed deeply, but rather with a low-profile design. Also device 1' does not have a dowel tray portion 29C, creating upper and lower decks, as provided in device 1', but rather employs a cord managing dowel or post 27A that is integrated with the bottom surface of the base housing 19'.

Figure 10A:
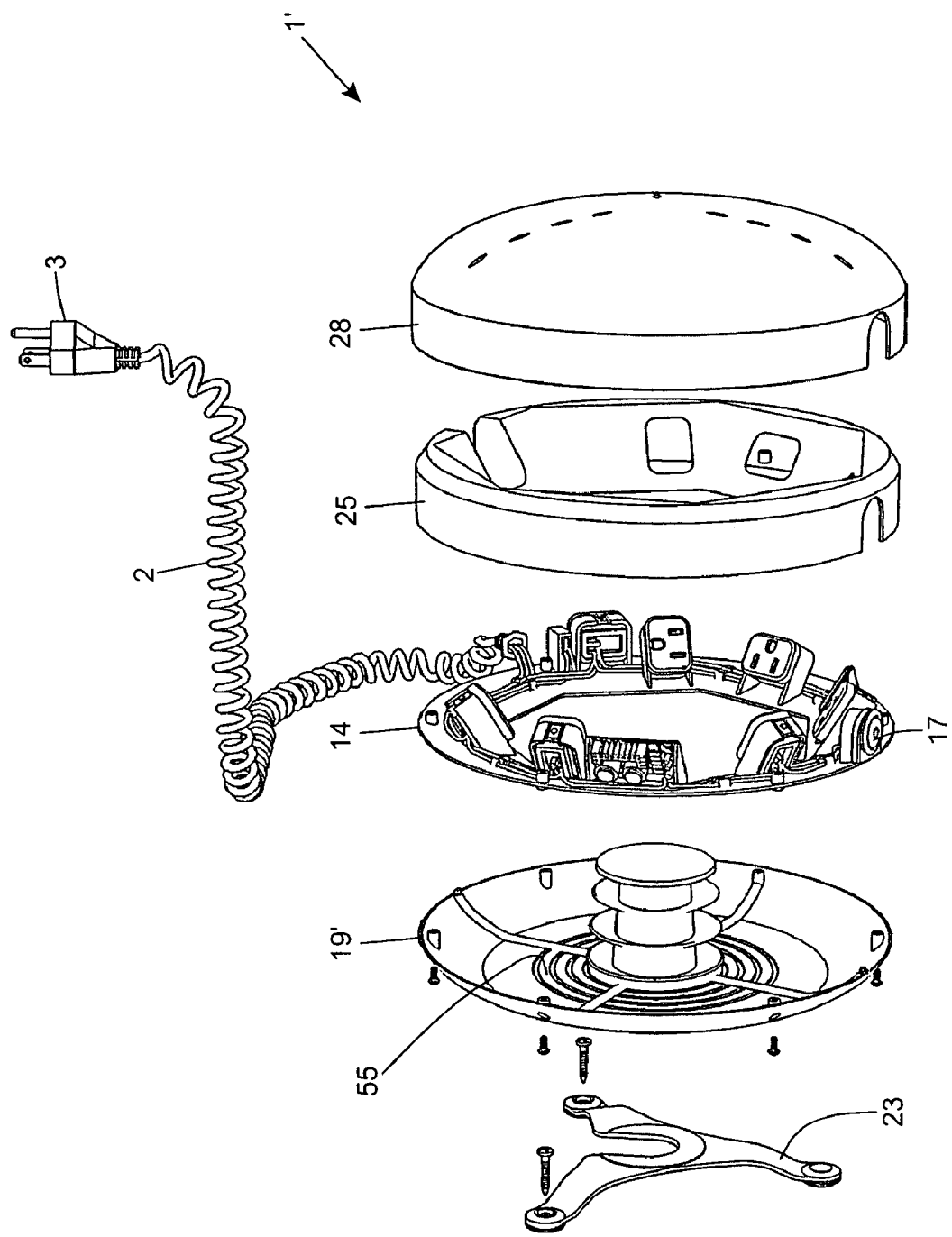
FIG. 10A is a first exploded view of the electrical power supplying device shown in FIGS. 9A and 9B.
Figure 10C:
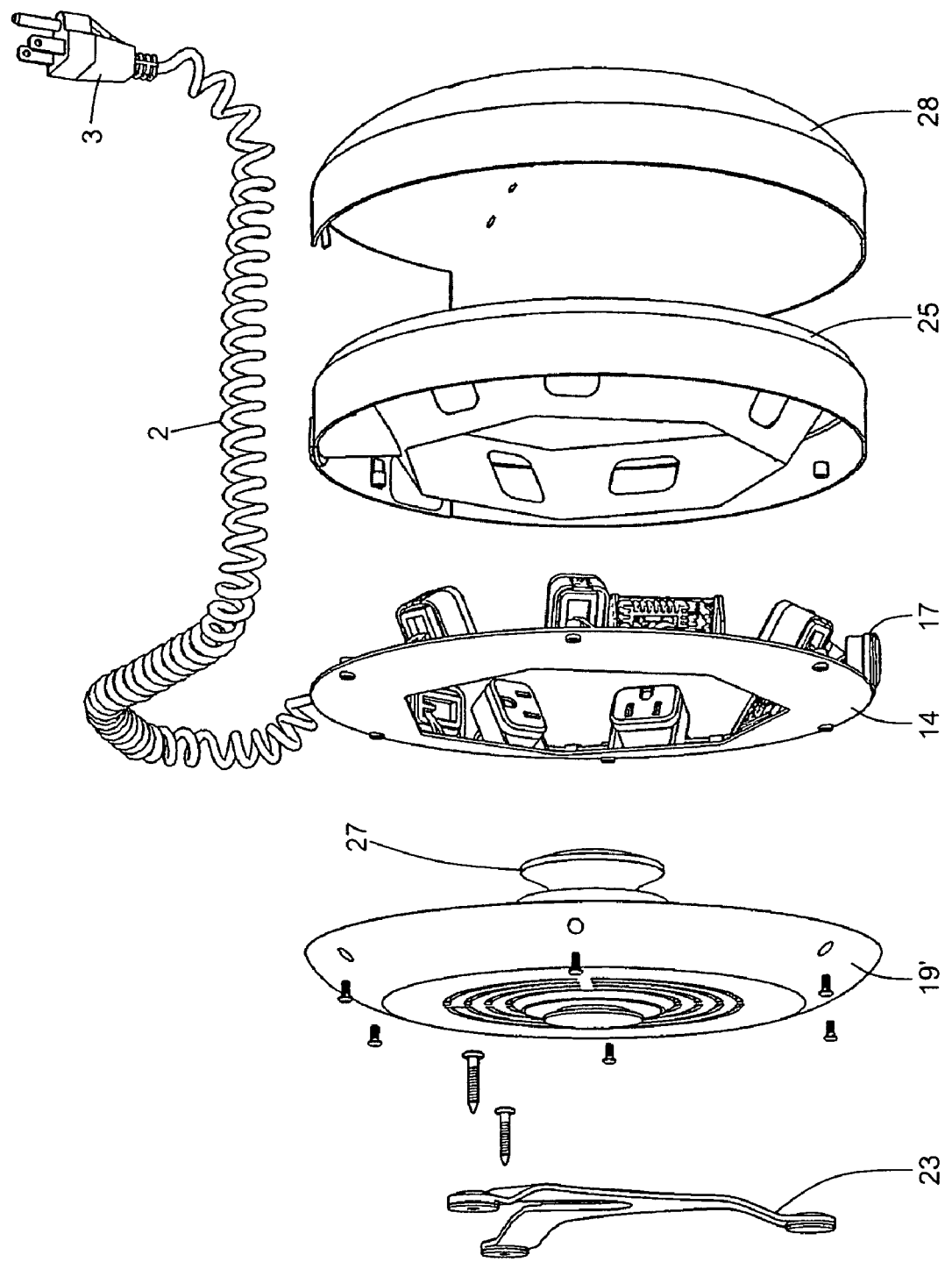
FIG. 10C is a third exploded view of the electrical power supplying device shown in FIGS. 10A and 10B, shown from a different perspective to reveal other aspects of the device.

As shown in FIGS. 10A through 10C, the wall-mounted electrical power supplying device 1' comprises an assembly of components, namely: a power-ring subassembly 14 having a central aperture 14A, and adapted to support electrical receptacles 15 and electronic circuits 16, an ON/OFF switch and indicator 17 provided with a glowing LED ring that indicates the state of the device using different glow colors (e.g. Green=READY, Red=NOT READY), and cable connector 38 for the coiled-type electrical power cord 2 for supplying primary electrical power to the device, and all electrical appliances connected to it; a low-profile base tray housing 19' adapted for supporting the power-ring assembly 14 via a set of screws or like fasteners 20, and having geometrical dimensions suitable for mounting close to a wall surface, as shown; a cord management dowel 27A secured to and positioned in the central portion of the base housing portion 19', and having provided a set of concentric flanges 27B about its outer surface, for the purpose of neatly taking up and managing excess lengths of electrical power cords associated with the appliances; a wall-bracket/unit-base 23' attachable to the bottom of the base tray housing 19' for mounting the device to a wall surface as shown, or horizontal mounting on a countertop or desktop surface as shown in 27A through 27C; a power-ring housing portion 25 for covering the power-ring subassembly 14 and attaching to the base housing portion 19', and provided with a set of plug apertures 26 for passing the electrical plugs of power cords associated with appliances to electrical receptacles 15 mounted directly behind the plug apertures 26, and a power cord portal aperture 13 allowing a group or bundle of electrical power cords 12 associated with a set of electrical appliances 5 through 11, to enter/exit the device, as shown; and a top cover housing portion 28 adapted to slide onto the upper portion of the power-ring housing portion 25 and snap into position, and having (i) air vents 29 for passage of air and providing ventilation to the interior of the device, (ii) a set of gripping threads 30 provided along the circumference of the cover housing portion to aid in the lifting the cover as required, (iii) a first side wall aperture 36 for the passage of electrical cords through the power cord portal 13 formed in the power-ring housing cover 25, and (iv) side wall apertures 32, 33, 34 and 35 for providing access to the exterior power receptacle 36, USB power port 37, power cord connector 38 and ON/OFF power switch and indicator 17, respectively.

Figure 16:
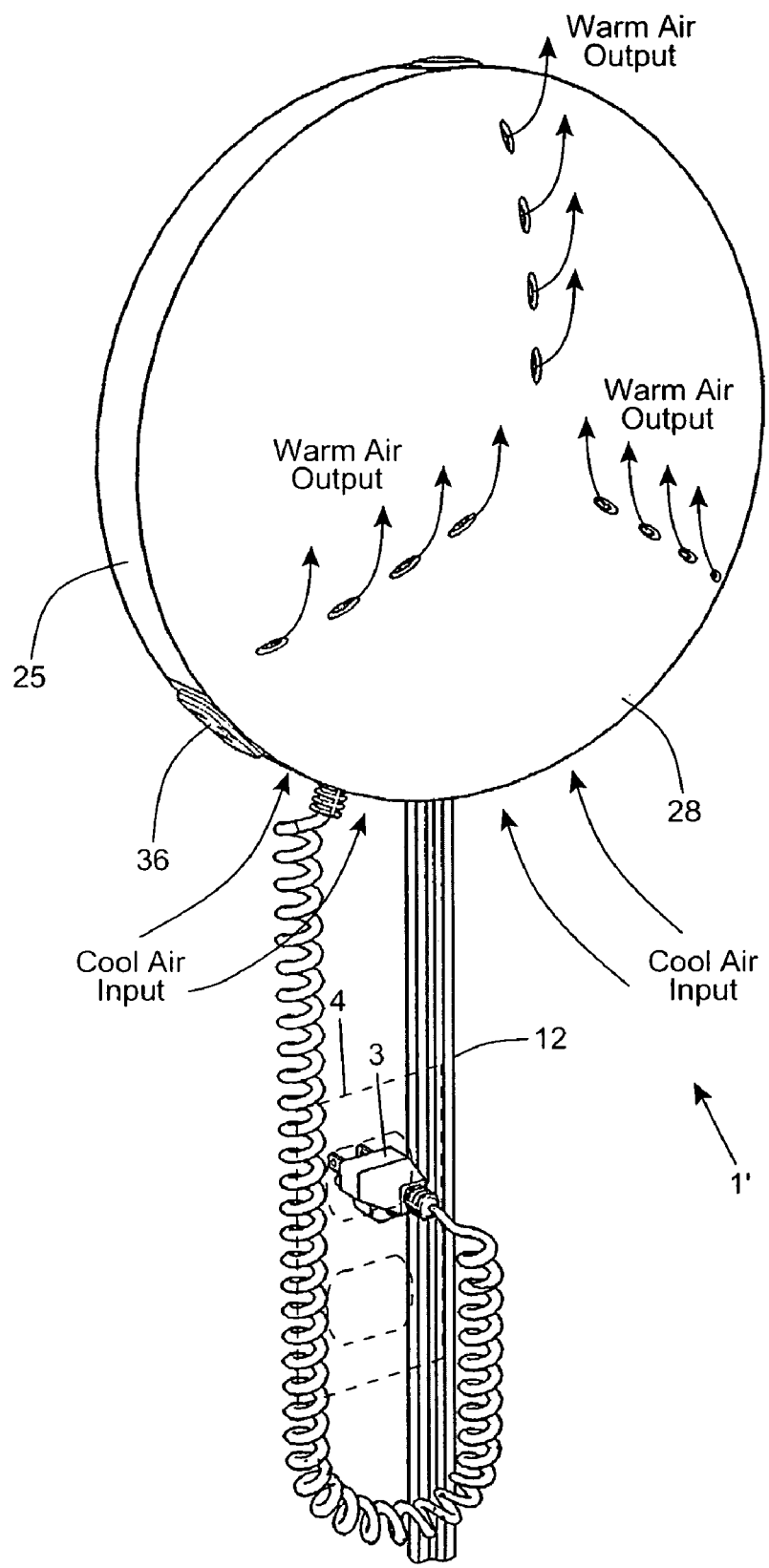
FIG. 16 is a frontal perspective view of the wall-supported power supplying device of FIG. 15B.

Taken together, air circulation vents 55 formed in the base portion of housing 19 and air vents 29 formed in the cover housing 28, and air vents formed in dowel post 27A provide a passive-type of thermal management system embodied within the device so that all power adapters contained therein are maintained within safe interior operating temperature limits. In FIG. 16, illustrative cool and warm air flows are shown moving through the thermal management system.

As shown in FIGS. 10A through 10C, the port openings 33, 32 formed in the sidewall of the power-ring housing portion 23, to provide access to a USB power port 37, and an externally-accessible electrical receptacle 36. As shown, the electrical receptacles 15 and electronic circuit boards 16 are snap-fit mounted into mounting brackets 42 provided on the upper surface of the power-ring assembly 14, along with electrical wiring 44 among electrical and circuit board components, making the necessary interconnections as specified in FIG. 13B. As shown in FIG. 10C, rubber feet 45 are provided on the wall-bracket/unit base 23' to prevent marring of wall floor surfaces, and sliding on floor or desktop surfaces and the like. Also, the five primary components assemble easily along a common axis, lending the design to easy and cost effective product manufacture, testing, and maintenance.

Figure 10D:
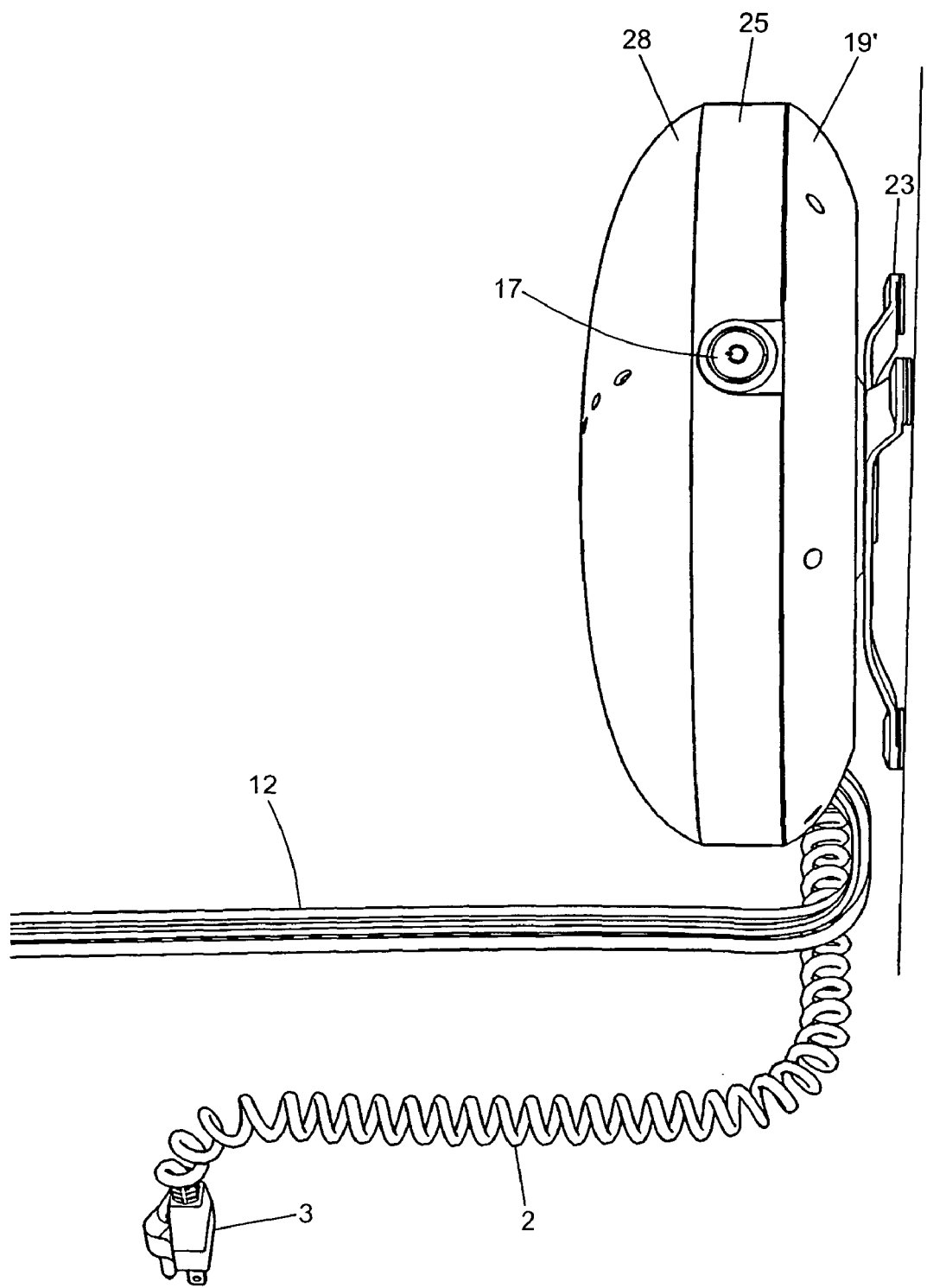
FIG. 10D is a first elevated side view of the electrical power supplying device of FIGS. 10A through 10C.
Figure 10E:
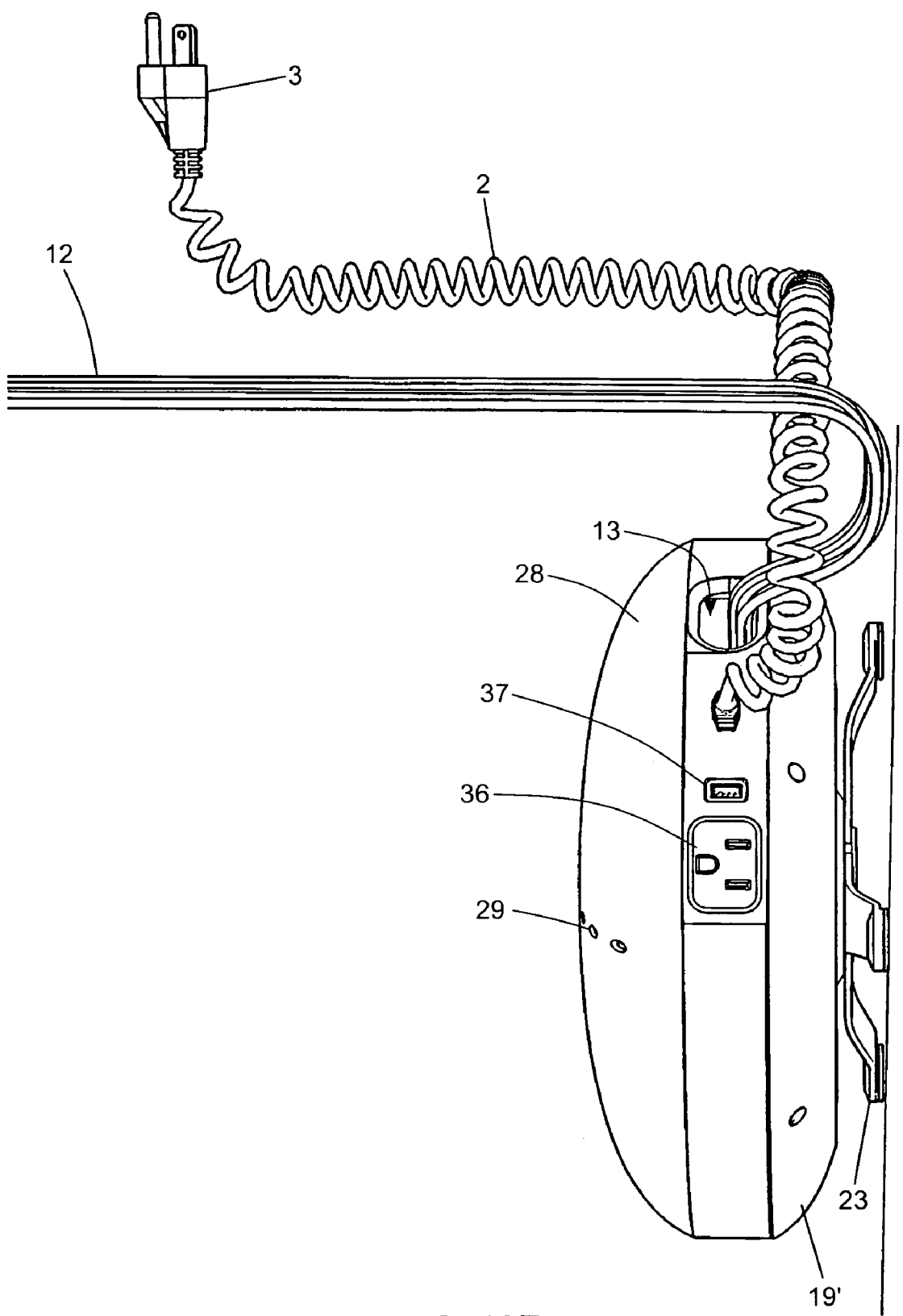
FIG. 10E is a second elevated side view of the electrical power supplying device of FIGS. 10A through 10C.
Figure 11:
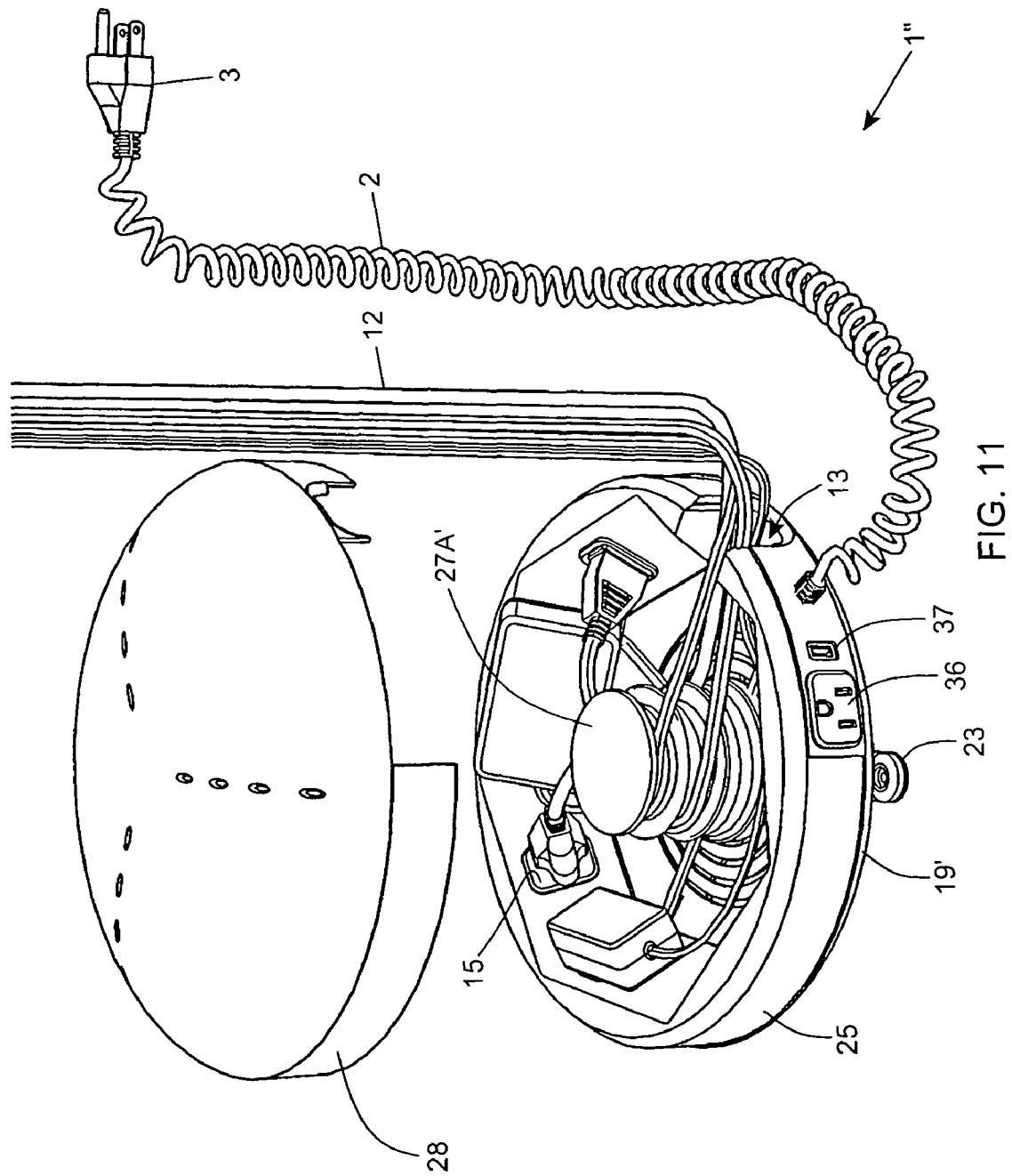
FIG. 11 is a first perspective view of the electrical power supplying device of FIGS. 10A through 10C, shown with the cover removed from the power-ring housing portion, and supplying electrical power to a plurality of electrical appliances, and managing the length of a plurality of power cords which extend out from the power cord portal of the device.

As shown in FIGS. 10D and 10E, the electrical power supplying device 1' is designed for support against a wall surface, and provides external access to an external power receptacle 36 and a USB power port 37, while a bundle of power cables 12 from electrical appliances enter/exit the cable portal 13 provided on the side of the device of the present invention. However, device 1' can be mounted on a floor surface, or on a horizontal surface as shown in FIG. 10A As shown in FIG. 11, the cover housing portion 28 can be easily lifted off the power-ring housing portion of the electrical power supplying device 1' to reveal a number of things, namely: (i) electrical power provided to a number of electrical appliances supported at the workstation of FIGS. 1A and 1B; (ii) several power plugs and power adapter plugs supported about the cord management dowel 27A; and (iii) the length of a plurality of electrical cords 12, associated with the electrical appliances, being neatly managed about the cord management dowel 27A in accordance with the principles of the prevent invention, and ultimately extend out the power cord portal 13.

Figure 12:
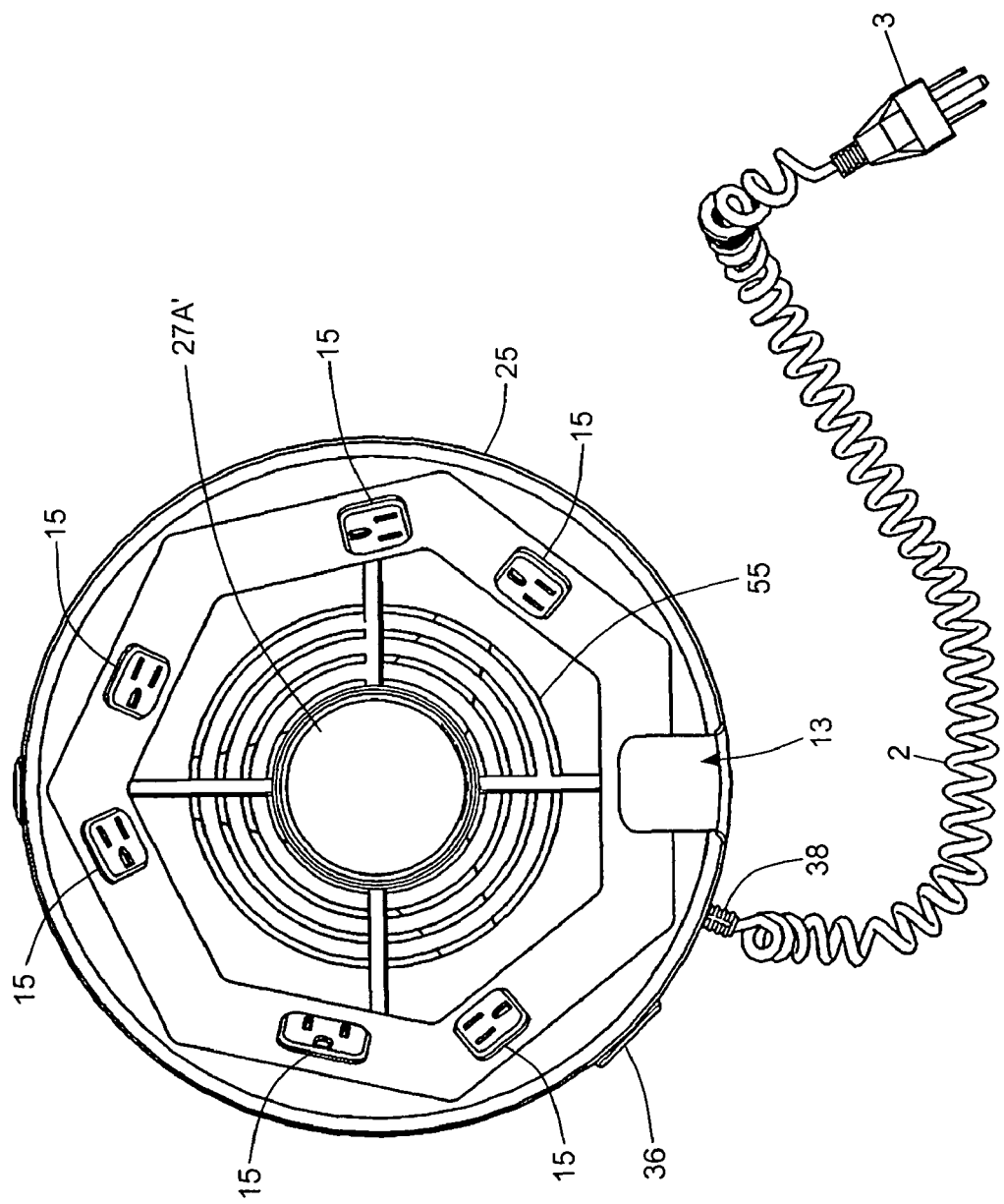
FIG. 12 is a plan view of the electrical power supplying device shown in FIGS. 10A through 10C, shown with its cover housing removed, and without any electrical power cords connected to the device.

As shown in FIG. 12, the cover housing portion 28 is removed from the electrical power supplying device, and there are no electrical appliances connected to and powered by the device. FIG. 12 reveals a number of features: (i) that the electrical receptacles 15 are spaced apart and arranged in orthogonal ways to optimize space within the interior volume of the device, in order to accommodate the storage of different sized power adapter plugs that are formed at the terminal portion of appliance power chords; and (ii) the flexible electrical power cable 2 and plug 3 is adapted for connection to any suitable electrical power socket provided within the space of the workstation.

Figure 13A:
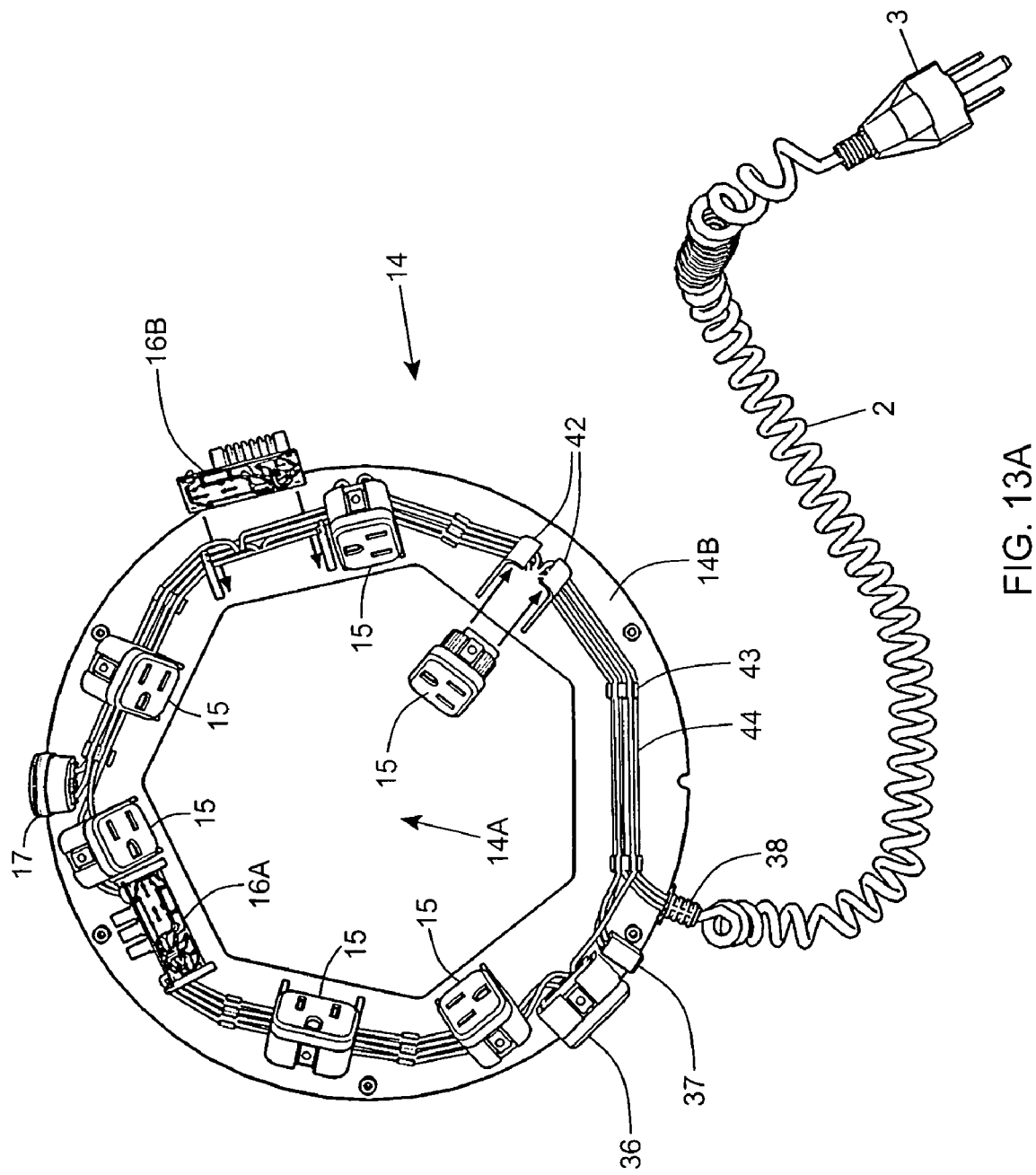
FIG. 13A is a plan view of the power-ring subassembly of the device of FIGS. 10A through 10C, showing electrical and electronic components mounted on its upper surface.
Figure 13B:
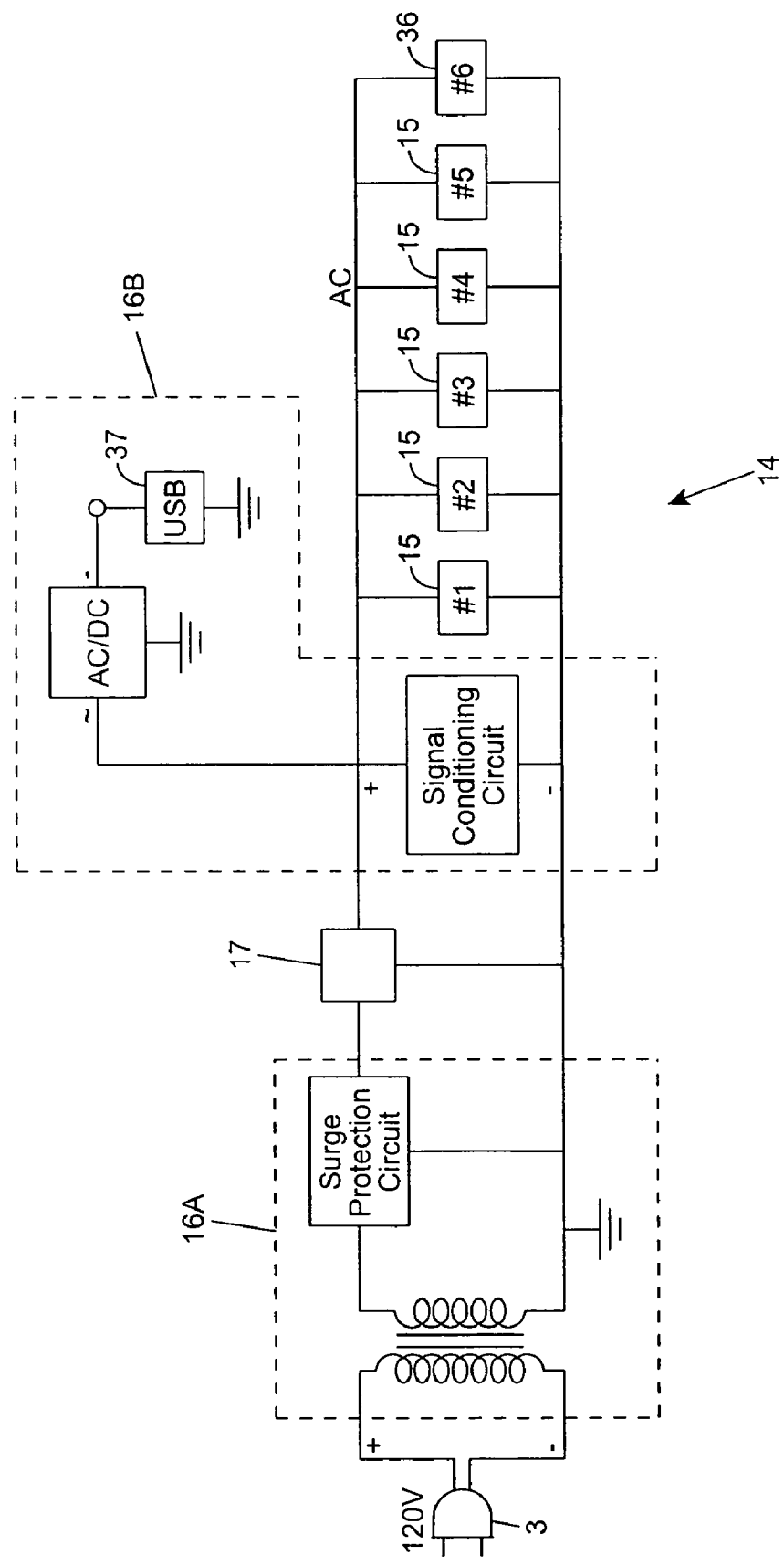
FIG. 13B is a schematic representation of the electrical and electronic components supported on the power-ring subassembly shown in FIG. 13A.

As shown in FIGS. 13A and 13B, the power-ring subassembly 14 comprises: a substantially planar structure 14B having a central aperture 14A for passage and location of the cord management dowel 27'; a plurality of mounting brackets 42, formed or provided on planar surface 43, for snap-fit mounting of electrical receptacles 15, as well as electronic PC circuit boards 16 and other electrical components 17, 36, 37 and 38 specified in the electrical circuit diagram of FIG. 13B; and grooves, tracks or projections 43C provided on the surface of planar structure 14B for the mounting and routing of electrical conductors 43 that interconnect together the electrical components in the circuit of FIG. 13B, and supply electrical power thereto, during device operation.

Figure 14A:
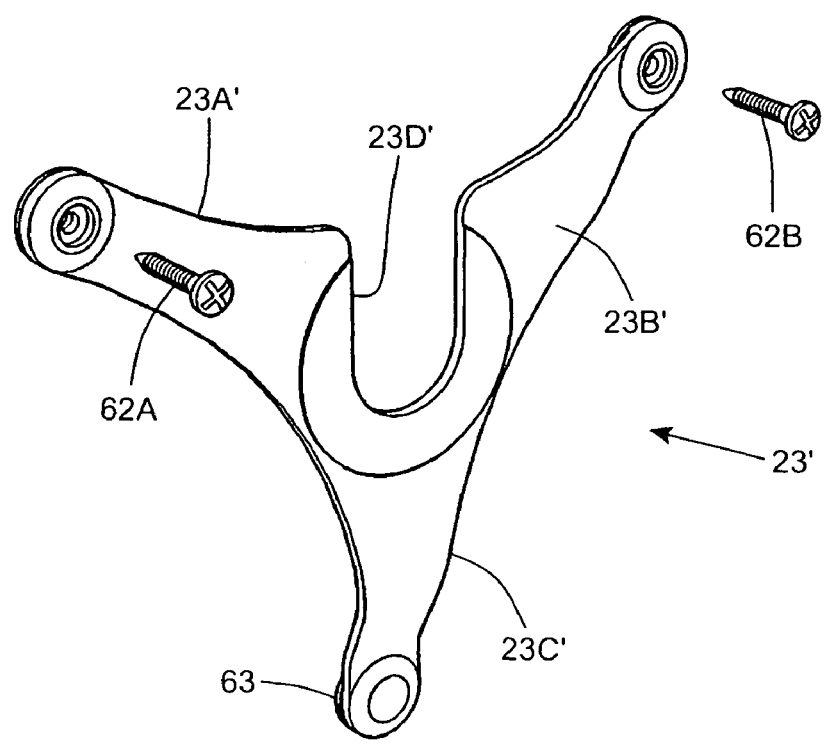
FIG. 14A is a front perspective view of the wall-mounting bracket designed for wall-mounting the device of FIGS. 10A through 10C onto a wall surface, near a standard wall-based electrical power receptacle.
Figure 14B:
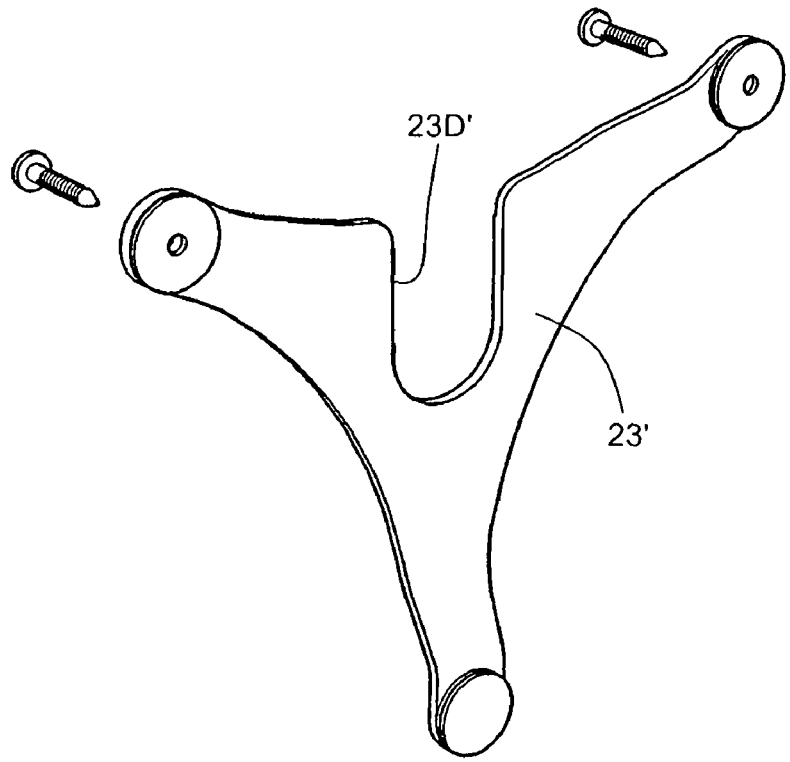
FIG. 14B is a rear perspective view of the wall-mounting bracket designed for wall-mounting the device of FIGS. 10A through 10C onto a wall surface, near a standard wall-based electrical power receptacle.

Mounting the electrical power supplying device 1' on a wall surface is simple using the wall-mounting bracket 23 shown in FIGS. 14A and 14B, which comprises: (i) a pair of arm portions 23A' and 23B' each provided with screw anchors 62A and 62B, respectively, that screw into the wall surface and fasten the arm portions securely thereto to prevent movement of the mounting bracket relative to the wall surface, and capable of supporting the weight of the device; (ii) a foot portion 23C', arranged at about 120 degrees from each arm portion, and provided with a rubber non-slip pad 63 for safely contacting the wall surface; and a slot 23D' formed between arm portions 23A' and 23B' for receiving the centrally located mounting post 58 provided on the rear surface of the base housing portion 19'.

Figure 15A:
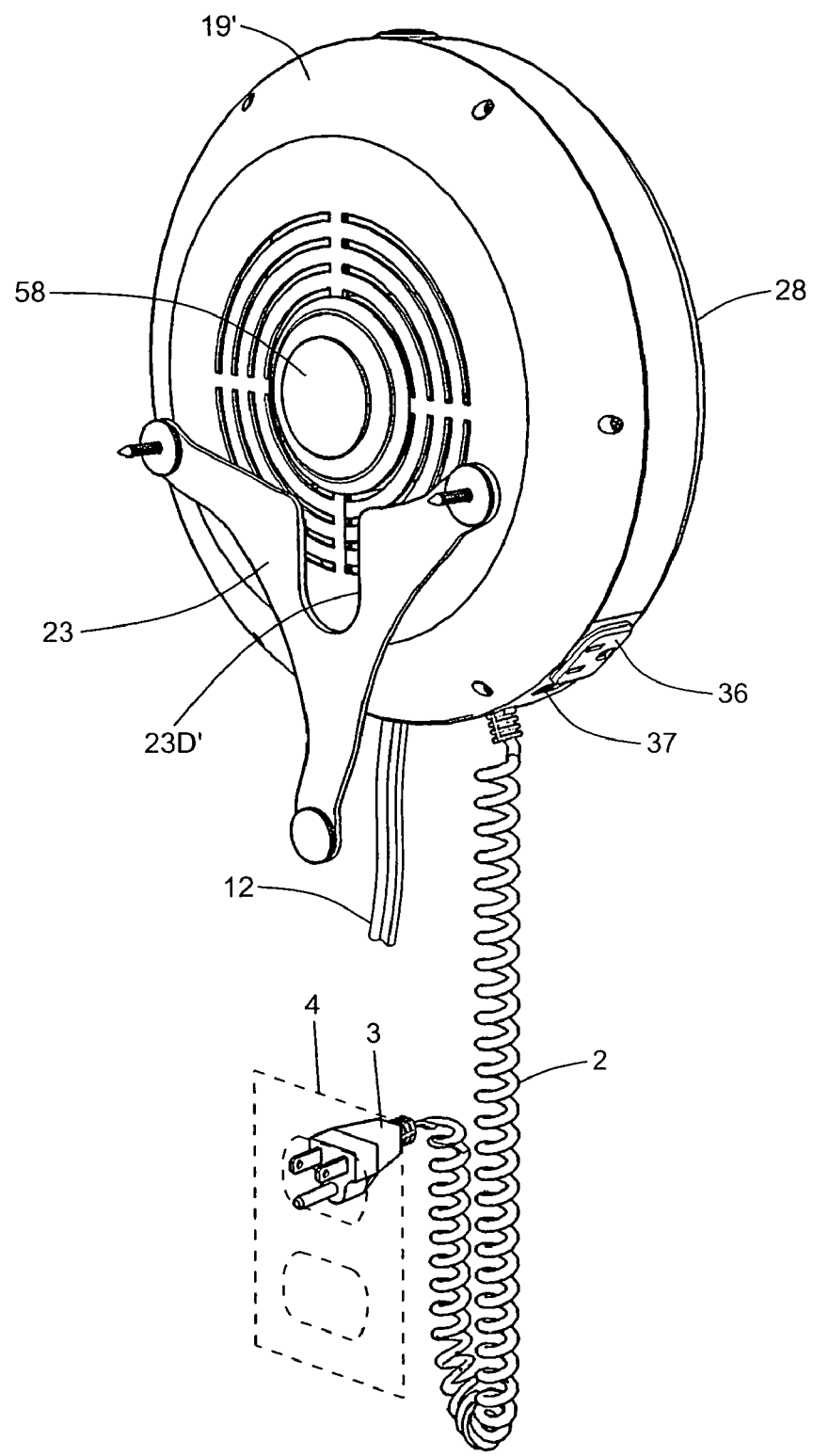
FIG. 15A is a first perspective view of the wall-supported power supplying device of FIGS. 10A through 10C, shown being mounted on the wall-mounting bracket affixed to wall surface above an electrical power receptacle formed therein.
Figure 15B:
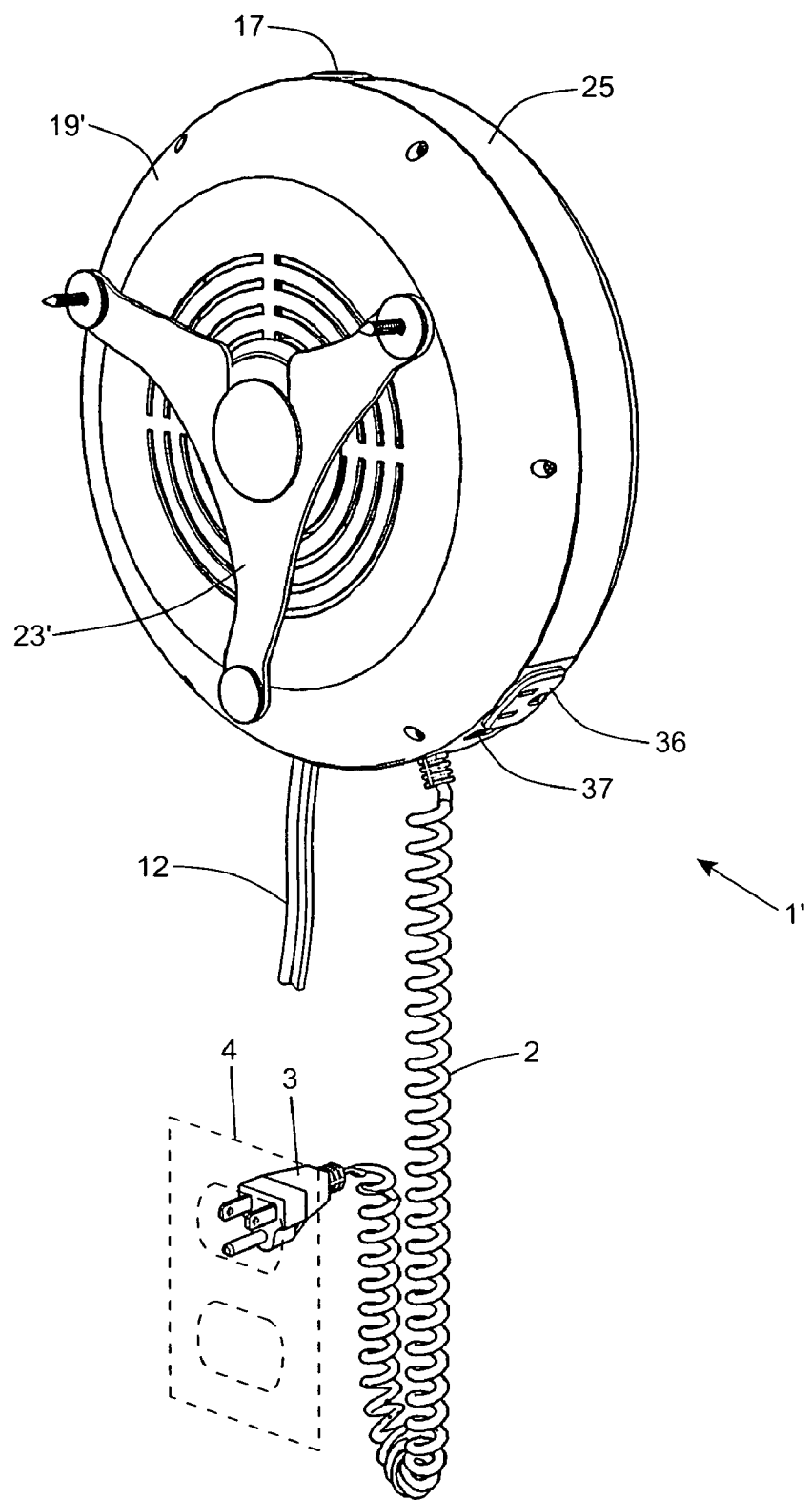
FIG. 15B is a second rear perspective view of the wall-supported power supplying device of FIG. 15A, shown mounted on the wall-mounting bracket and supplied with electrical (AC 120 Volt) power from the wall receptacle, via its flexible coiled power cord.

As shown in FIG. 15A the first step of the mounting method involves installing the mounting bracket 23' to a wall surface near a standard electrical power outlet 4. This is achieved by holding the mounting bracket 23' against the wall surface where mounting is to take place, and then screwing the pair of anchor screws 62A and 62B into the wallboard material in a manner known in the art. Then as shown in FIG. 15B, the mounting post 58 provided on the rear surface of the base housing portion 19' is slid into the mounting slot 23D' in a snap fit manner, which will bear the weight of the device while the foot portion makes contact with the wall surface, in a stable manner. Then the electrical power cord 2 of the device is plugged into the standard electrical power receptacle 4. When mounting is completed, the device will be supported on the wall surface as shown in FIG. 16. Now the device 1' is ready for supplying electrical power to a plurality of electrical appliances and managing the excess cord length thereof in accordance with the principles of the present invention.

Referring to FIGS. 17A through 17F, a method of supplying electrical power to appliances and managing excess power cord length in an environment, will now be described in connection with the wall-supported power supplying device 1' described above.

Figure 17A:
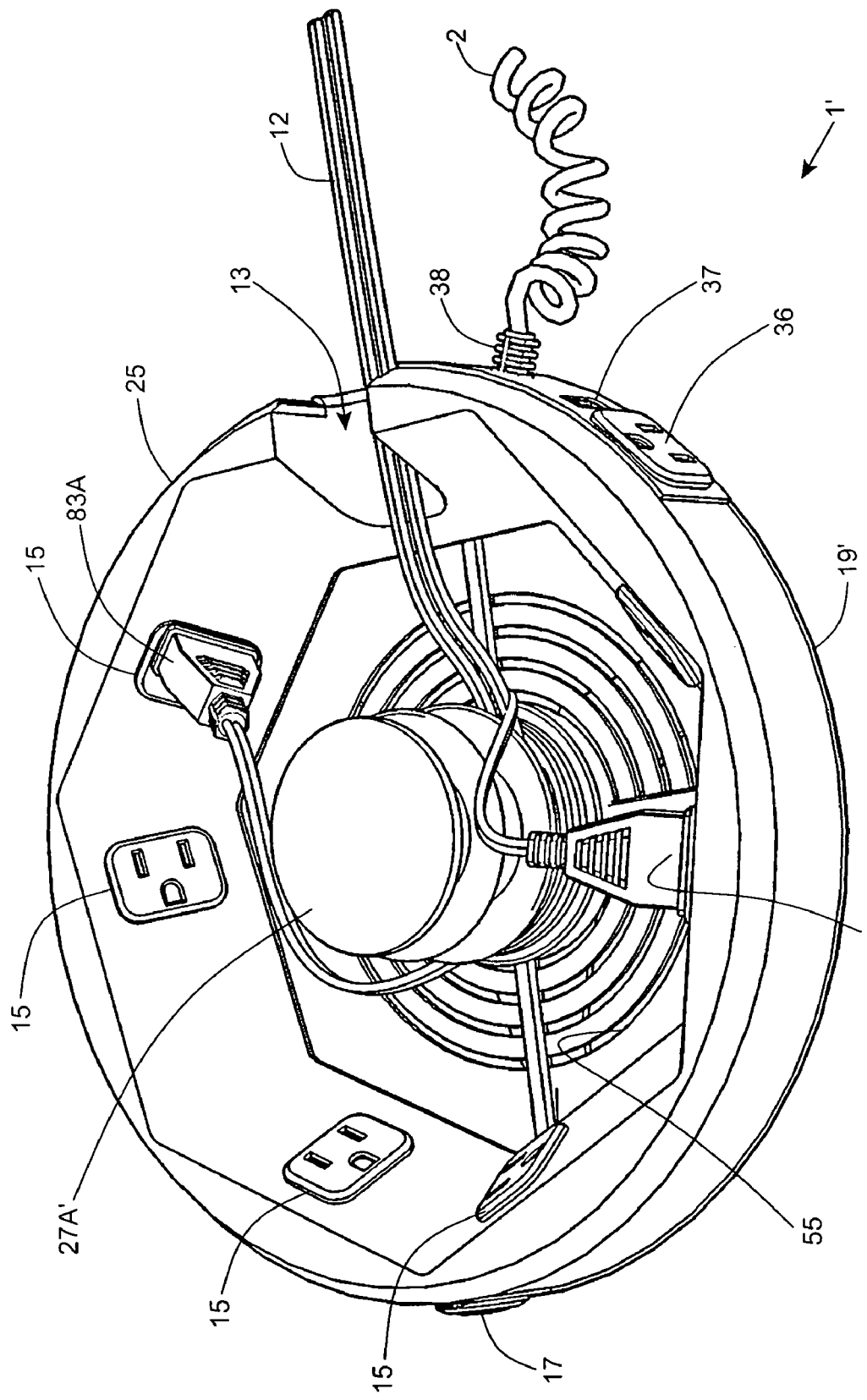
FIG. 17A is a perspective view of the wall-supported power supplying device of FIG. 14A, shown arranged and configured during a first step of the method of supplying electrical power to a group of appliances and managing the length of electrical power cords in accordance with the principles of the present invention.

As shown in FIG. 17A, the first step of the method involves removing the cover housing portion 28 from the base housing, and then routing one or more electrical power cords 2 from their respective electrical appliances, through the environment, to the power supplying device and through its power cord portal 13. The electrical plugs 83A, 83B are then plugged into available power receptacles 15 provided about the power-ring subassembly 14. With the electrical power cords routed neatly through the environment, the excess length of power cord between the power cord portal 13 and the electrical receptacle is wound up about an available section of the cord management dowel 27' disposed in the central volume of the device, so as to neatly management excess length of power cord therein.

Figure 17B:
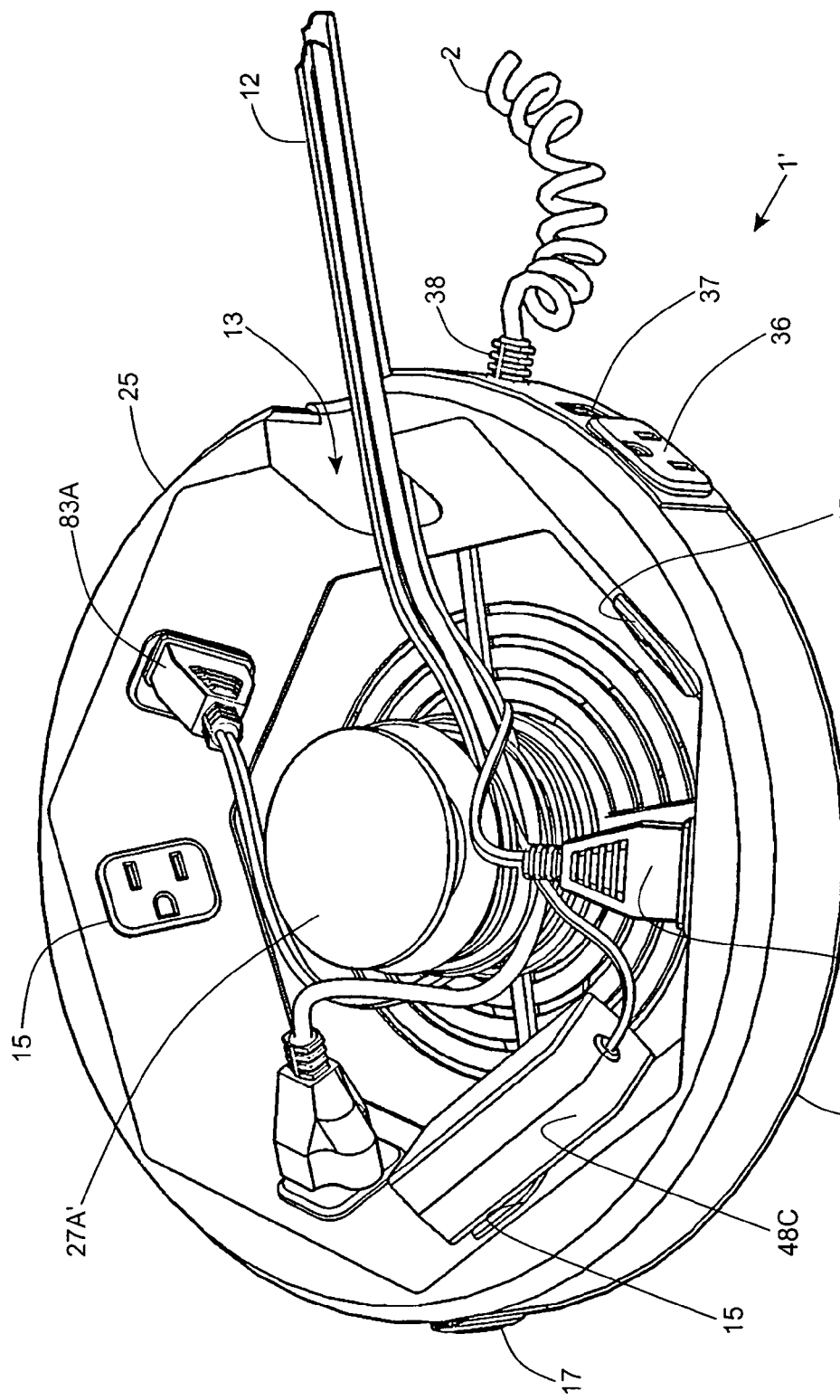
FIG. 17B is a perspective view of the wall-supported power supplying device of FIG. 14A, shown arranged and configured during a second step of the method of supplying electrical power to a group of appliances and managing the length of electrical power cords in accordance with the principles of the present invention.

As shown in FIG. 17B, another power cord 2 is then routed from its appliance through the environment, to the device 1' and through the power cord portal 13, and its electrical plug 83C is plugged into an available power receptacle provide about the power-ring subassembly. Then, the excess length of power cord between the power cord portal 15 and the power receptacle 15 is wound about an available section on the cord management dowel 27'. Then, another power cord is routed from its appliance, through the environment, to the device and through the power cord portal 13, and its power adapter plug 48A is plugged into an available power receptacle on the power-ring subassembly 14, adapted for accommodating the power adapter plug, as shown. Then the excess length of the power cord between the power cord portal 13 and the electrical receptacle 15 is wound about an available section on the cord management dowel 27', as shown.

Figure 17C:
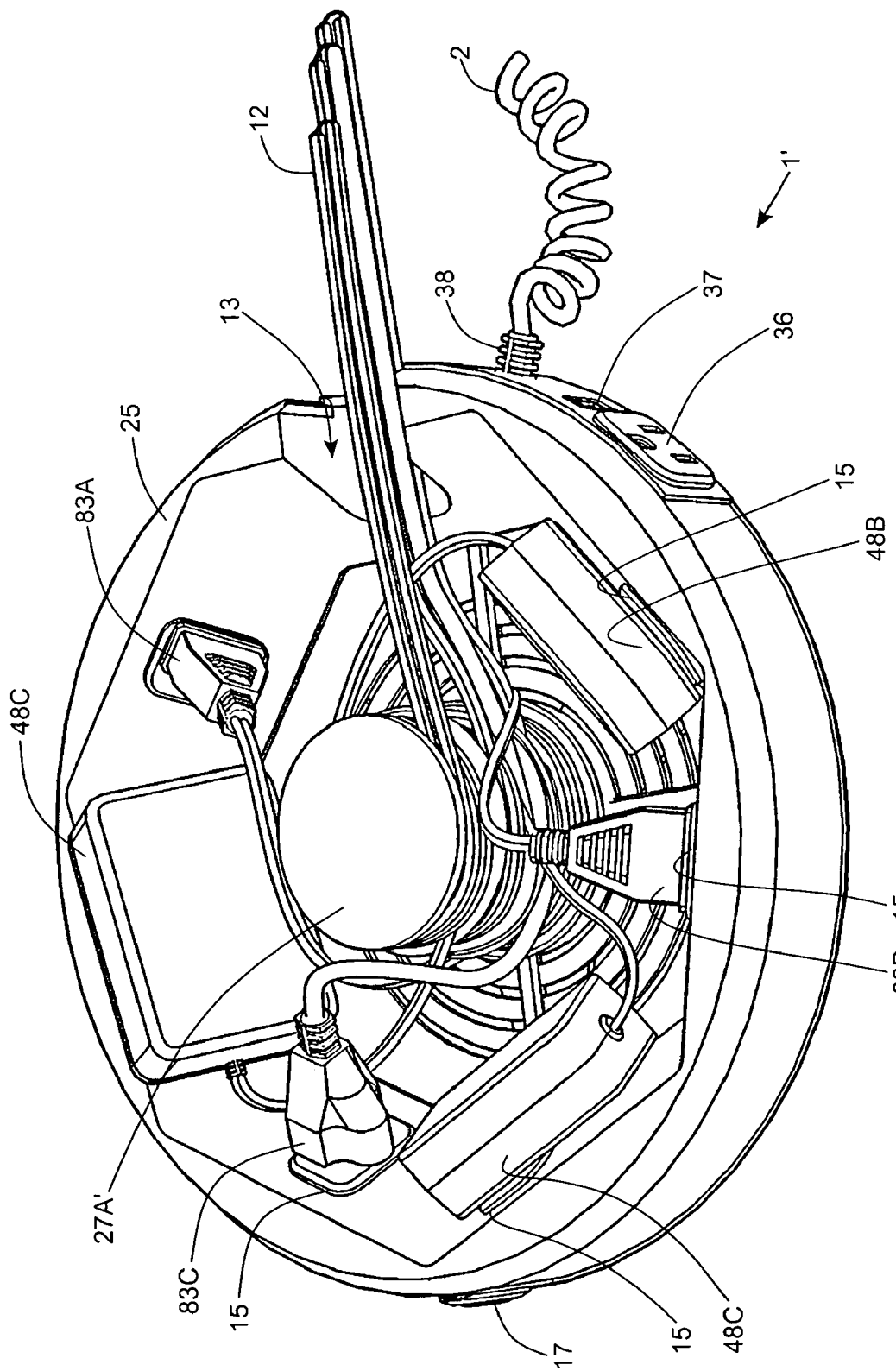
FIG. 17C is a perspective view of the wall-supported power supplying device of FIG. 14A, shown arranged and configured during a third step of the method of supplying electrical power to a group of appliances and managing the length of electrical power cords in accordance with the principles of the present invention.

As shown in FIG. 17C, the power cords from another pair of electrical appliances are routed through the environment, to the power supplying device and through the power cord portal 13. The associated power adapter plugs (or mid-line type power adapter modules) 48B, 48C are then plugged into available electrical receptacles on the power-ring subassembly 14, as shown. Then, for each power cord, the excess power cord between the power cord portal 13 and the electrical receptacle 15 is wrapped about an available section of the dowel post 27', as shown, in accordance with the power cord management principles of the present invention. As shown, the power cord bundle 12 extends out power cord portal 13 towards destination appliances deployed in the environment.

Figure 17D:
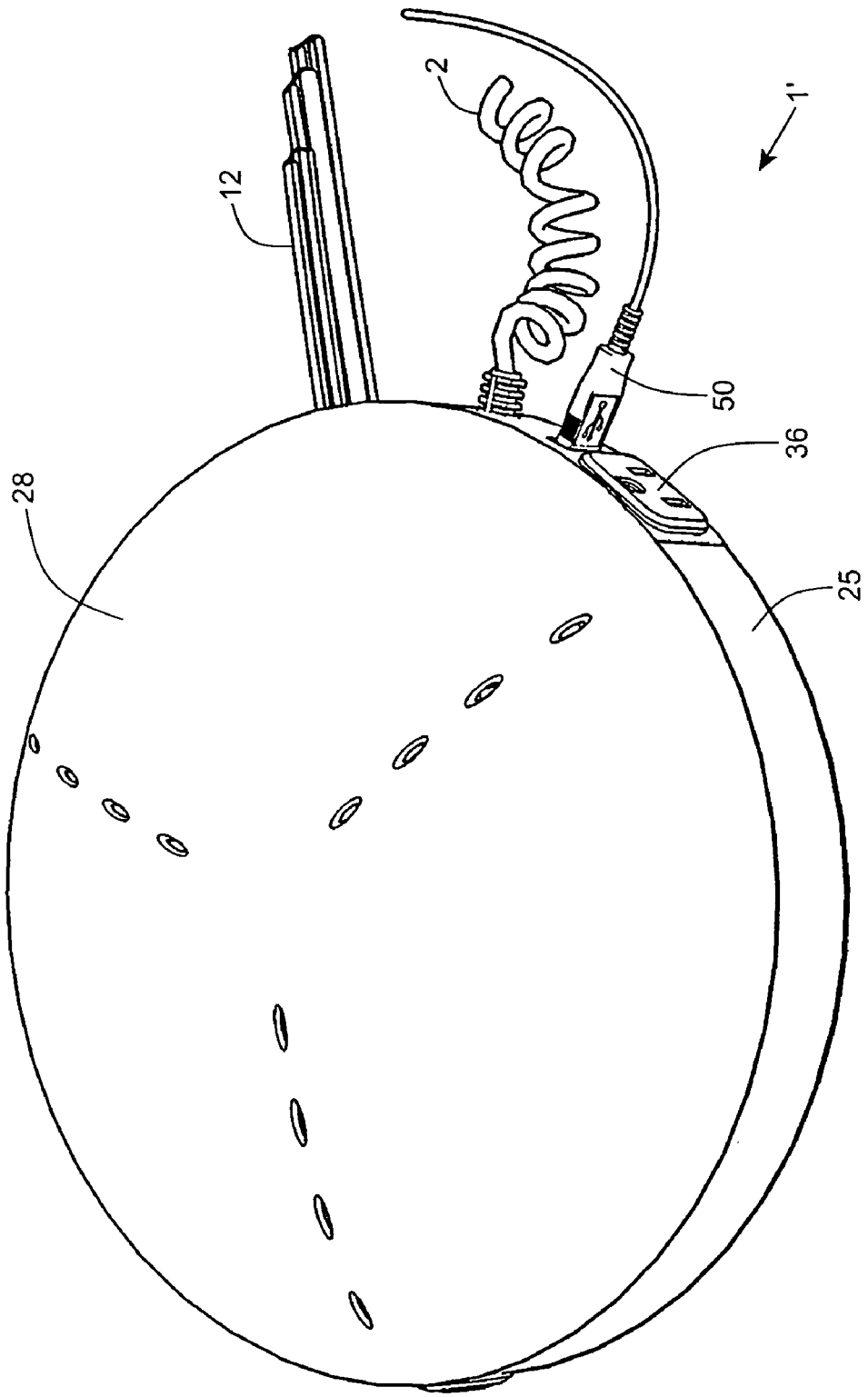
FIG. 17D is a perspective view of the wall-supported power supplying device of FIG. 14A, shown arranged and configured during a fourth step of the method of supplying electrical power to a group of appliances and managing the length of electrical power cords in accordance with the principles of the present invention.
Figure 17E:
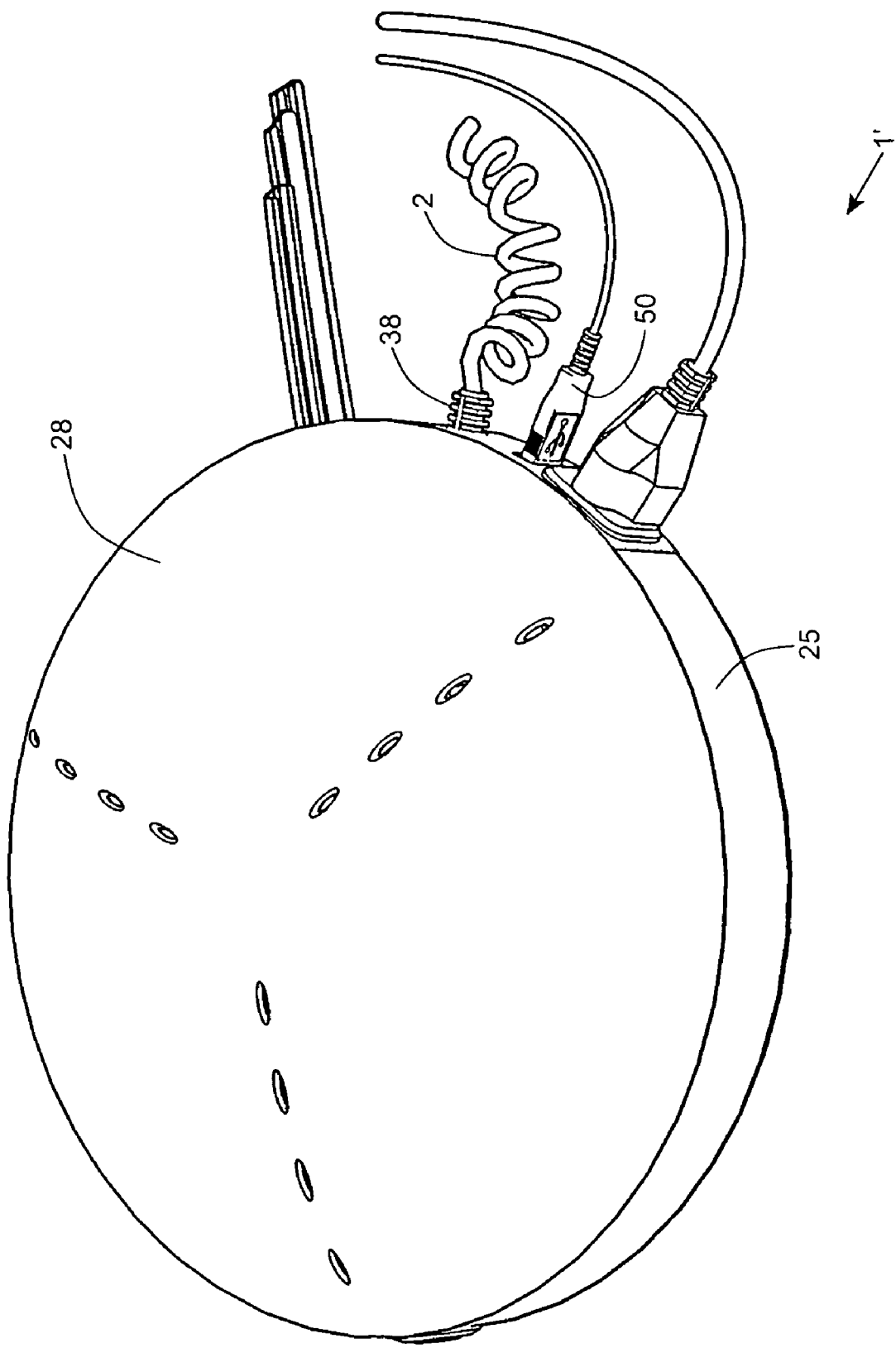
FIG. 17E is a perspective view of the wall-supported power supplying device of FIG. 14A, shown arranged and configured during the first step of the method of supplying electrical power to a group of appliances and managing the length of electrical power cords in accordance with the principles of the present invention.

As shown in FIG. 17D, the next step of the method is to replace the cover housing portion 28 onto the floor-supported power supplying device 1'. Thereafter, a USB power plug 50 can be plugged into the USB power port 37 provided on the exterior of the device, as shown. As shown in FIG. 17E, a power adapter plug 51' or standard power plug associated with an appliance in the environment can be plugged into the external power receptacle 36 supplied on the device.

At any time, the cover housing portion 28 can be easily removed from the power-ring housing 25, and power plugs, power adapter plugs and/or power adapter blocks can be easily removed, added or reconfigured within the power supplying device to meet requirements of electrical appliances deployed in the work, living and/or play environment, as the case may be.

Figure 18A:
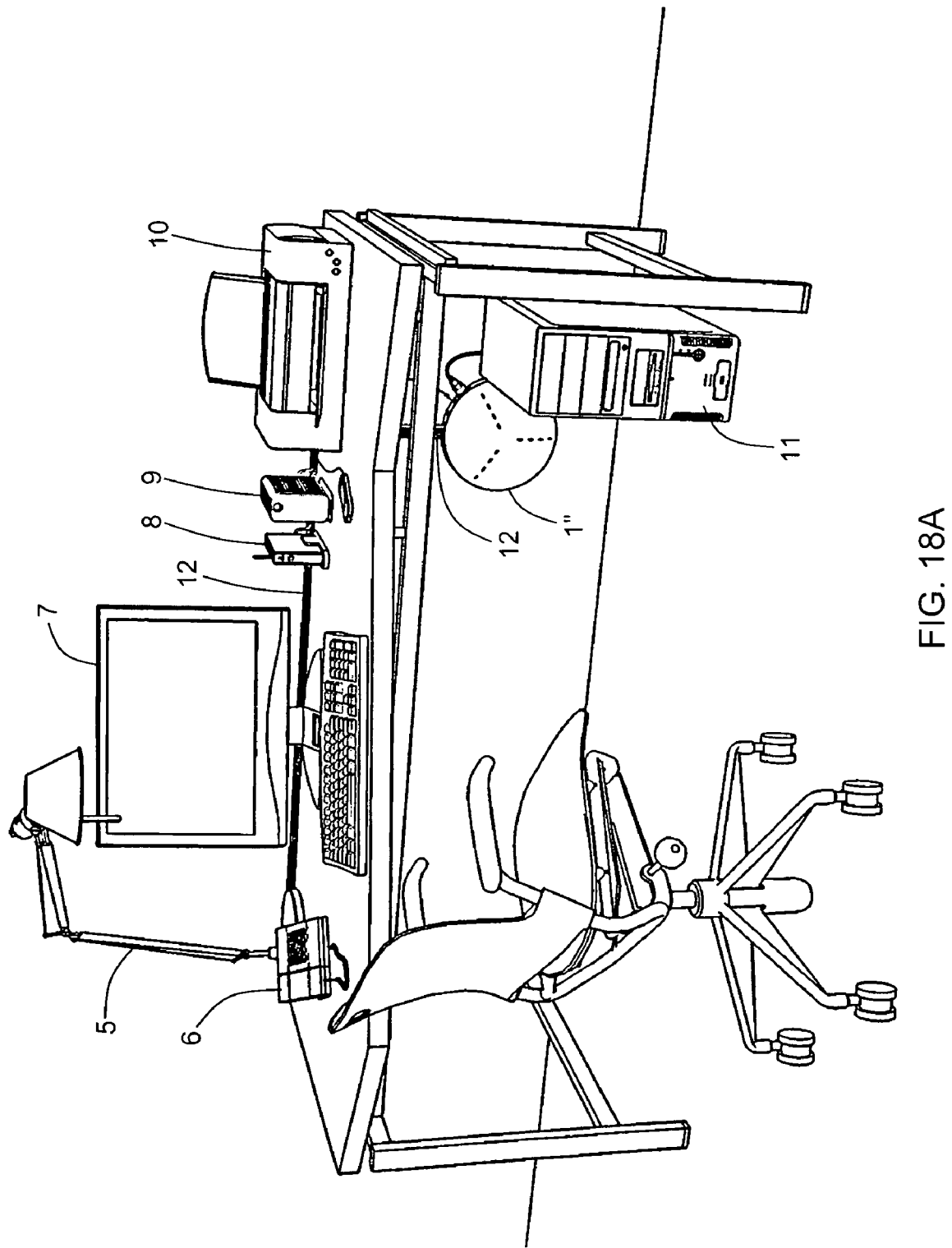
FIG. 18A is a first perspective view of a third environment in which an electrical power supplying device according to a third illustrative embodiment of the present invention is designed to plug directly into, and mount about a standard wall-based electrical receptacle or power outlet (120 VAC)
Figure 18B:
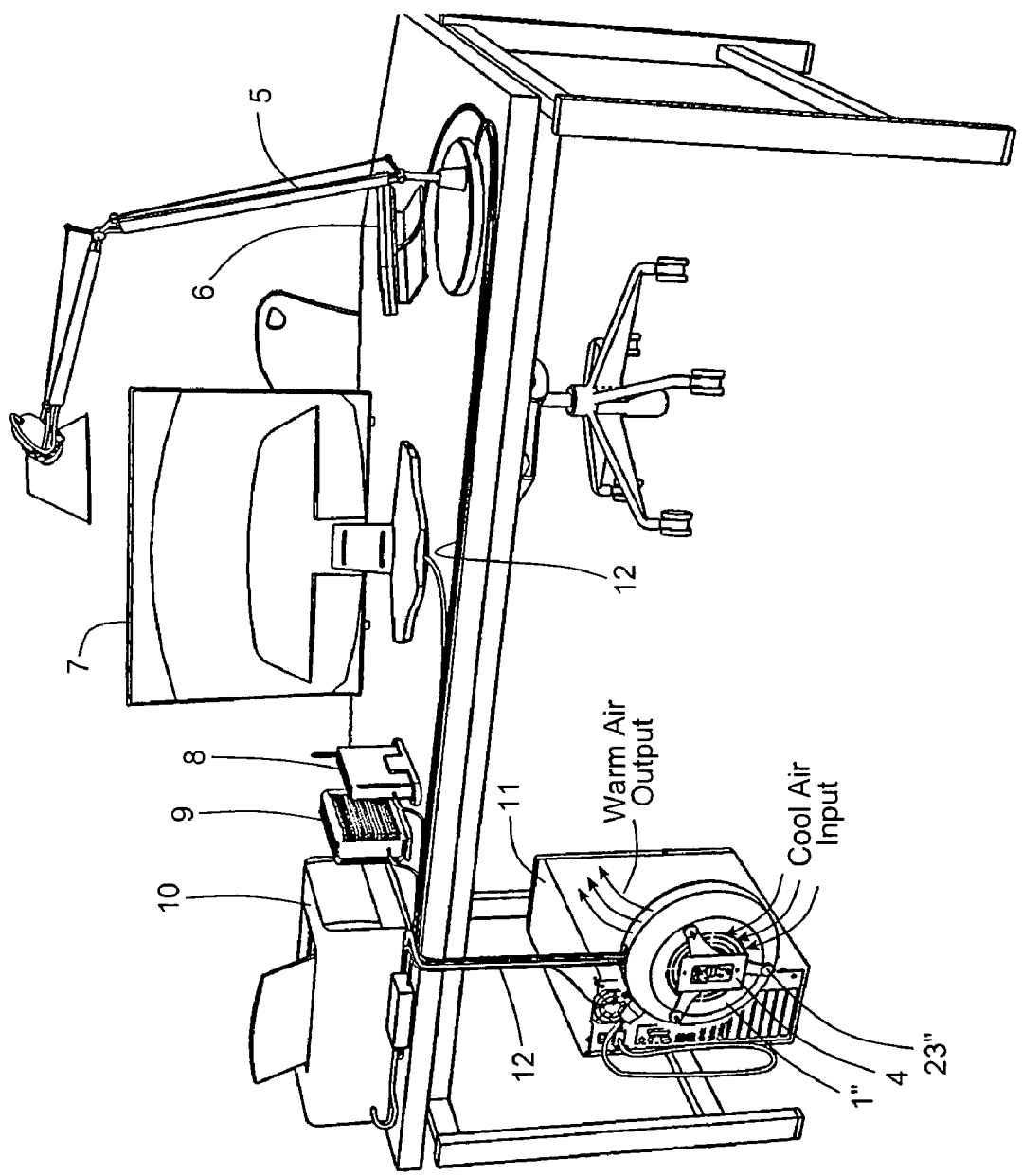
FIG. 18B is a second perspective view of the third environment in which the electrical power supplying device shown in FIG. 18A is deployed.

The Electrical Power Supplying Device According to a Third Illustrative Embodiment of the Present Invention In FIGS. 18A and 18B, a third environment is shown in which a third illustrative embodiment of the present invention is shown realized in the form of a wall-supported electrical power supplying device 1" that is supplied with electrical power from an electrical wall receptacle 4, that receives an electrical power plug 65 that is integrated with the rear portion of the base housing 19" of the device. The primary difference between device 1" and device 1" is that device 1" does not have a flexible coiled power cord 2, and receives electrical power through its integrated power plug 65, when plugged directly into a standard 120 Volt electrical receptacle 4. In all other respects, devices 1" and 1" are essentially the same.

Figure 19A:
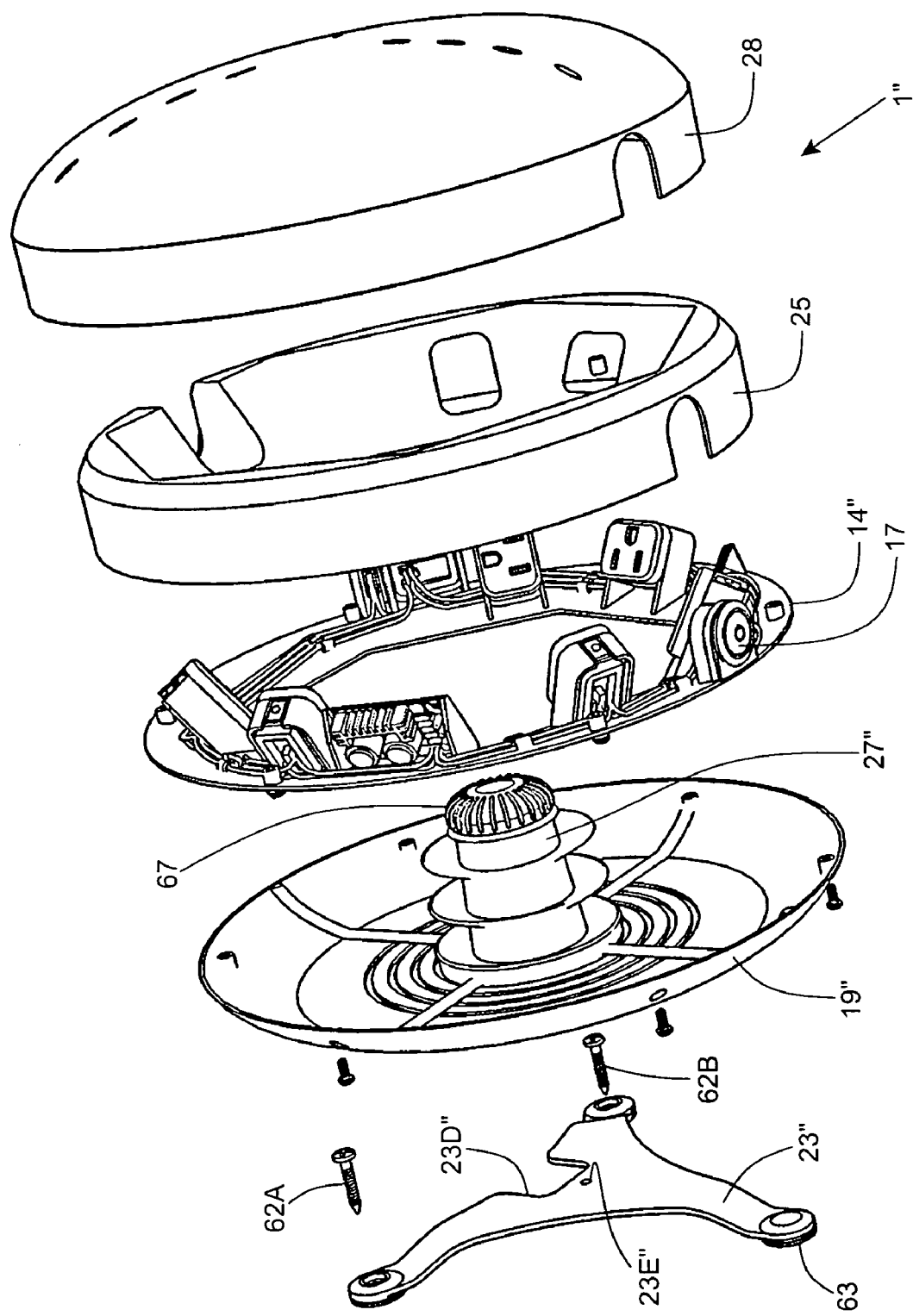
FIG. 19A is a first exploded view of the electrical power supplying device shown in FIGS. 18A and 18B.
Figure 19B:
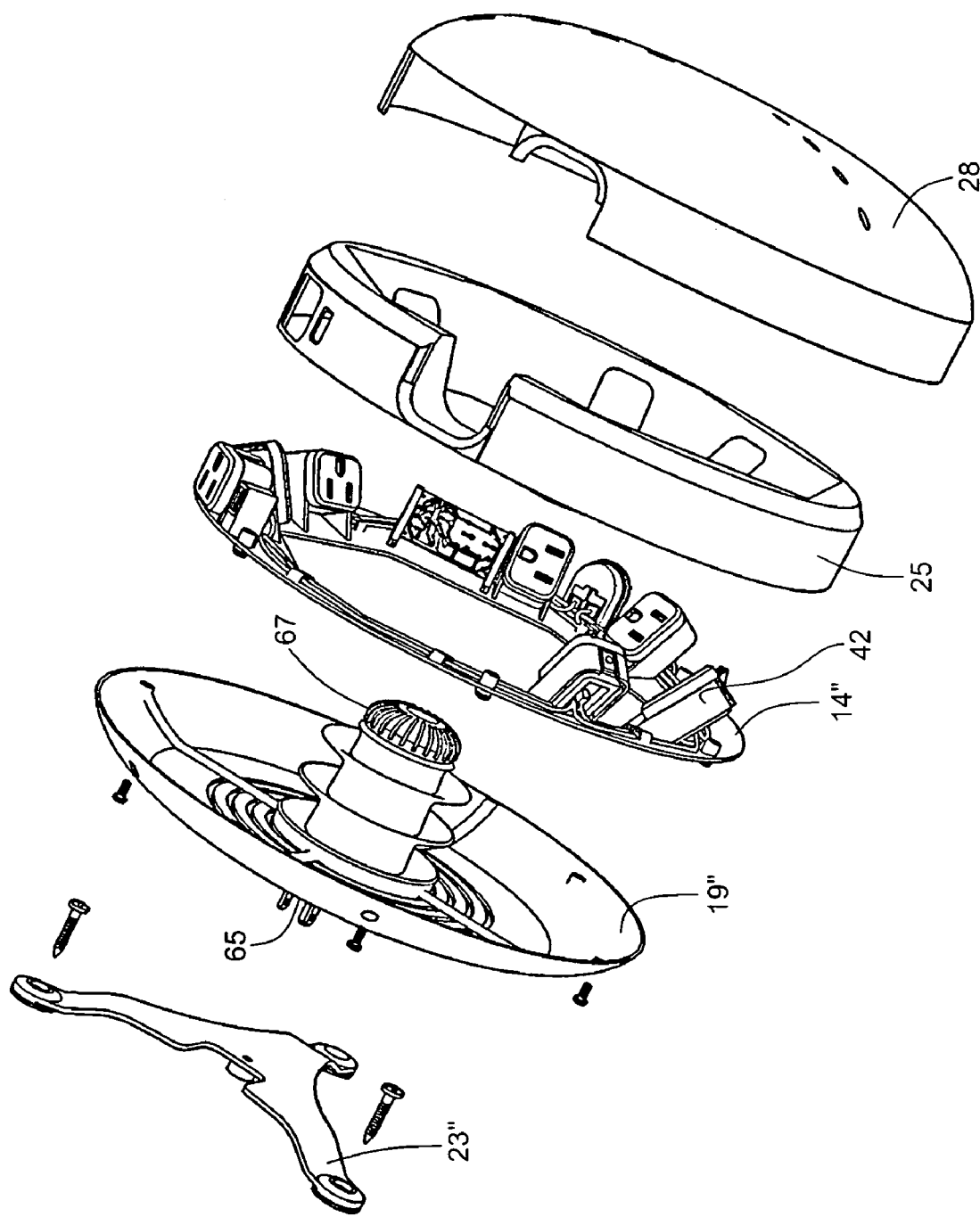
FIG. 19B is a second exploded view of the electrical power supplying device shown in FIGS. 18A and 18B, shown from a different perspective to reveal other aspects of the device.
Figure 19C:
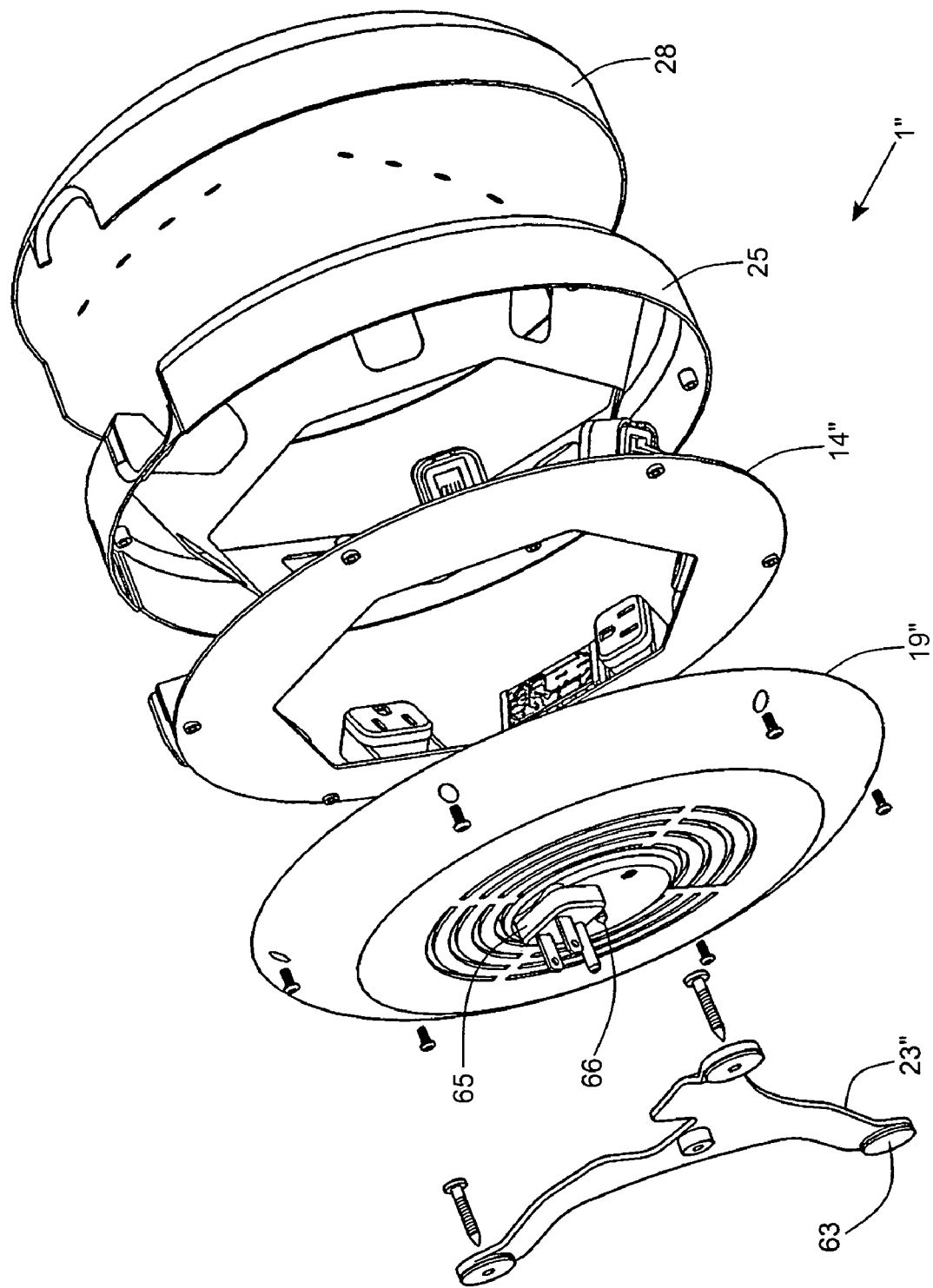
FIG. 19C is a third exploded view of the electrical power supplying device shown in FIGS. 18A and 18B, shown from yet a different perspective to reveal other aspects of the device.

As shown in FIGS. 19A through 19C, the wall-mounted electrical power supplying device 1" comprises an assembly of components, namely: a power-ring subassembly 14' (essentially the same as subassembly 14 except not provided with a power cord connector 38) and having a central aperture 14A and adapted to support electrical receptacles 15 and electronic circuits 16, an ON/OFF switch and indicator 17 provided with a glowing LED ring that indicates the state of the device using different glow colors (e.g. Green=READY, Red=NOT READY), and other electrical components 36, and 37, and connect to integrated power plug 65 via a jumper-type wiring connector; a low-profile base tray housing 19" adapted for supporting the power-ring assembly 14" via a set of screws or like fasteners 20, and having (i) low-profile geometrical dimensions suitable for mounting close to a wall surface, (ii)

electrical power plug 65 integrated with the rear portion of the base housing 19", and fitting into a square-shaped slot 23D" formed a wall-mounting bracket 23", that is attachable to a wall surface, and (iii) a mounting screw 66 that projects from the rear portion of the base tray housing below the electrical power plug 65 and can be turned into threaded hole 23E" formed below the slot 23D" in the wall-mounting bracket by turning a knob 67 accessible in the front side of the base tray housing, on top of a cord management dowel 27" shown in FIGS. 23 and 24; a power-ring housing portion 28 for covering the power-ring subassembly 14" and attaching to the base housing portion 19", and provided with a set of plug apertures 26 for passing the electrical plugs of power cords associated with appliances to electrical receptacles 15 mounted directly behind the plug apertures 26, and a power cord portal aperture 13 allowing a group or bundle of electrical power cords associated with a set of electrical appliances, to enter/exit the device, as shown; a cord management dowel 27" secured to and positioned in the central portion of the base tray housing portion 19", and having been provided with a set of concentric flanges 27B" about its outer surface, for the purpose of neatly taking up and managing excess lengths of electrical power cords associated with the appliances receiving power from the device (e.g. by winding the excess length of power cord about the dowel); and a top cover housing portion 28 adapted to slide onto the upper portion of the power-ring housing portion 25" and snap into position, and having (i) air vents 29 for passage of air and providing ventilation to the interior of the device, (ii) a set of gripping threads 30 provided along the circumference of the cover housing portion to aid in the lifting of the cover as required, (iii) a side wall aperture 31 for the passage of electrical cords through the cable portal 13 formed in the power-ring housing cover 25", and (iv) side wall apertures 32, 33, and 35 providing access to the exterior power receptacle 36, USB power port 37, and ON/OFF power switch and indicator 17, respectively.

Taken together, air circulation vents 55 formed in the base portion of housing 19' and air vents 29 formed in the cover housing 28, and air vents formed in dowel post 27A" provide a passive-type of thermal management system embodied within the device to maintain power adapters contained therein with safe operating temperatures. In FIG. 18B, illustrative cool and warm air flows are shown moving through the thermal management system.

As shown in FIG. 19B, port openings 33, 32 formed in the sidewall of the power-ring housing portion 25", provide access to a USB power port 37, and an externally-accessible electrical receptacle 36. As shown, the electrical receptacles 15 and electronic circuit boards 16 are snap-fit mounted into mounting brackets 42 provided on the upper surface of the power-ring assembly 14" along with electrical wiring 43 among electrical and circuit board components 15, 16, 17, 36 and 37, making the necessary interconnections as specified in FIG. 13B. As shown in FIG. 10C, rubber feet 45 are provided on the wall-bracket/unit base 23" to prevent marring of wall floor surfaces, and sliding on floor or desktop surfaces and the like. Also, the five primary components assemble easily along a common axis, lending the design to easy and cost effective product manufacture, testing, and maintenance.

As shown in FIGS. 19A and 19B, the power-ring subassembly 14" comprises: a substantially planar structure 14B, having a central aperture 14A for passage and location of the cord management dowel deck 27" supported on the bottom portion of the base housing 19"; a plurality of mounting brackets 42, formed or provided on planar surface 14B, for snap-fit mounting of electrical receptacles 15, as well as electronic PC circuit boards 16 and other electrical components 17, 36 and 37 specified in the electrical circuit diagram of FIG. 19B; and grooves, tracks or projections 43 provided on the surface of planar structure 14B, for the mounting and routing of electrical conductors 44 that interconnect together the electrical components in the circuit of FIG. 21B, and supply electrical power thereto, during device operation.

Figure 20A:
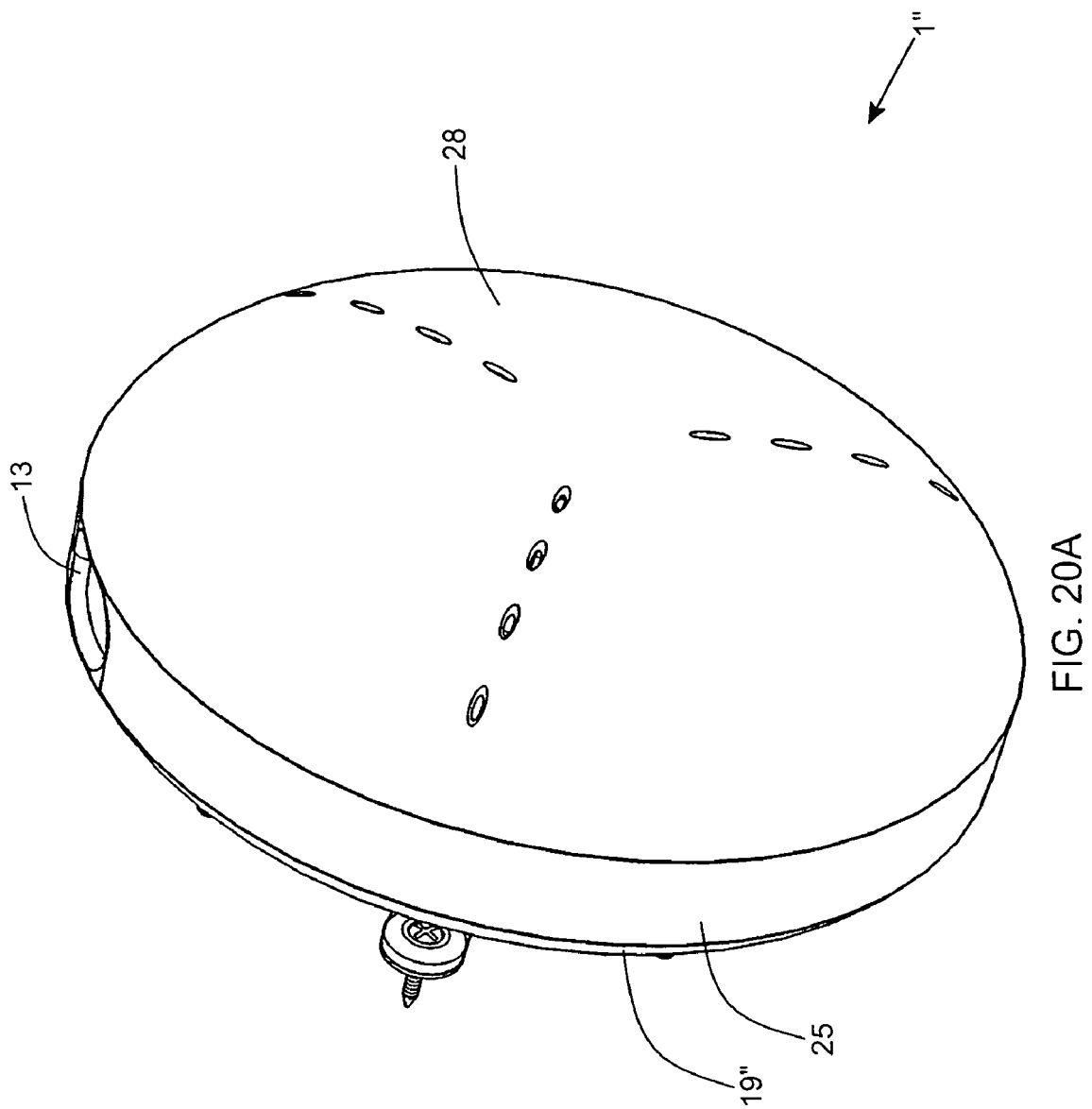
FIG. 20A is a frontal perspective view of the electrical power supplying device shown in FIGS. 19A through 19C.
Figure 20B:
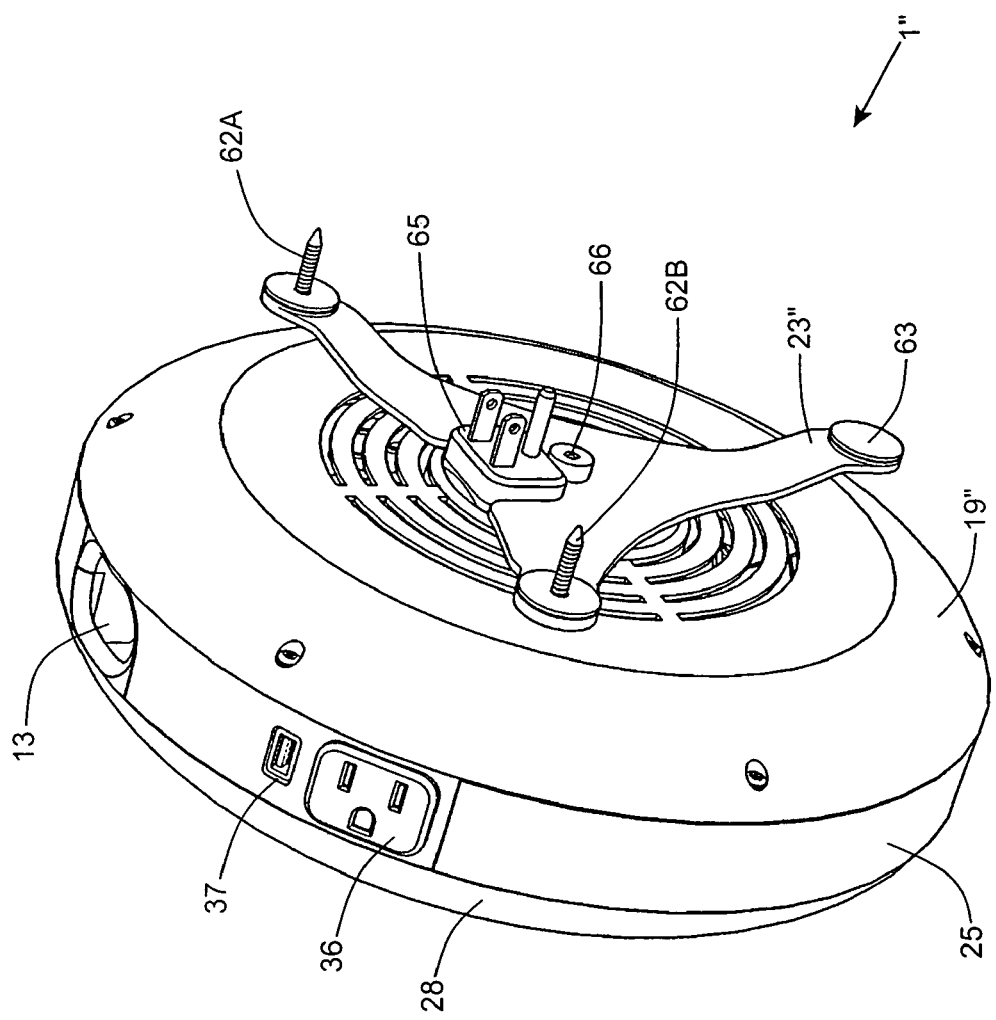
FIG. 20B is a first rear perspective view of the electrical power supplying device shown in FIGS. 19A through 19C.
Figure 20C:
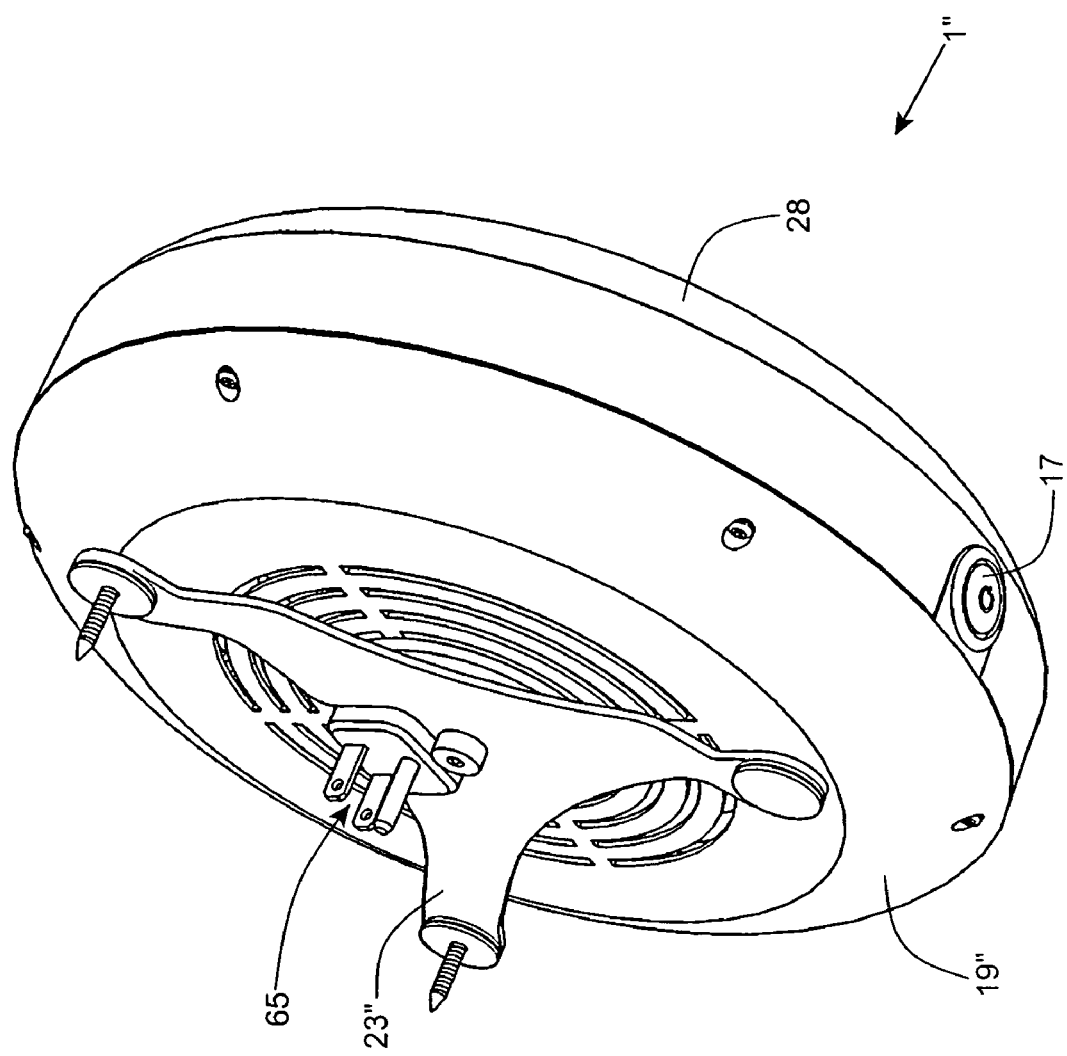
FIG. 20C is a second rear perspective view of the electrical power supplying device shown in FIGS. 19A through 19C.
Figure 21:
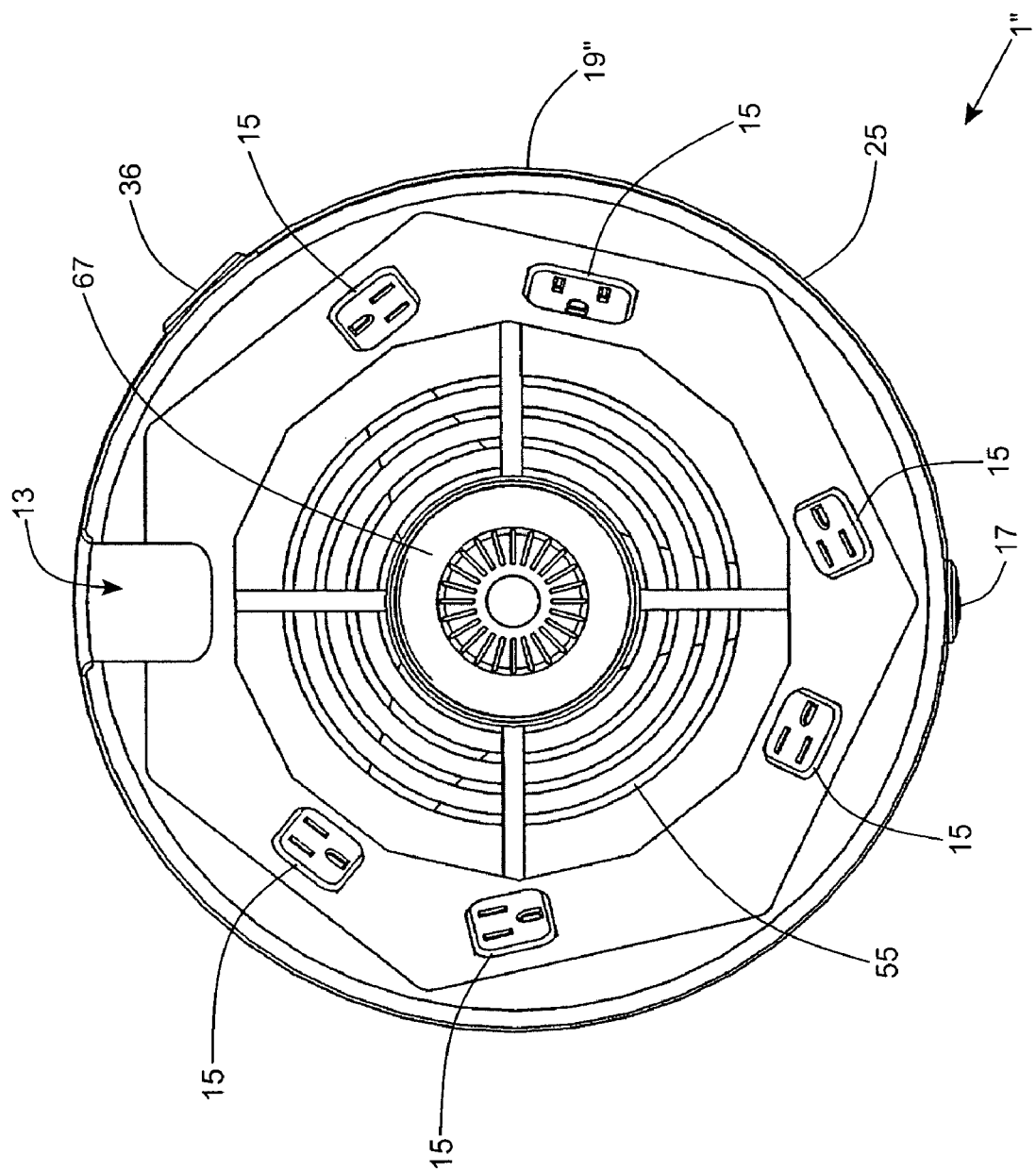
FIG. 21 is a plan view of the electrical power supplying device of FIGS. 19A through 19C, with its cover removed, and without any power plugs or power adapters plugged into electrical power receptacles supported on the power-ring subassembly of the device.
Figure 22:
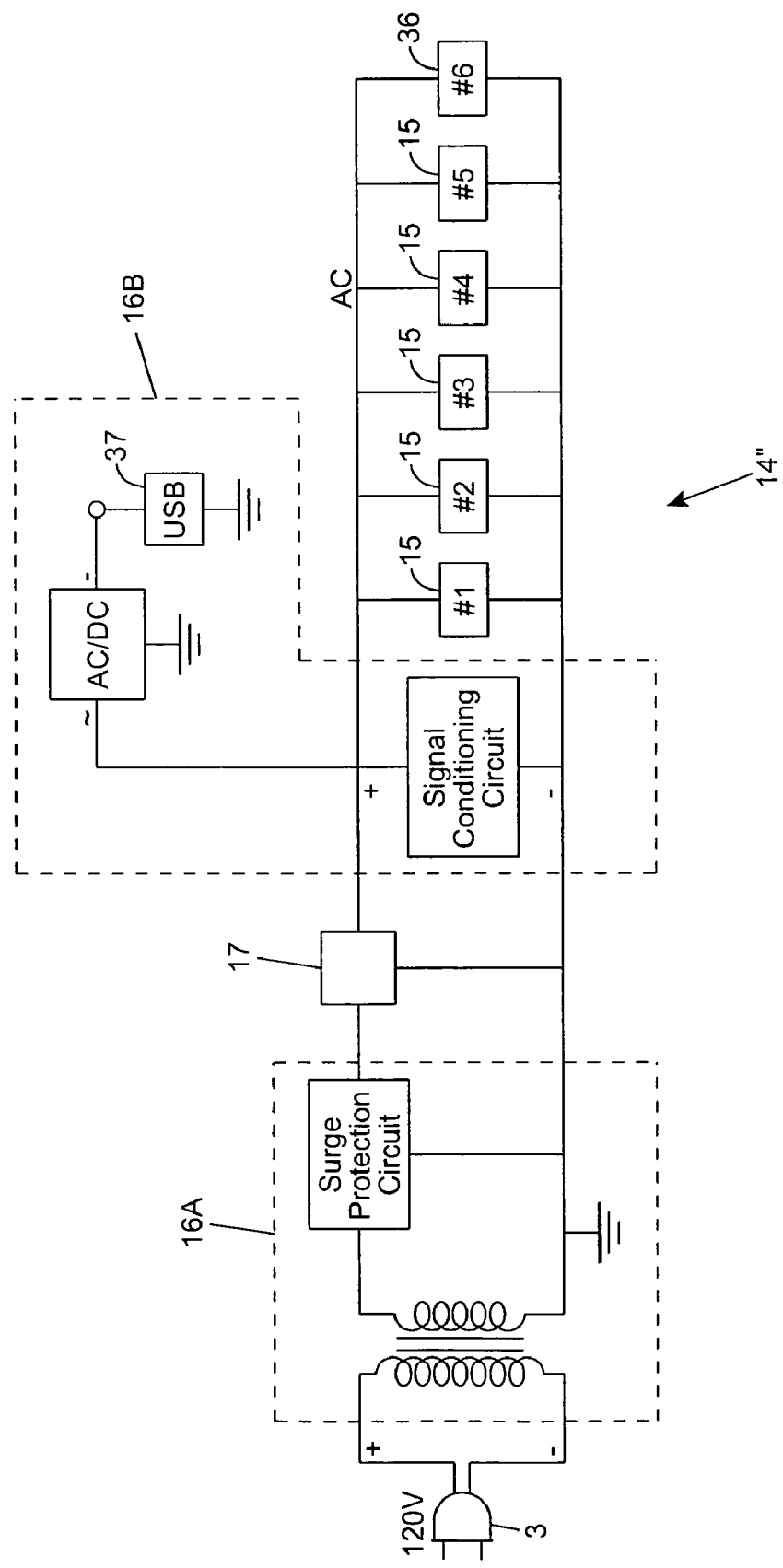
FIG. 22 is a schematic representation of the electrical and electronic components supported on the power-ring subassembly shown in FIG. 21.

As shown in FIGS. 20A through 20C, the electrical power supplying device 1" is ideally designed for support against a wall surface, given its low-profile housing, and provides external access to an external power receptacle 36 and USB power port 37, while a bundle of power cables 12 from electrical appliances enter/exit the power cord portal 13 provided on the side of the wall-mountable device. The device 1" is capable of providing electrical power to a number of electrical appliances supported at the workstation of FIGS. 18A and 18B, while concealing the power plugs and power adapter plugs of the appliances 5 through 11 deployed within its housing, and neatly managing the excess length of electrical power cords associated with the electrical appliances, in accordance with the principles of the prevent invention.

As shown in FIG. 21A, the cover housing portion 28 is removed from the wall-supported power supplying device, and there are no electrical appliances connected to and powered by the device. FIG. 21A reveals a number of features: (i) that the electrical receptacles 15 are arranged in orthogonal ways, and spaced apart from each other, to optimize space within the interior volume of the device, to accommodate the storage of different sized power adapter plugs that are formed at the terminal portion of appliance power chords; and (ii) that the integrated power plug 65 directly plugs into any suitable wall socket 4 provided within the space of the workstation.

Figure 23:
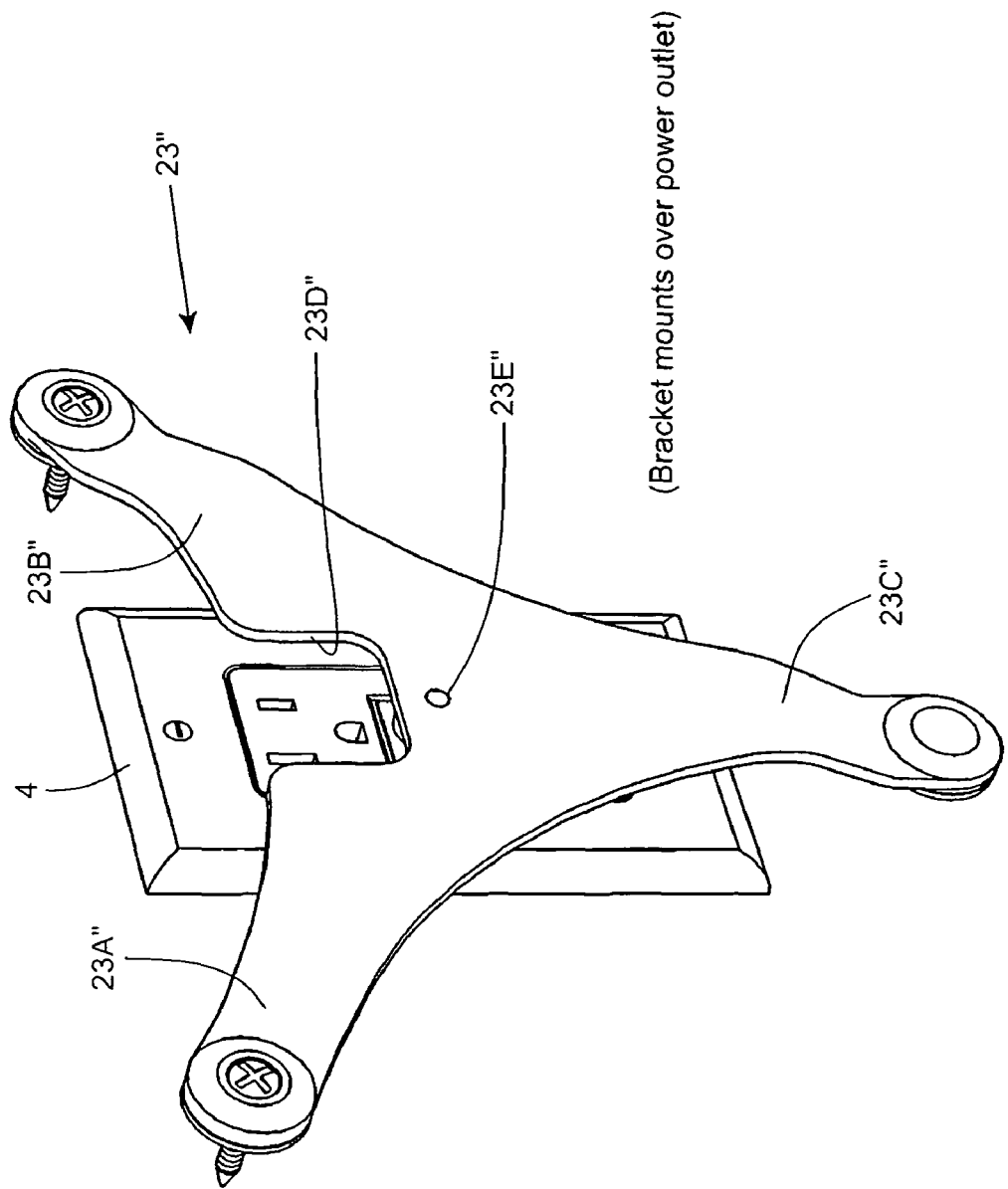
FIG. 23 is a perspective view of the wall-mounting bracket of the present invention, mounted to a wall surface about an electrical power outlet.

The wall-mounted electrical power supplying device 1" can be mounted to virtually any wall surface using the wall-mounting bracket 23" shown in FIG. 23. As shown in FIG. 23, bracket 23" comprises: (i) a pair of arm portions 23A" and 23B" each provided with screw anchors 62 and 63, respectively, that screw into the wall surface and fasten the arm portions securely thereto to prevent movement of the mounting bracket relative to the wall surface, and supporting the weight of the device; (ii) a foot portion 23C", arranged at about a 120 degrees from each arm portion 23A" and 23B", and provided with a rubber non-slip pad 63 for safely contacting the wall surface; (iii) a square-shaped slot 23D" formed between arm portions 23A" and 23B" for passage of the integrated power plug 65 and into the wall receptacle 4; and (iv) a threaded mounting hole 23E" formed below the slot 23D" in the wall-mounting bracket, for receiving threaded mounting screw 66, which is turned into mounting hole 23E" by turning knob 67 provided on top of a cord management dowel 27", as shown in FIG. 25.

Figure 24:
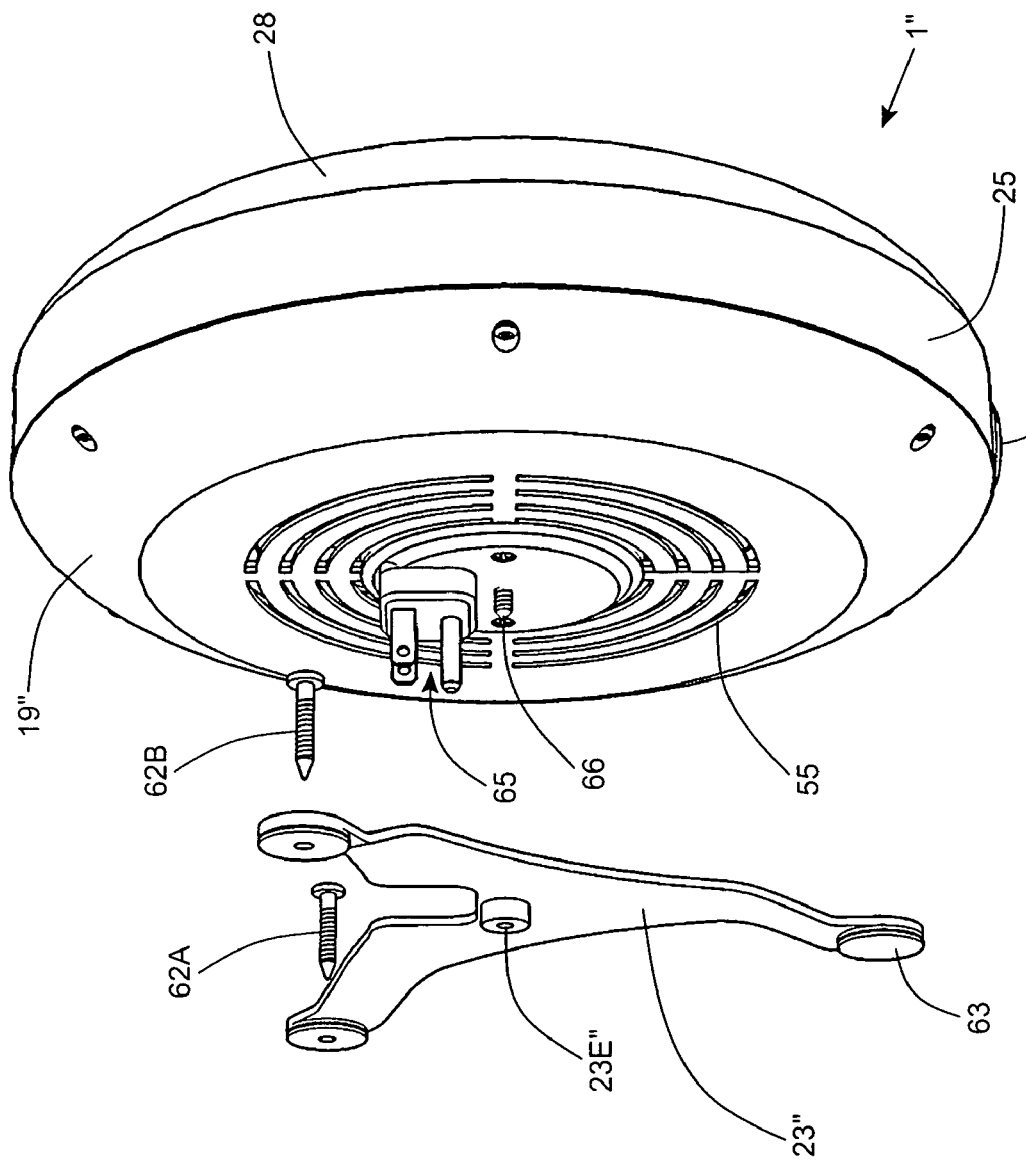
FIG. 24 is a perspective view of the wall-mounting bracket for the electrical power supplying device of FIGS. 19A through 19C, being mounted to a wall surface.

As shown in FIGS. 23 and 24, the first step of the wall mounting method involves installing the mounting bracket 23" to a wall surface near a standard electrical power outlet 4. This is achieved by holding the mounting bracket against the wall surface where mounting is to take place, and then screwing the pair of anchor screws 62A and 62B into the wallboard material in a manner known in the art. Then, as shown in FIG. 24, the electrical power plug 65 is plugged into the wall receptacle 4, and mounting screw 66 is threaded into the mounting hole 23E", by turning knob 67, as shown in FIG. 21A, to fasten the device to the wall-mounted bracket 23". Once mounting screw 66 is fully threaded into its mounting hole 23E", the bracket will bear the weight of the device while its foot portion 23C" makes contact with the wall surface, in a stable manner. Now device 1" is ready for supplying electrical power to a plurality of electrical appliances and managing the excess cord length thereof in accordance with the principles of the present invention.

Figure 25:
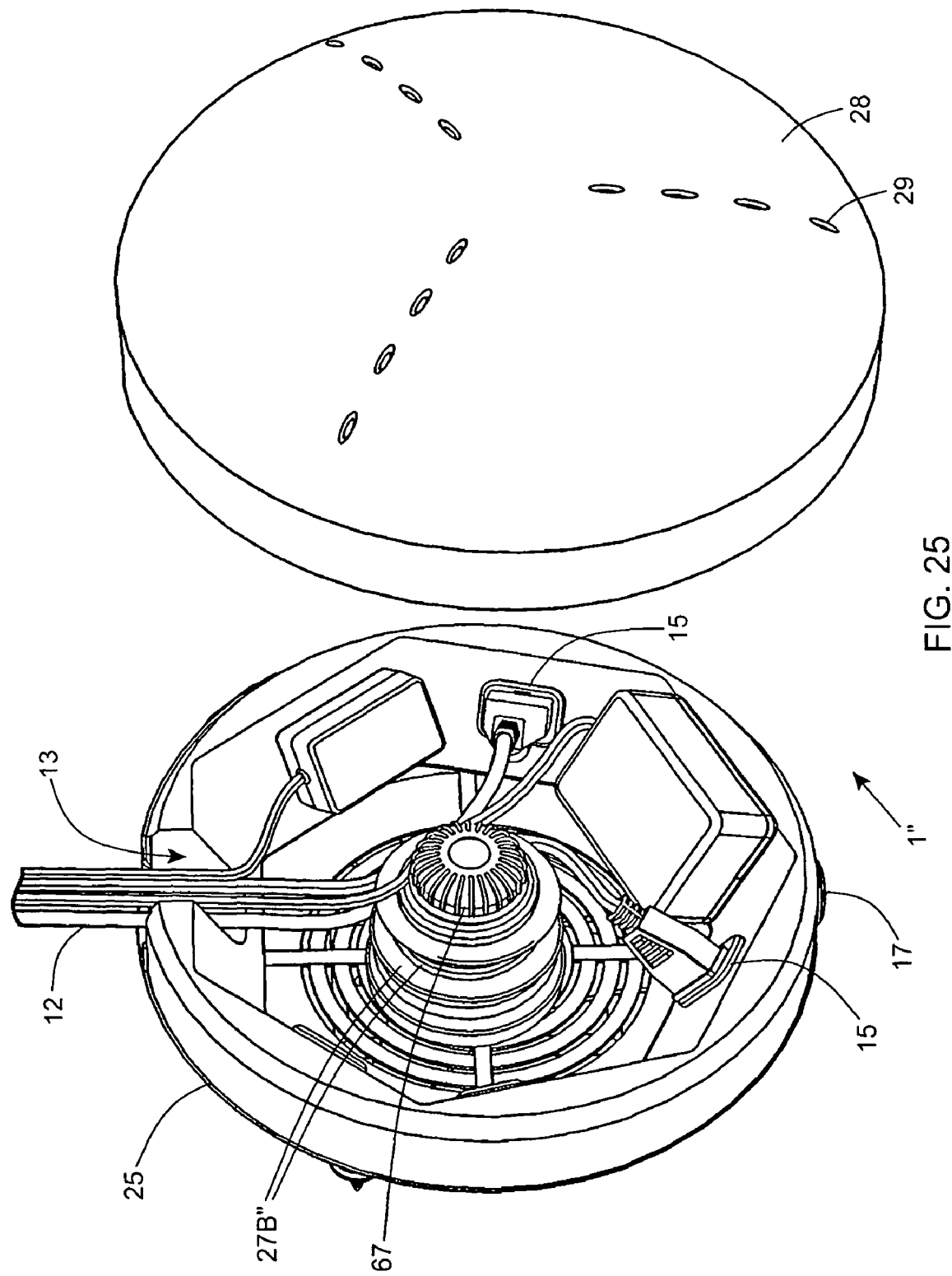
FIG. 25 is a perspective view of the electrical power supplying device of FIGS. 19A through 19C, shown with its cover removed, and a plurality of power plugs and power adapter plugs, plugged into electrical power receptacles supported on the power-ring subassembly of the device.

Referring to FIG. 25, a method of supplying electrical power to appliances and managing excess power cord length in an environment will be now described in connection with the wall-supported power supplying device 1" described above.

As shown in FIG. 25, the first step of the method involves removing the cover housing portion 28 from the base housing, and then routing one or more electrical power cords from their respective electrical appliances, through the environment, to the power supplying device and through its power cord portal 13. The electrical plugs are then plugged into available power receptacles provided about the power-ring subassembly. With the electrical power cords routed neatly through the environment, the excess length of power cord between the power cord portal 13 and the electrical receptacle is wound about an available section of the cord management dowel 27" disposed in the central volume of the device, so as to neatly management excess power cord therein, in accordance with the present invention.

Another power cord is then routed from its appliance through the work environment, to the device and through the power cord portal 13, and its electrical plug is plugged into an available power receptacle provided about the power-ring subassembly. Then, the excess length of power cord between the power cord portal 13 and the electrical receptacle 15 is wound about an available section on the cord management dowel 27". Then, another power cord is routed from its appliance, through the work environment, to the device and through the power cord portal 13, and its power adapter plug is plugged into an available power receptacle on the power-ring subassembly, adapted for accommodating the power adapter plug, as shown. Then the excess length of the power cord between the power cord portal 13 and the electrical receptacle 15 is wound about an available section on the cord management dowel 27", as shown.

As shown in FIG. 25, power cords from other electrical appliances can be routed through the work environment, to the power supplying device and through the power cord portal 13. The associated power adapter plugs (or mid line-type power adapter modules) are then plugged into available electrical receptacles on the power-ring subassembly, as shown. Then, for each power cord, the excess power chord between the power cord portal 13 and the electrical receptacle 15 is wrapped about an available section of the dowel post 27", as shown, in accordance with the power cord management principles of the present invention.

Thereafter, a USB power plug 50 can be plugged into the USB power port 37 provided on the exterior of the device. Also, a power (adapter) plug 51 associated with an appliance in the workstation environment can be plugged into the external power receptacle 36 supplied on the device.

At any time, the cover housing portion 28 can be easily removed from the power-ring cover housing portion 25", and power plugs, power adapter plugs and/or power adapter blocks can be easily removed, added or reconfigured within the power supplying device 1" to meet the requirements of electrical appliances deployed in the work, living and/or play environment, however the case may be.

Figure 26:
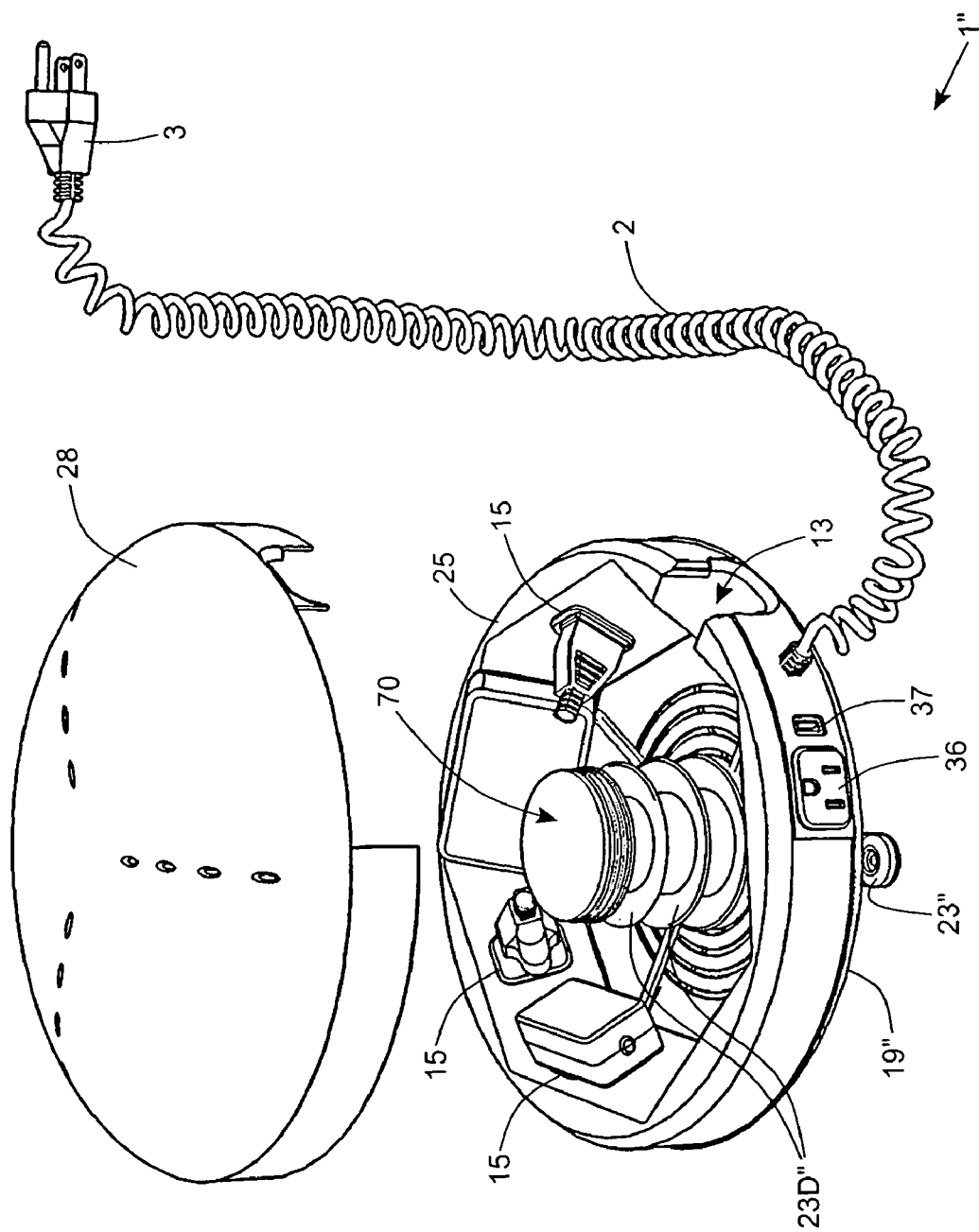
FIG. 26 is a perspective view of a fourth illustrative embodiment of the electrical power supplying device of the present invention, shown mounted on countertop surface with its cover housing portion removed, and revealing a plurality of power plugs and adapters plugged into the power-ring subassembly of the device (with power cords truncated for clarity of exposition), and a centrally disposed dowel structure encasing the backup battery component of an uninterrupted power supply (UPS) unit integrated into the device.
Figure 27:
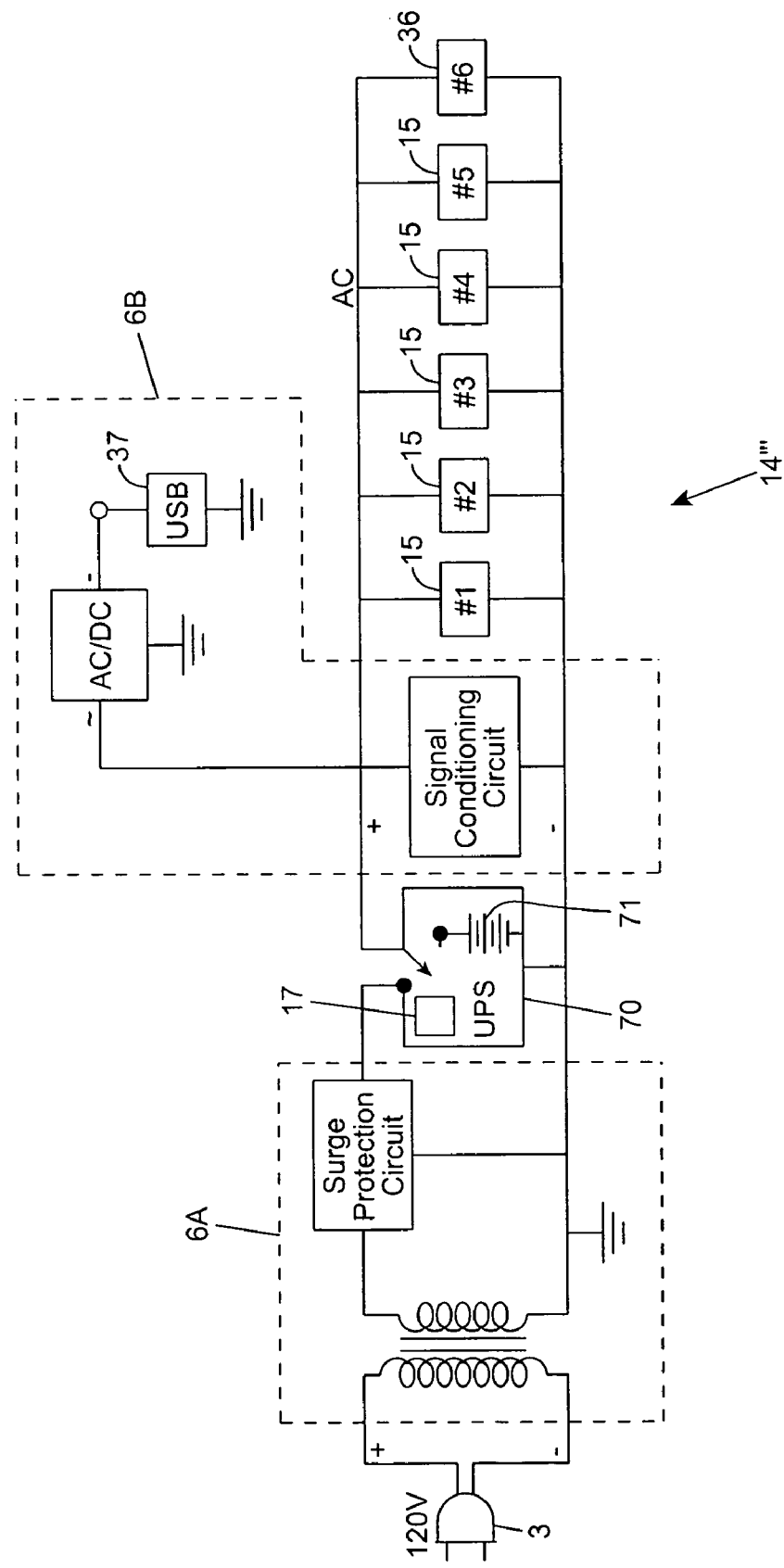
FIG. 27 is a schematic representation showing the electronic and electrical components supported within the power-ring subassembly and dowel structure of the device shown in FIG. 26.

The Electrical Power Supplying Device According to a Fourth Illustrative Embodiment of the Present Invention FIGS. 26 and 27 show a fourth illustrative embodiment of the electrical power supplying device 1''' of the present invention, which is similar in all respects to the device of FIG. 25, except that it also includes an uninterrupted power supply (UPS) unit 70, whose battery component 71 is mounted within the centralized cord management dowel 27'''. With this additional provision, the device 1''' is capable of supplying conditioned AD and DC electrical power to electrical appliances at all times, i.e. even when power interruptions occur at the source electrical power receptacle supplying input power to the device. The ON/OFF power switch and indicator 17 will include a glowing LED ring that indicates the state of the device using different glow colors (e.g. Green=READY, Yellow=BATTERY POWERED, Red=NOT READY). Also, the duration in which device is capable of supplying uninterrupted AC and DC power to appliances will depend on the energy storage capacity of the battery component 71 provided within the device. The larger the energy storage capacity, the longer the available time duration of uninterrupted power from the device during power interruptions.

Taken together, air circulation vents 55 formed in the base portion of housing 19' and air vents 29 formed in the cover housing 28, and air vents formed in dowel post 27A' provide a passive-type of thermal management system embodied within the device to maintain power adapters contained therein with safe operating temperatures.

The Electrical Power Supplying Device According to a Fifth Illustrative Embodiment of the Present Invention As shown in FIGS. 28A through 28C, the electrical power supplying device of the present invention does not need to have a circular or disc-like form factor, as described hereinabove, but can have other form factors, such as a rectangular-shaped form factor.

As shown in FIG. 28C, the power-ring subassembly of this illustrative embodiment has a rectangular geometry with a rectangular shaped aperture for the positioning of elongated power cord management dowel or post structure, which otherwise performs the same functions that the dowel structure of FIGS. 4 and 17B performs.

Figures 29A, 29B, 29C:
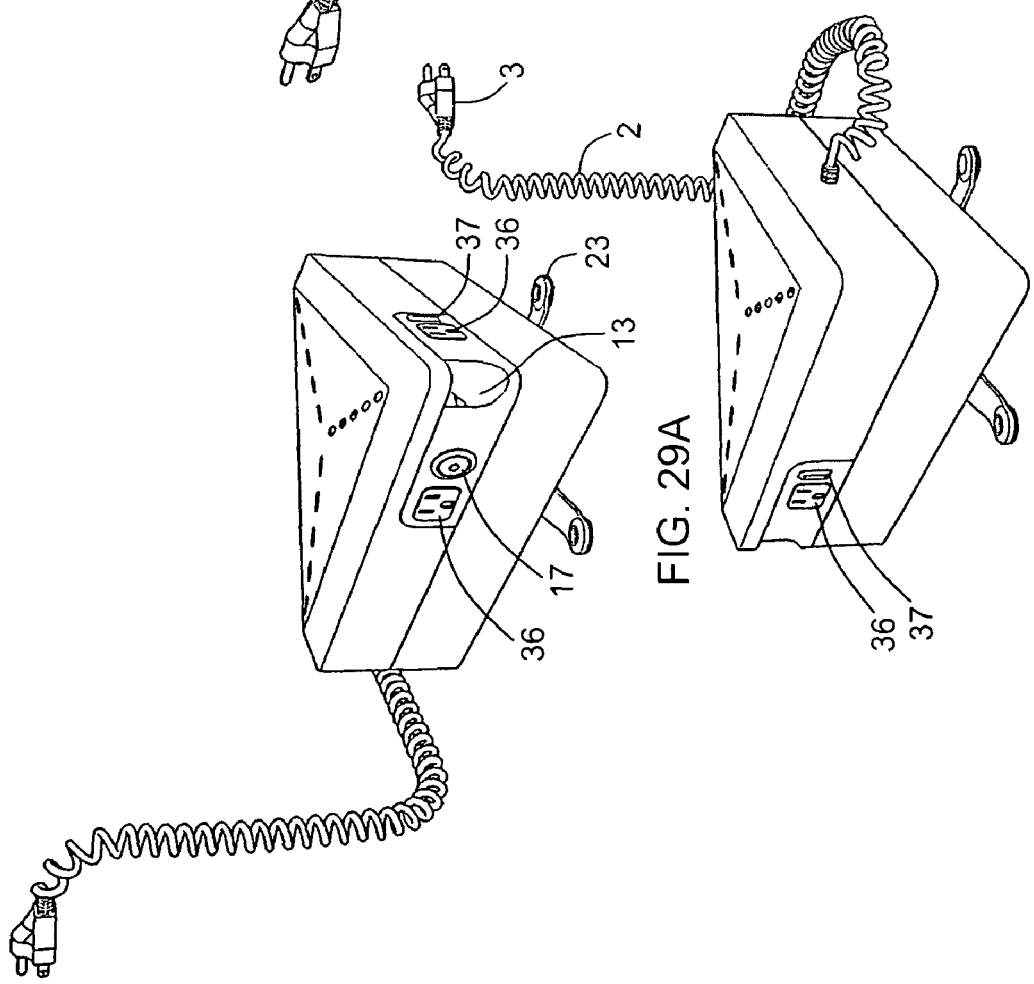
FIG. 29A is a first perspective view of a sixth illustrative embodiment of the electrical power supplying device of the present invention, having a triangular-shaped form factor.
FIG. 29B is a second perspective view of the electrical power supplying device shown in FIG. 29A.
FIG. 29C is a third perspective view of the electrical power supplying device of FIG. 29A, shown with its cover housing portion removed off from its base tray housing portion.

The Electrical Power Supplying Device According to a Sixth Illustrative Embodiment of the Present Invention As shown in FIGS. 29A through 29C, the electrical power supplying device of the present invention is provided with a triangular-shaped form factor. As shown in FIG. 29C, the power-ring subassembly of this illustrative embodiment has a triangular geometry with triangular-shaped aperture for the positioning of cylindrical-shaped power cord management dowel or post structure, which otherwise performs the same functions that the dowel structure of FIGS. 4 and 17B performs.

The Electrical Power Supplying Device According to a Seventh Illustrative Embodiment of the Present Invention In FIGS. 30A through 30C, the wall-supported electrical power supplying device of FIGS. 10A through 10C is shown being used in a floor or countertop mounted fashion, using its multi-purpose mounting bracket. The ways in which this device and other illustrative embodiments of the present invention can be mounted in diverse environments will only be limited by one's imagination.

The Electrical Power Supplying Device According to an Eight Illustrative Embodiment of the Present Invention Typically, most properly designed and manufactured appliance power adapter plugs and modules will generate relatively low levels of heat energy, allowing the integrated thermal management systems of the present invention to work adequately even under demanding operating conditions. Expectedly, however, defective, faulty or poorly design and/or manufactured appliance power adapter plugs and/or modules (i.e. power transformers) can and will typically generate high levels of heat energy, which is not desirable. In such rare situations, faulty or poorly designed/manufactured appliance power transformers can cause the temperature within the 3D interior volume of devices of the present invention to quickly attain unacceptable levels, outside a predetermined operating temperature range.

An eighth illustrative embodiment of the present invention, shown in FIGS. 31 through 35, addresses such problems above by providing an electrical power supplying device with an electrically-active type integrated thermal management subsystem that helps maintain the internal temperature of the 3D interior volume within safe operating temperature limits or desired operating temperature range, and generates user alarms which when the temperature within the 3D interior volume exceeds a predetermined operating temperature range or temperature threshold. Such electrically-active temperature control and detection will be particularly useful or desirable in any application where it is expected that inefficient, high-loss type power adapter plugs and modules will be plugged into and contained within the device, and thus generate excessive levels of thermal energy (i.e. heat), which will require efficient forced transfer to the ambient environment.

Figure 31:
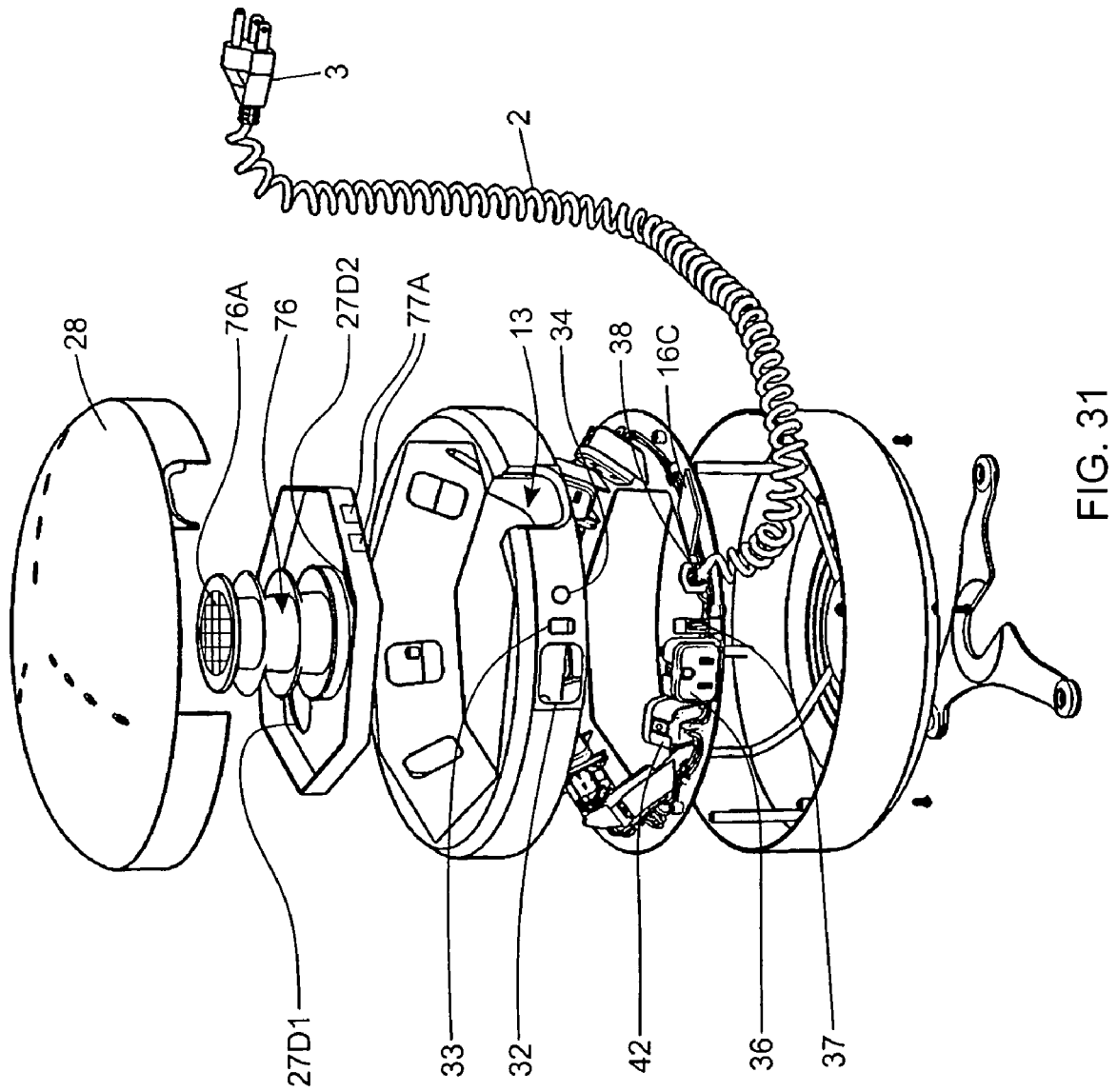
FIG. 31 is an exploded perspective view of an eight illustrative embodiment of the electrical power supplying device of the present invention for deployed on a floor surface to supply electrical power to a number of electrical appliances present within an environment.
Figure 32A:
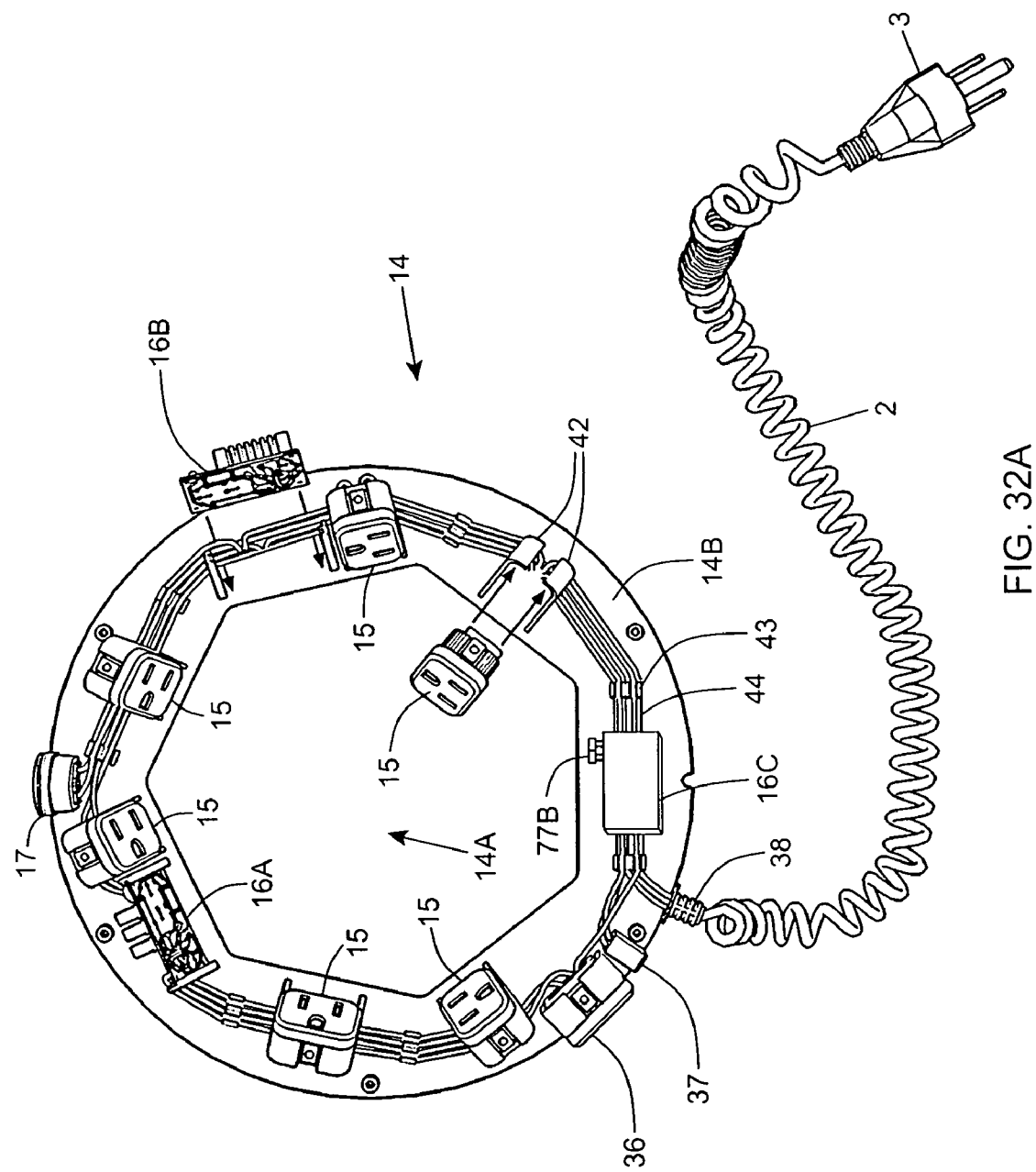
FIG. 32A is a plan view of the power-ring subassembly of the device of FIG. 31, showing its components mounted on its upper surface.
Figure 32B:
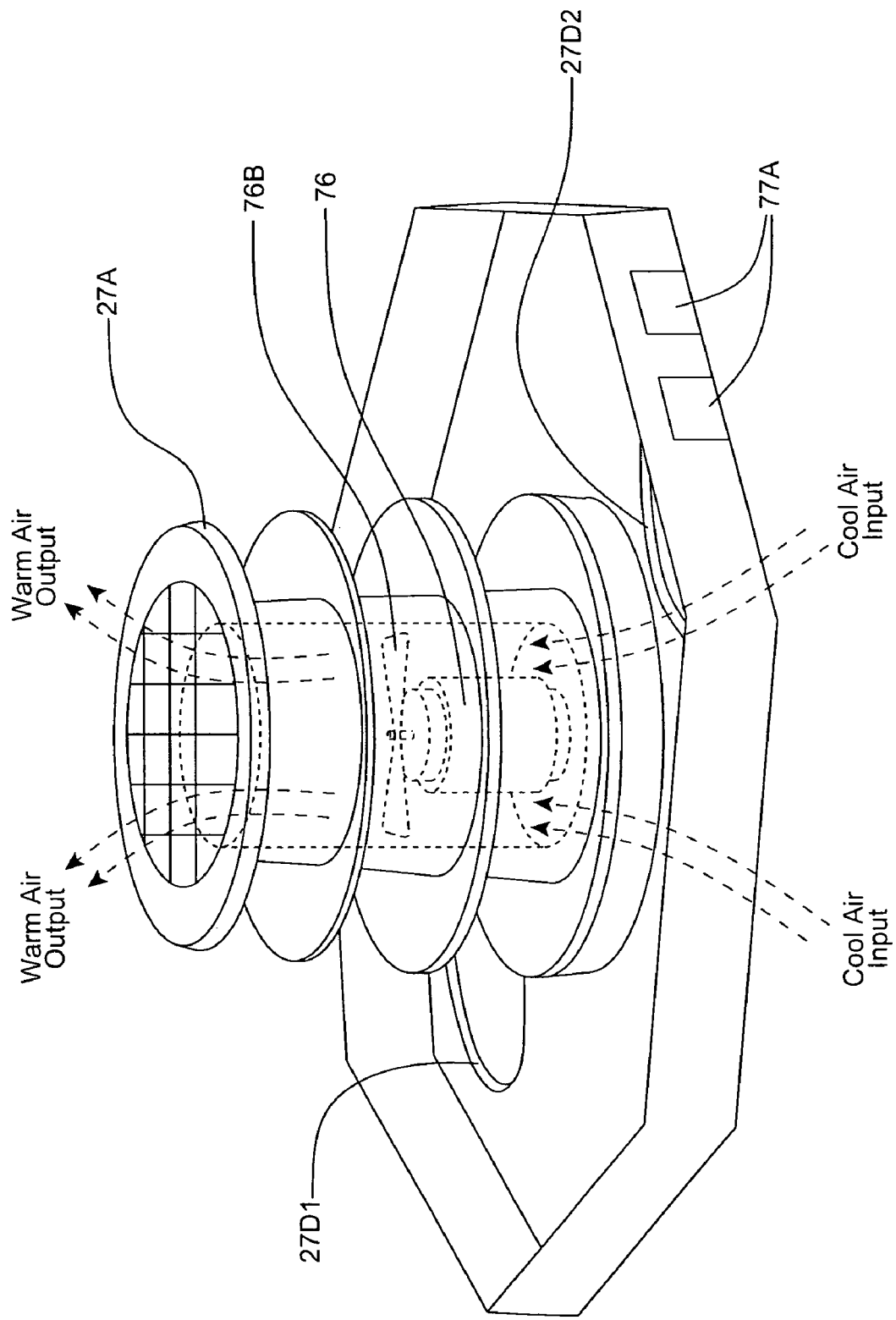
FIG. 32B is a perspective view of the cable management dowel tray employed in the device of FIG. 35, shown removed from the device housing, supporting the electric powered fan within its hollow central region (i.e. air shaft), and illustrating the flow path of cool air from a first region in the external ambient environment, along through its central region and past the turbo-fan blades, and out the a second region in the external ambient environment during device operation.
Figure 32C:
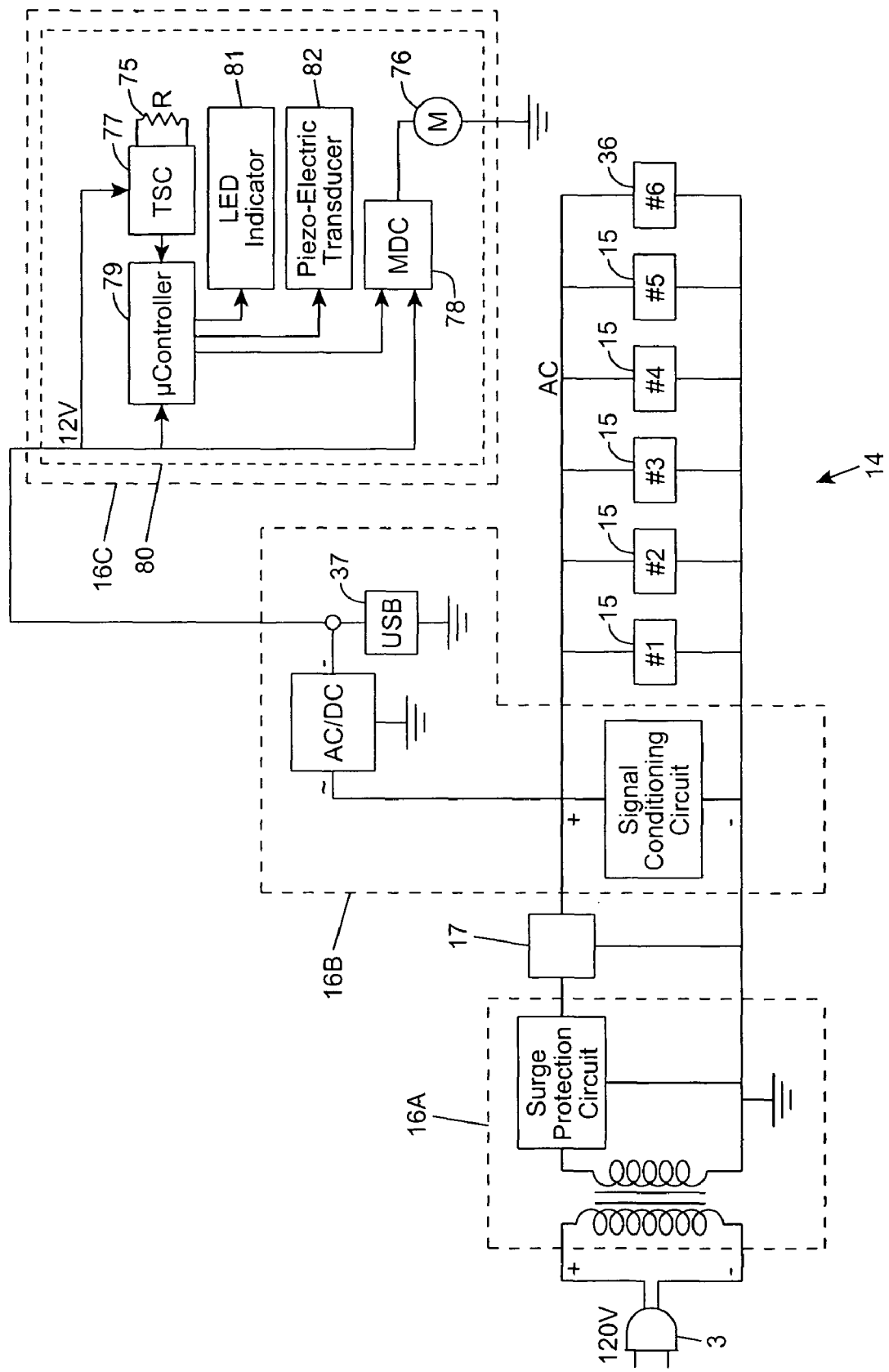
FIG. 32C is a schematic representation of the electrical and electronic components supported on the power-ring subassembly shown in FIG. 32A.
Figure 33:
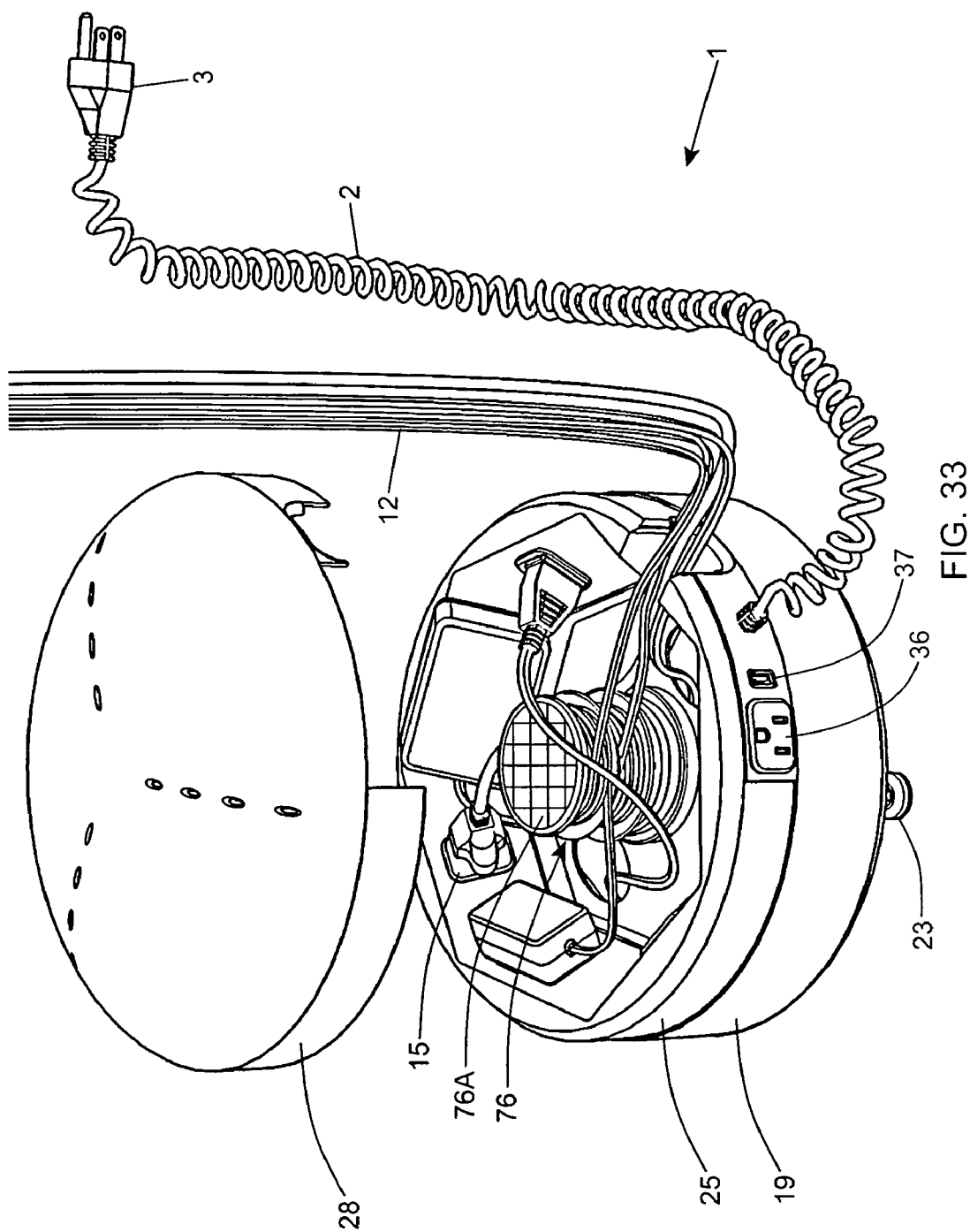
FIG. 33 is a first perspective view of the electrical power supplying device of FIG. 31 shown with its cover housing portion lifted off the power-ring housing portion.
Figure 34:
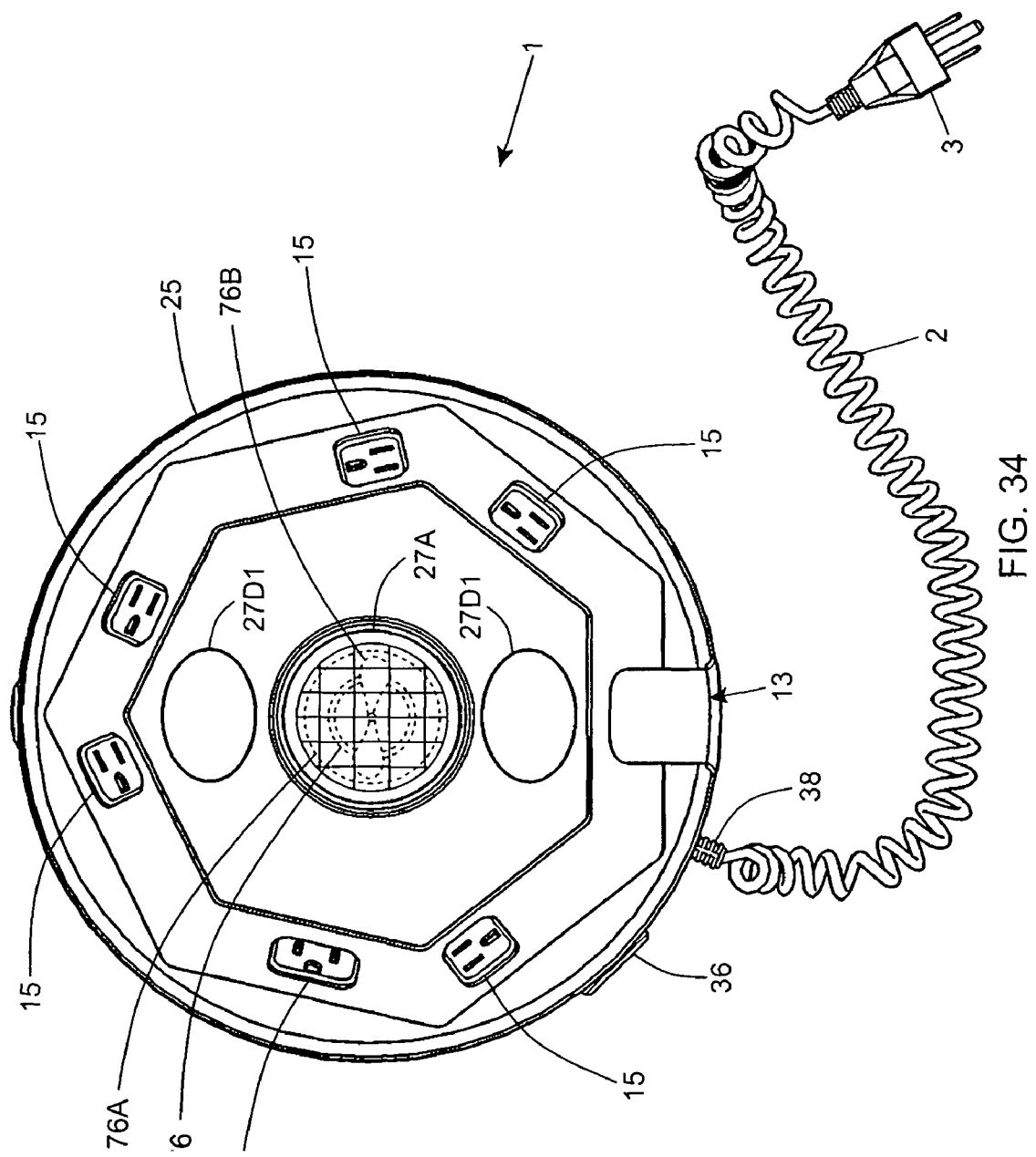
FIG. 34 is a plan view of the electrical power supplying device shown in FIG. 33 shown with its cover housing portion removed and without any electrical appliances being powered by the device.
Figure 35:
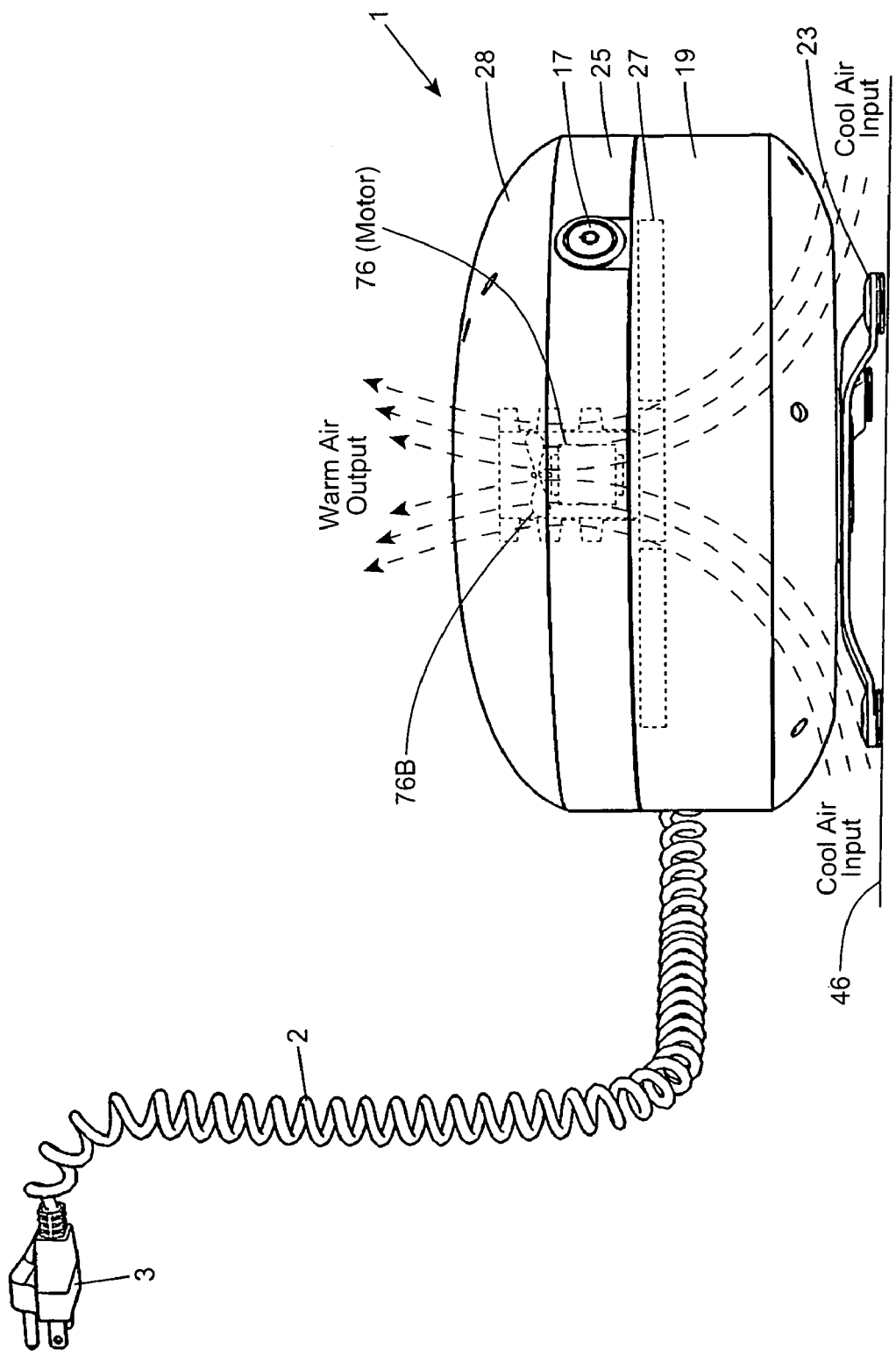
FIG. 35 is a first slide view of the electrical power supplying device shown in FIGS. 33 through 34, illustrating the use of a DC-type electrical motor driven fan embodied within the cable management dowel structure, to enable forced air circulation through the device, so as to automatically control the interior temperature of the 3D interior volume thereof, within safe operating limits.

In general, the eighth illustrative embodiment shown in FIGS. 31 through 35 is similar in all respects to the first illustrative embodiment shown in FIGS. 2A through 7F, except that device of eighth illustrative embodiment further comprises a number of components, namely: an energy-efficient DC-type electrical motor 76, rotating low-profile turbo-type blade 76B, within power cord management dowel structure 27A beneath fan protection cover/screen 76A, provided in tray structure 27, having a pair of electrical power connectors 77A formed on the edge thereof as shown in FIG. 31; a temperature sensing and motor control board 16C designed for snap-fit mounting on the power-ring assembly 14, along with other PC boards 16A and 16B, and supporting (i) temperature sensing circuitry (TSC) 77 employing one or more thermocouple-type sensors (or thermo-dependent resistors) 75 mounted within the interior of the device, (ii) motor drive circuitry (MDC) 78 for driving the DC-type electrical motor driven fan blades 76B, and (iii) a microcontroller 79, interfaced with the temperature sensing circuitry (TSC) 75 and the motor drive circuitry (MDC) 78, and programmed to provide automatic temperature control within the interior 3D volume of the device, while electrical energy consuming components in the thermal management system 80 is powered by a 12 volt internal supply voltage supplied by the device itself, typically using one or more connectors 77A formed on tray structure 27 and connectors 77B formed on the ring-like subassembly 14. Electrical power is supplied from the internal DC supply to the electrical motor 76, via (i) contact-tape connectors 77A and 77B, which contact each other when tray 27 is installed in placed in the 3D interior volume, and (ii) a pair of electrical wires (not shown) that connect the electrical motor 76 with connectors 77A. In alternative embodiments, one or more DC-type electrical motor driven fans 76 can be mounted elsewhere within the interior of the device housing, such as within the cover housing portion, within the base housing portion, and/or elsewhere within the interior of the device.

During operation, the fan blade 76B is rotated by the DC-type electric motor 76 and draws in cooler ambient air through vents 55 from a first (cooler) region in the external ambient environment, and this drawn cooler air flows over any electrical power adapter plugs and modules supported in the upper and lower deck portions of the base housing portion and plugged into power-ring subassembly of the device. This forced cooler air flow absorbs heat energy generated from the electrical power adapter plugs and modules contained within the 3D interior volume, to warm the air flowing thereacross, which is then forced out through vents 29 in the cover housing portion 28 to a second (warmer) region in ambient environment, while cooler air is bring drawn through vents 55 into the 3D interior volume. This forced air flow process is carried out under the control of microcontroller 79, which continuously monitors the temperature within the 3D interior volume, and drives the fan motor 76 at an angular velocity (in RPMs) required to automatically maintain the temperature of the 3D interior volume, within a predetermined range of safe operating temperatures. The desired operating temperature range, to be maintained within the interior of the device, is preset and calibrated at the factory, at the time of device manufacture, to ensure reliable automated temperature control within the device of the present invention. By virtue of control board 80, the electric motor driven fan blade 76B is driven at speeds required to transfer heat energy from the device and maintain the predetermined operating temperature range within the 3D interior volume.

When the programmed microcontroller 79 automatically detects high temperature conditions, that exceed a predetermined threshold level outside of the predetermined operating temperature range of the device, the microcontroller 79 will automatically (i) drive "High Temperature Warning" LED indicator 81 and piezo-electric buzzer 82 and produce visual and audible alarm signals to the end user of the device, and (ii) under particular detected conditions, might even terminate electrical power to the device, until it is checked and reconfigured by the end-user. In any particular embodiment of the present invention, the microcontroller 79 will be programmed to react and respond to such detected conditions within the device of the present invention that depend on the particular applications in which the device is used, and to satisfy any safely criteria that might be applicable in particular jurisdictions where the device will be used by consumers.

Some Modifications that Readily Come to Mind

In the event that a significant electromagnetic fields (EMFs) are generated by 60 HS electrical currents flowing through appliance power cords wrapped around the appliance cable management dowel structure 27A, during device operation, then EMF shielding measures or techniques known in the EMF shielding art can be practiced to reduce or eliminate the electromagnetic field strength outside the device during operation. Such EMF shielding measures might include applying metallic foil to the interior surfaces of the housing components, as well as other suitable measures known in the art.

Also, in general, the housing and other components of the electrical power supplying device of the present invention can be manufactured using injection molded plastics and/or other materials having suitable characteristics and properties which will be known to those skilled in the art.

While several modifications to the illustrative embodiments have been described above, it is understood that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. An electrical power supplying device for supplying electrical power to a group of electrical appliances located in an environment, wherein each said electrical appliance has a power cord routed through an environment and into said electrical power supplying device and terminating with an appliance power plug, said electrical power supplying device comprising:

a power supply cord for plugging into a standard power receptacle by way of a power supply plug, and supplying electrical power to said electrical power supplying device;

a base housing portion having a bottom surface;

a power-ring subassembly supported on said base housing portion, having a central aperture defining the boundaries of a 3D interior volume, and adapted for supporting a plurality of electrical receptacles and one or more electronic circuits, which are electrically connected to said power supply cord;

a power-ring housing portion for covering said power-ring subassembly and having a set of plug apertures, aligned with said electrical receptacles, and allowing appliance power plugs associated with said electrical appliances to plug into said electrical receptacles;

a power cord portal allowing a group of electrical power cords associated with said group of electrical appliances to enter/exit said 3D interior volume in a bundled manner;

a cover housing portion adapted to cover the central aperture of said power-ring subassembly, and conceal (i) appliance power plugs plugged into said electrical receptacles, (ii) appliance power adapter plugs and appliance power adapter modules contained within said 3D interior volume, and (iii) appliance power cords associated with said electrical appliances, and contained within said 3D interior volume; and a thermal management subsystem integrated within said electrical power supplying device, so that heat energy, generated by said appliance power adapter plugs and said appliance power adapter modules contained within said 3D interior volume, is transferred by air flowing from said 3D interior volume to said external ambient environment.

2. The electrical power supplying device of claim 1, wherein said power-ring housing portion attaches to said base housing portion.

3. The electrical power supplying device of claim 1, wherein said power-ring subassembly further comprises at least one exterior power receptacle and at least one USB power port, and wherein said power-ring housing portion has side wall apertures for providing access to said at least one exterior power receptacle, and said at least one USB power port.

4. The electrical power supplying device of claim 1, wherein said power-ring subassembly further comprises a power cord connector for connecting said power supply cord to said power-ring subassembly, and an ON/OFF power switch and indicator, and wherein said power-ring housing portion has side wall apertures for said power cord connector and said ON/OFF power switch and indicator.

5. The electrical power supplying device of claim 1, wherein said power cord portal is formed in said power-ring housing portion, and wherein said cover housing portion further comprises a side wall aperture for the passage of electrical cords through said cord portal.

6. The electrical power supplying device of claim 1, which further comprises a base support portion operably connected to said base housing portion, for supporting said electrical power supplying device a horizontal support surface.

7. The electrical power supplying device of claim 1, wherein at least two or more of said plurality of electrical receptacles are arranged in orthogonal ways to optimize space within said 3D interior volume, and accommodate the storage of said appliance power adapter plugs that are formed at the terminal portion said appliance power cords.

8. The electrical power supplying device of claim 1 wherein said power-ring subassembly comprises:
a substantially planar structure, having said central aperture;
a plurality of mounting brackets, formed or provided on said substantially planar surface, for mounting of said plurality of electrical receptacles, and at least one electronic PC circuit board; and
elements provided on the surface of said substantially planar structure, for the mounting and routing of electrical conductors that interconnect together said electrical receptacles and said least one electronic PC circuit board, and supply electrical power thereto, during device operation.

9. The electrical power supplying device of claim 1, which further comprises a base support portion operably connected to said base housing portion, for supporting said electrical power supplying device a horizontal support surface.

10. The electrical power supplying device of claim 1, wherein thermal management subsystem further comprises:
a first set of air vents for allowing the relatively warm air to flow from within said 3D interior space, to a first region in the exterior ambient environment of said electrical power supplying device; and
a second set of air vents for allowing relatively cooler air to flow from a second region in the exterior ambient environment into said base housing portion, to facilitate cooling of said 3D interior space during device operation.

11. The electrical power supplying device of claim 10, wherein said thermal management subsystem is an electrically-passive type of system that automatically operates to passively transfer said heat energy generated by said appliance power adapter plugs and said appliance power adapter modules in said 3D interior volume, to said second region in said external ambient environment, during device operation.

12. The electrical power supplying device of claim 1, wherein said thermal management subsystem is an electrically-active type of system that automatically operates to actively transfer said heat energy generated by said appliance power adapter plugs and said appliance power adapter modules in said 3D interior volume, to said external ambient environment, during device operation.

13. The electrical power supplying device of claim 12, wherein said thermal management subsystem further comprises:
an electrical motor driven fan, mounted within said electrical power supplying device and controlled by a control subsystem.

14. The electrical power supplying device of claim 13, wherein said control subsystem comprises:
temperature sensing circuitry employing one or more temperature sensors mounted within said 3D interior volume;
motor drive circuitry for driving said electrical motor driven fan; and
a programmed microcontroller, interfaced with said temperature sensing circuitry and said motor drive circuitry, and programmed to controllably drive said electrical motor driven fan, so as to provide automatic temperature control within said 3D interior volume.

15. The electrical power supplying device of claim 14, wherein during operation, said electrical motor powered fan draws in cooler ambient air from a first region in said external ambient environment, and said cooler air flows over any electrical power adapter plugs and modules plugged into and contained within said electrical power supplying device, and the forced cooler air flow absorbs heat energy from said electrical power adapter plugs and modules, to warm said cooler air flow, as said warmed air flow is then forced outside of said electrical power supplying device to a second region in said external ambient environment, whereby temperature within said 3D interior volume is automatically maintained within a predetermined temperature range.

16. The electrical power supplying device of claim 1, wherein said thermal management subsystem generates a user alarm when the temperature within said 3D interior volume exceeds a predetermined operating temperature range or temperature threshold.

17. The electrical power supplying device of claim 16, wherein said user alarm is a signal selected from the group consisting of visual signals and audible signals.

18. The electrical power supplying device of claim 14, wherein said programmed microprocessor generates a user alarm when the temperature within said 3D interior volume exceeds a predetermined operating temperature range or temperature threshold.

* * * * *